(12) United States Patent
Karasawa

(10) Patent No.: US 7,768,573 B2
(45) Date of Patent: Aug. 3, 2010

(54) OPTICAL APPARATUS AND IMAGE-TAKING APPARATUS

(75) Inventor: Katsumi Karasawa, Tochigi (JP)

(73) Assignee: Canon Kabushiki Kaisha (JP)

( * ) Notice: Subject to any disclaimer, the term of this patent is extended or adjusted under 35 U.S.C. 154(b) by 602 days.

(21) Appl. No.: 11/734,573

(22) Filed: Apr. 12, 2007

(65) Prior Publication Data
US 2007/0177045 A1 Aug. 2, 2007

Related U.S. Application Data

(63) Continuation of application No. 10/808,996, filed on Mar. 24, 2006, now Pat. No. 7,268,818.

(30) Foreign Application Priority Data

Mar. 27, 2003 (JP) .............................. 2003-088476

(51) Int. Cl.
*H04N 5/225* (2006.01)
(52) U.S. Cl. ..................................... 348/360
(58) Field of Classification Search ................. 348/360, 348/231.99–231.3, 361
See application file for complete search history.

(56) References Cited

U.S. PATENT DOCUMENTS

| 6,476,869 B1 | 11/2002 | Sekine et al. |
| 6,989,616 B2 | 1/2006 | Okubo et al. |
| 2001/0030707 A1 | 10/2001 | Fujii |

FOREIGN PATENT DOCUMENTS

| JP | 2001-061085 A | 3/2001 |
| JP | 2002-131820 A | 5/2002 |
| JP | 2002-344777 A | 11/2002 |
| JP | 2003-060982 A | 2/2003 |

*Primary Examiner*—Tuan Ho
(74) *Attorney, Agent, or Firm*—Rossi, Kimms & McDowell LLP

(57) ABSTRACT

An optical apparatus is disclosed which provides good usability and operability. The optical apparatus comprises a first memory storing a default setting data set for controlling functions of the apparatus and a second memory storing a user setting data set for controlling the functions. The default setting values included in the default setting data set are non-rewritable, and the user setting values included in the user setting data set are rewritable based on the default setting values.

14 Claims, 92 Drawing Sheets

UP KEY
DOWN KEY
FIG.9
FIG.10

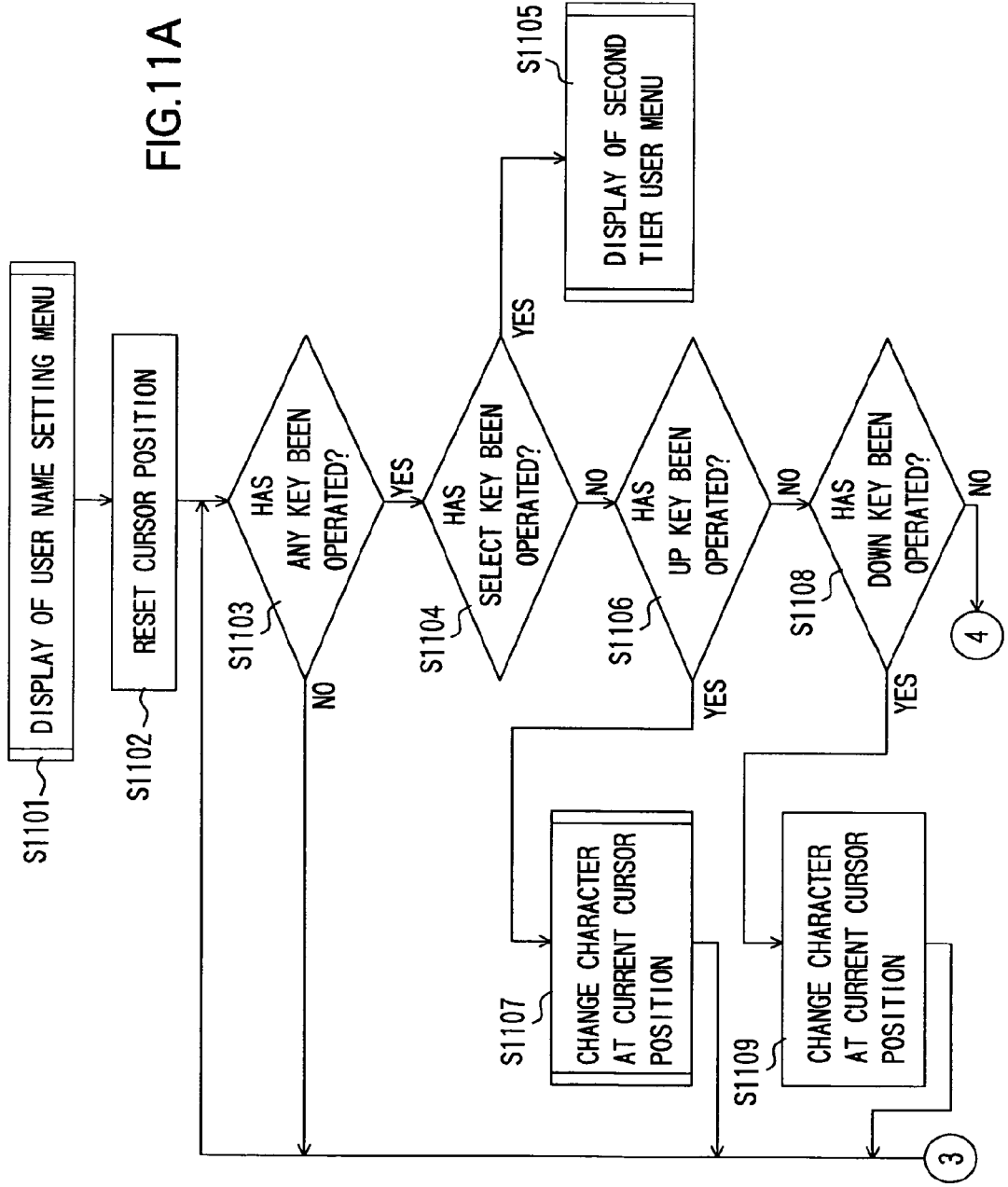

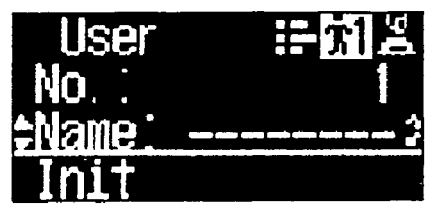
 DOWN KEY
FIG.15
 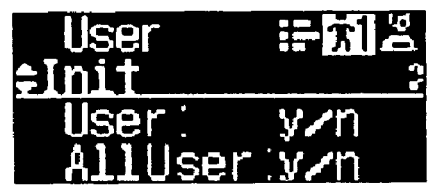
SELECT KEY
FIG.16
 DOWN KEY
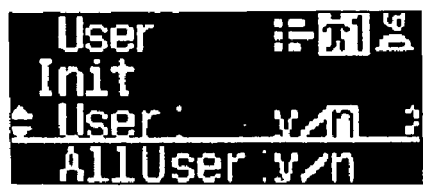
FIG.17

LEFT KEY

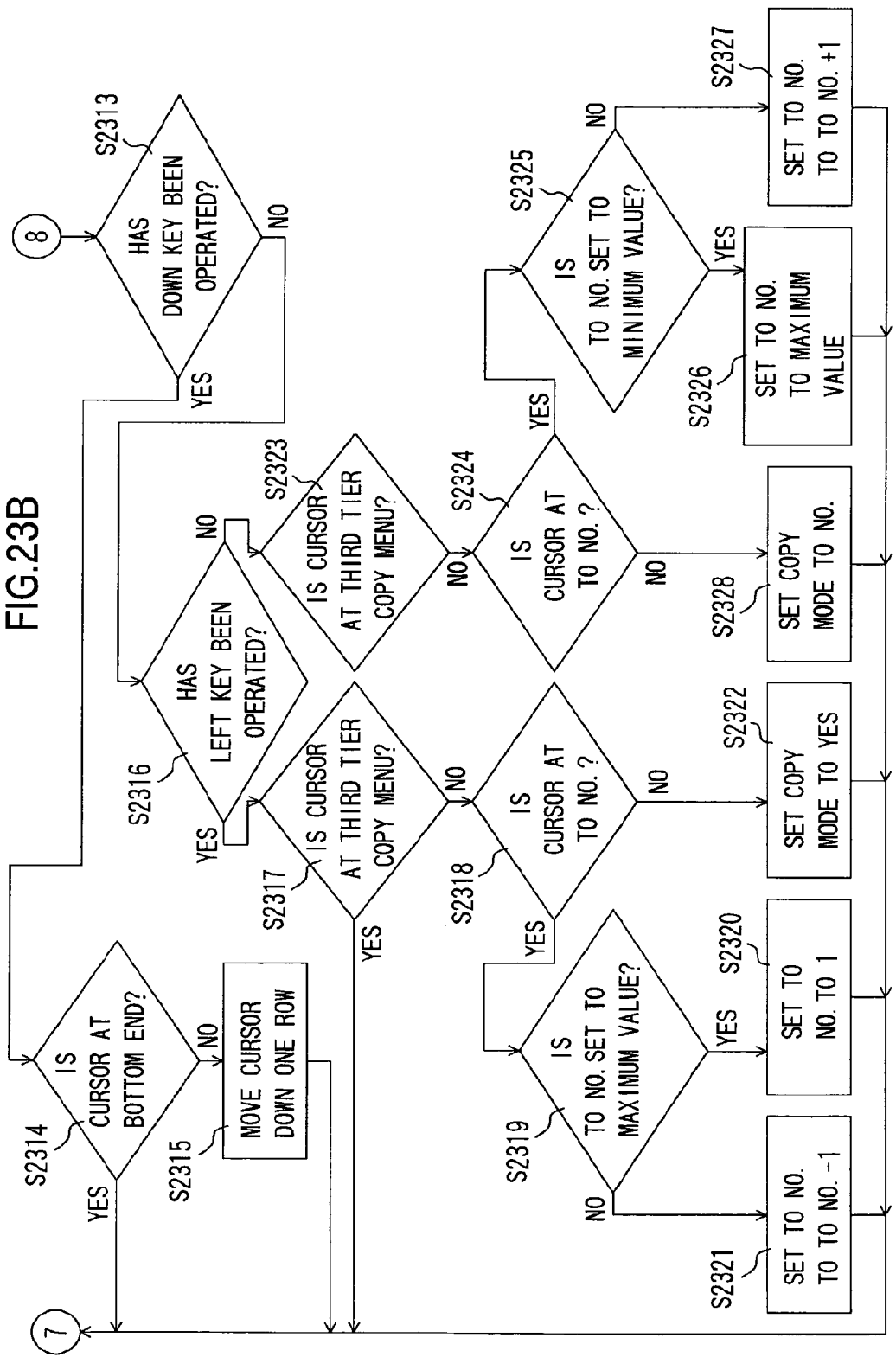

 DOWN KEY
FIG.27
 ← 
LEFT KEY
FIG.28
 → 
RIGHT KEY
FIG. 29

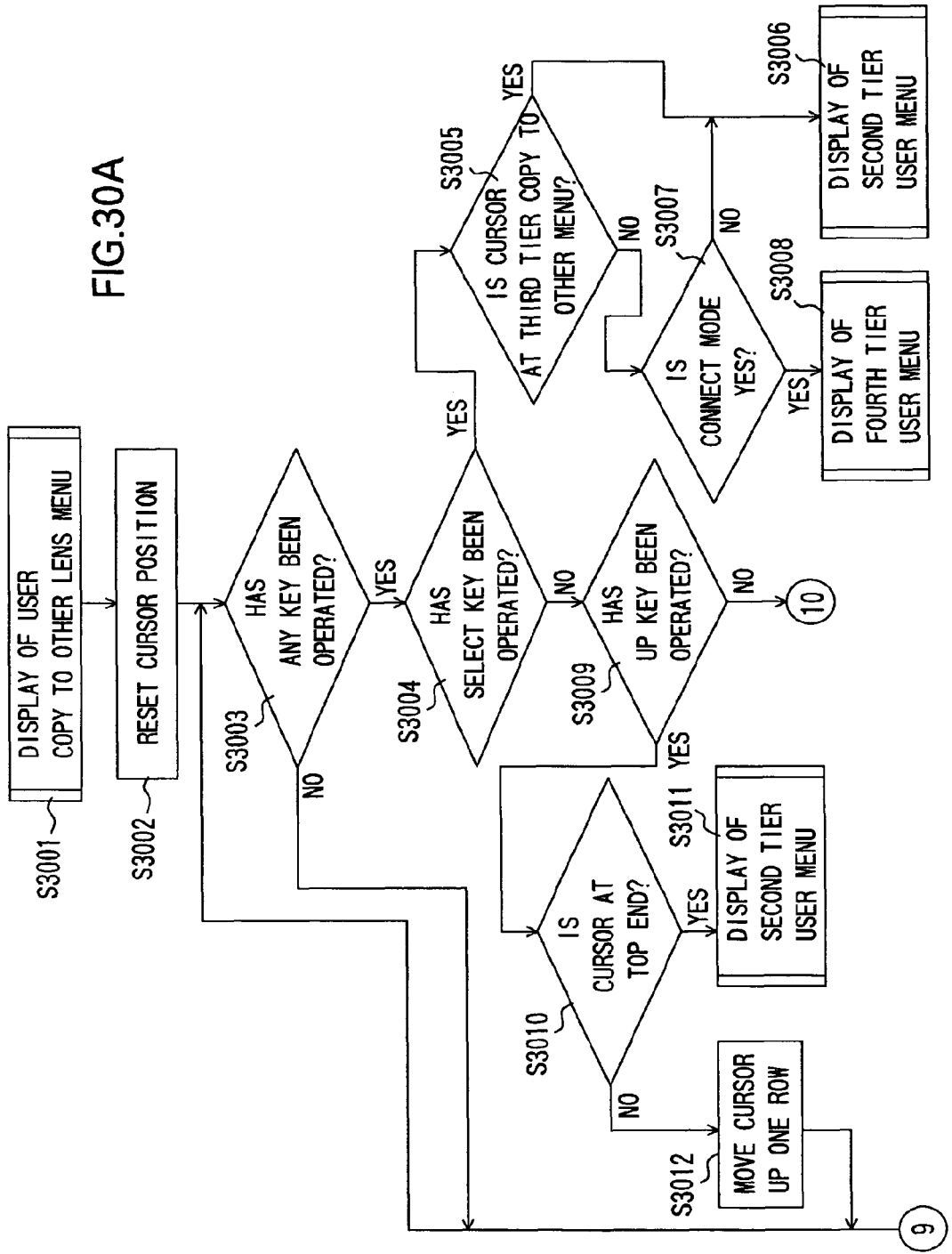

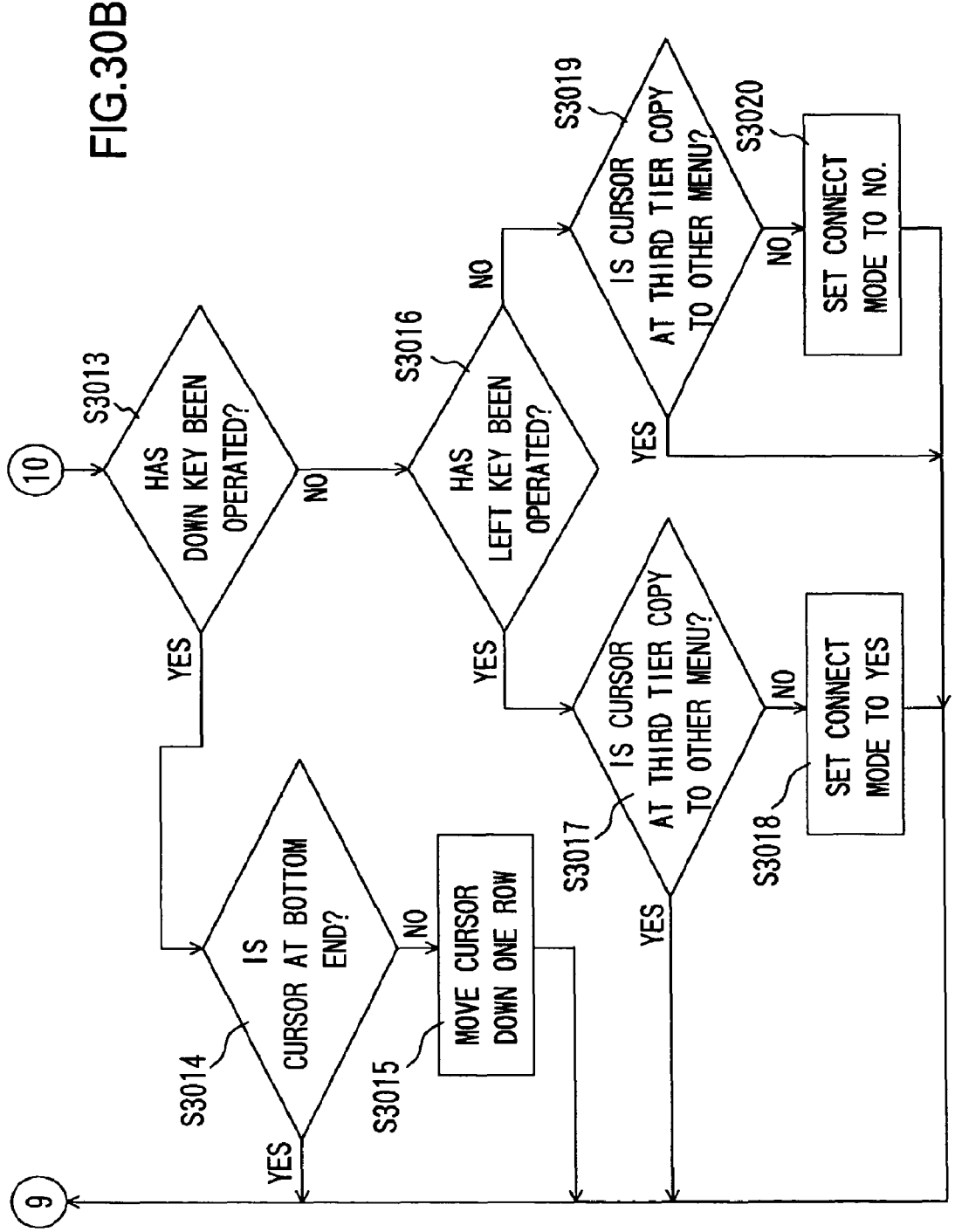

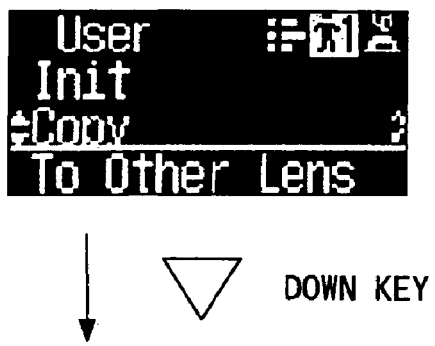
FIG.31
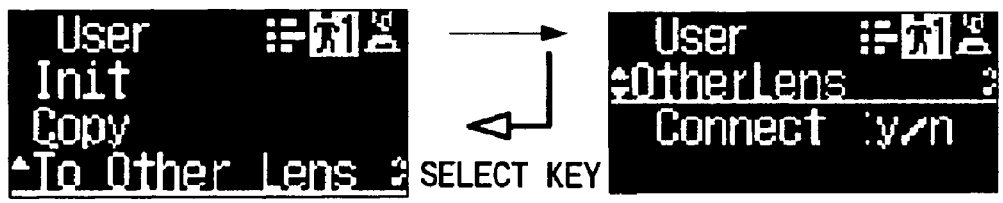
FIG.32
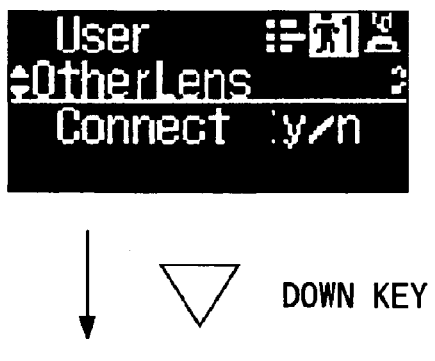
FIG.33

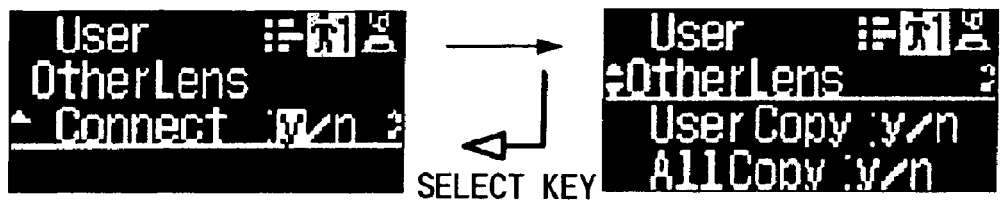
FIG.37
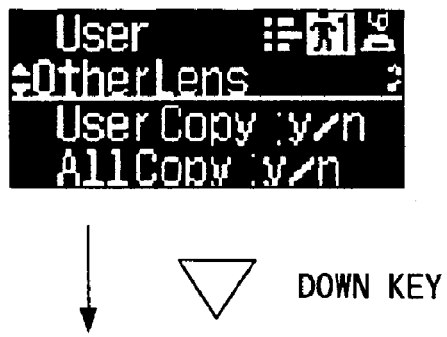
FIG.38
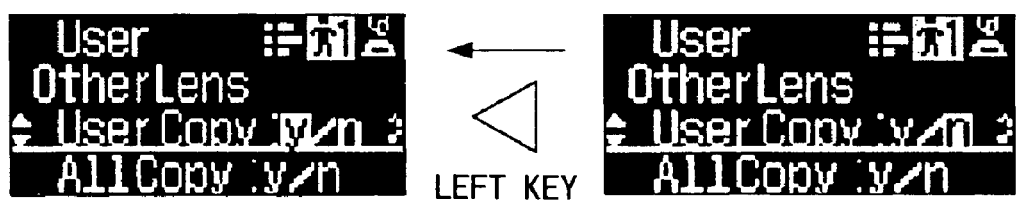
FIG.39
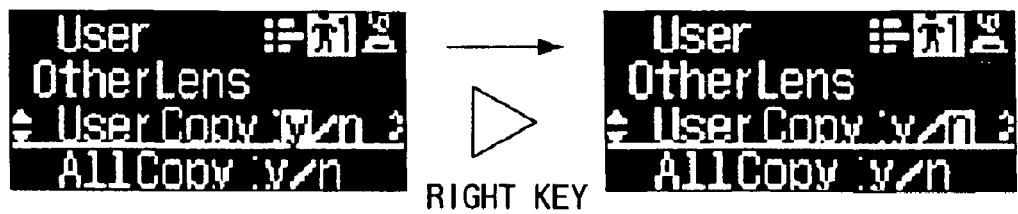
FIG.40

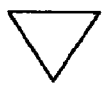 DOWN KEY
FIG.41
  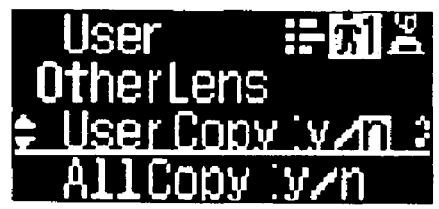
LEFT KEY
FIG.42
 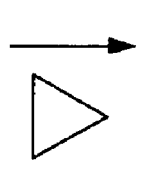 
RIGHT KEY
FIG.43

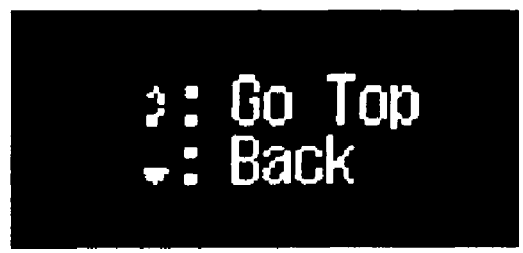
FIG.45
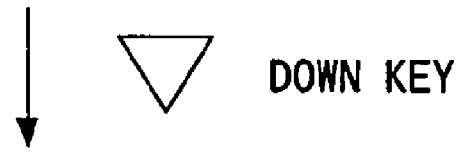
FIG.46

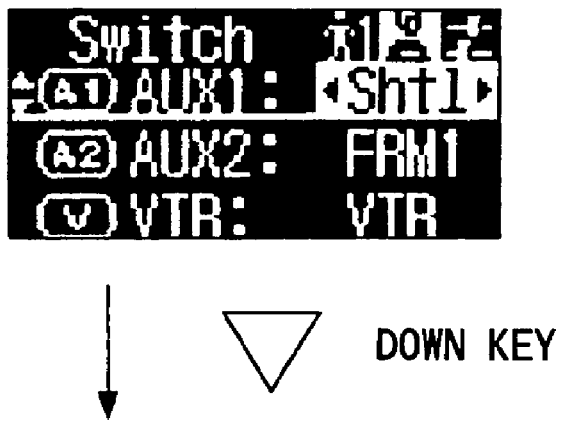
FIG.47
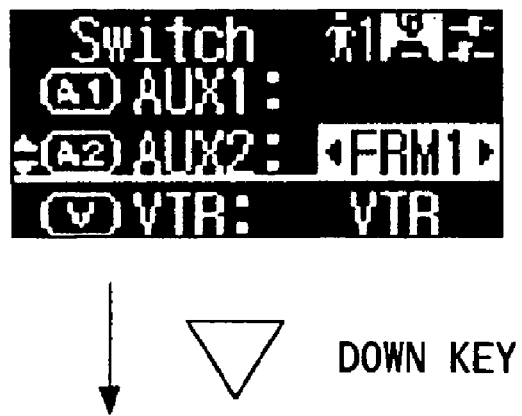
FIG.48

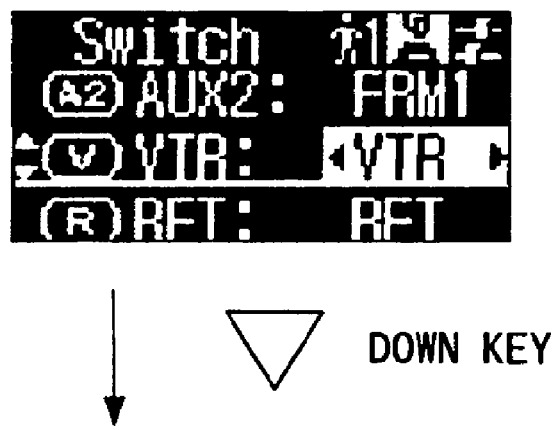
FIG.49
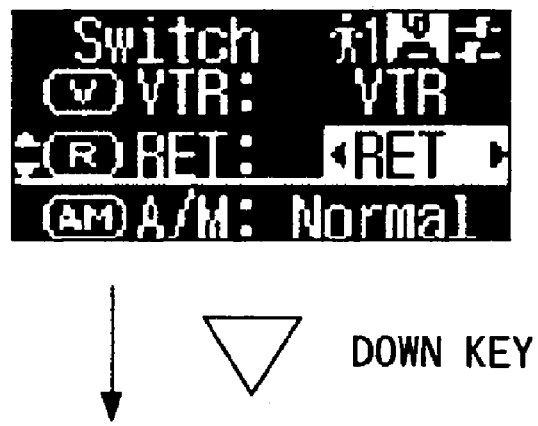
FIG.50

 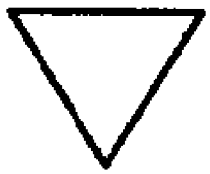 DOWN KEY
FIG.51

 UP KEY
FIG.53
 DOWN KEY
FIG.54
 DOWN KEY
FIG.55
 DOWN KEY
FIG.56

FIG.57

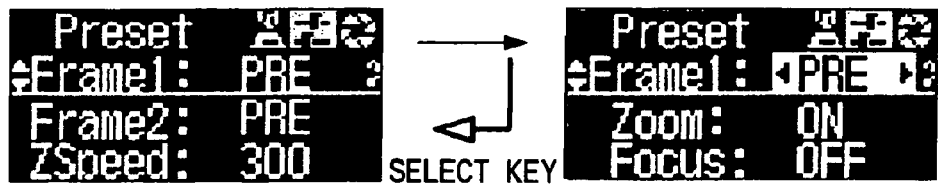
FIG.59
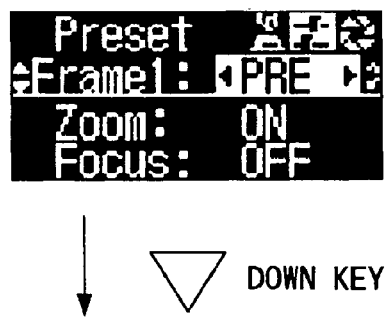
FIG.60
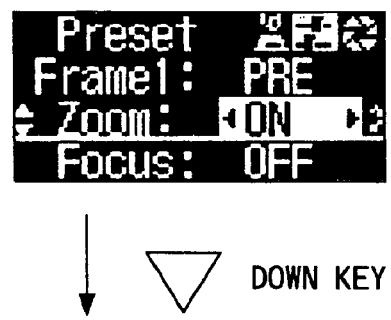
FIG.61
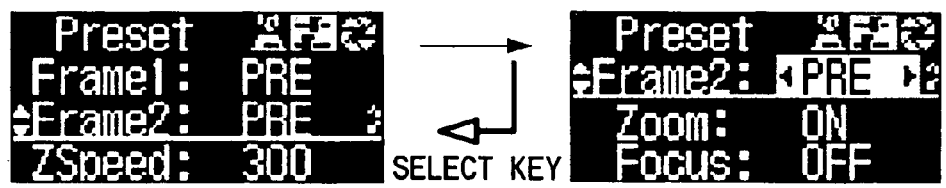
FIG.62

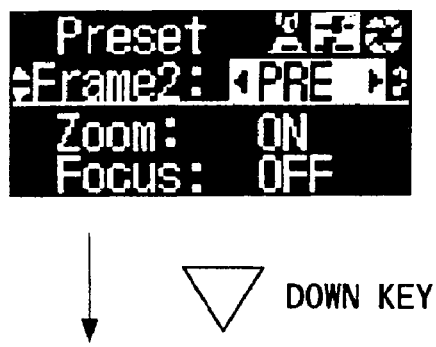
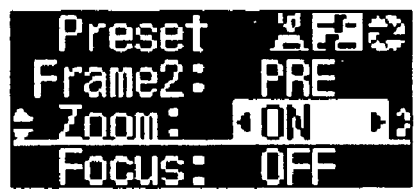
FIG.63
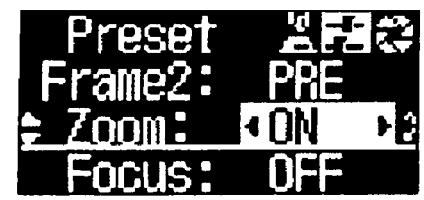
FIG.64

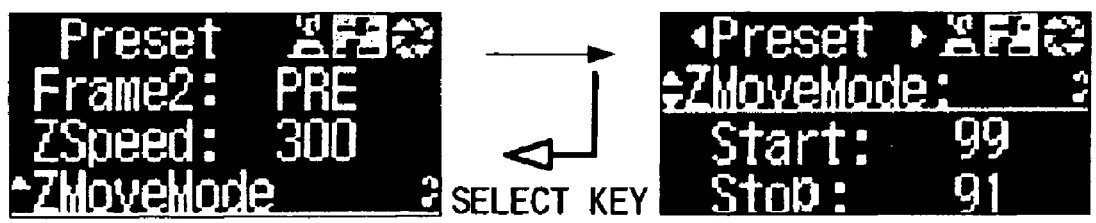
FIG.66
 
DOWN KEY
 
FIG.67  FIG.68

△ UP KEY
▽ DOWN KEY
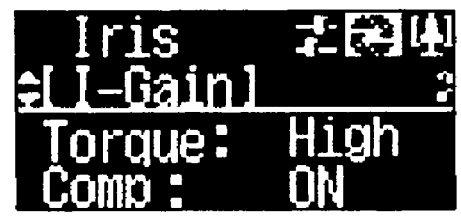
FIG.70
FIG.71
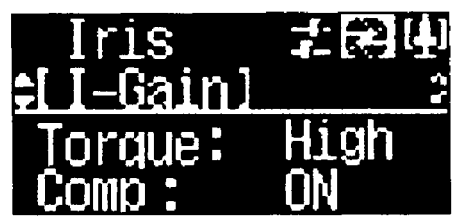
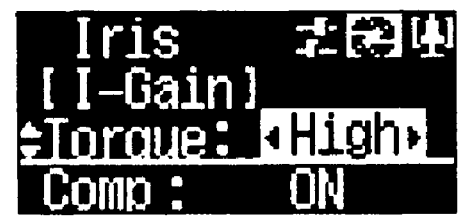
▽ DOWN KEY
▽ DOWN KEY
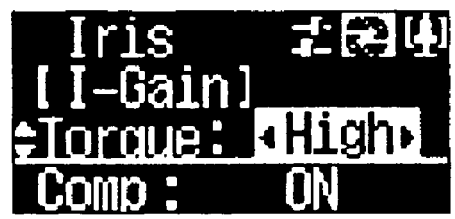
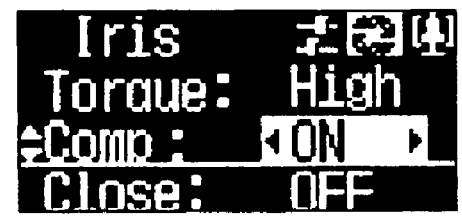
FIG.72
FIG.73

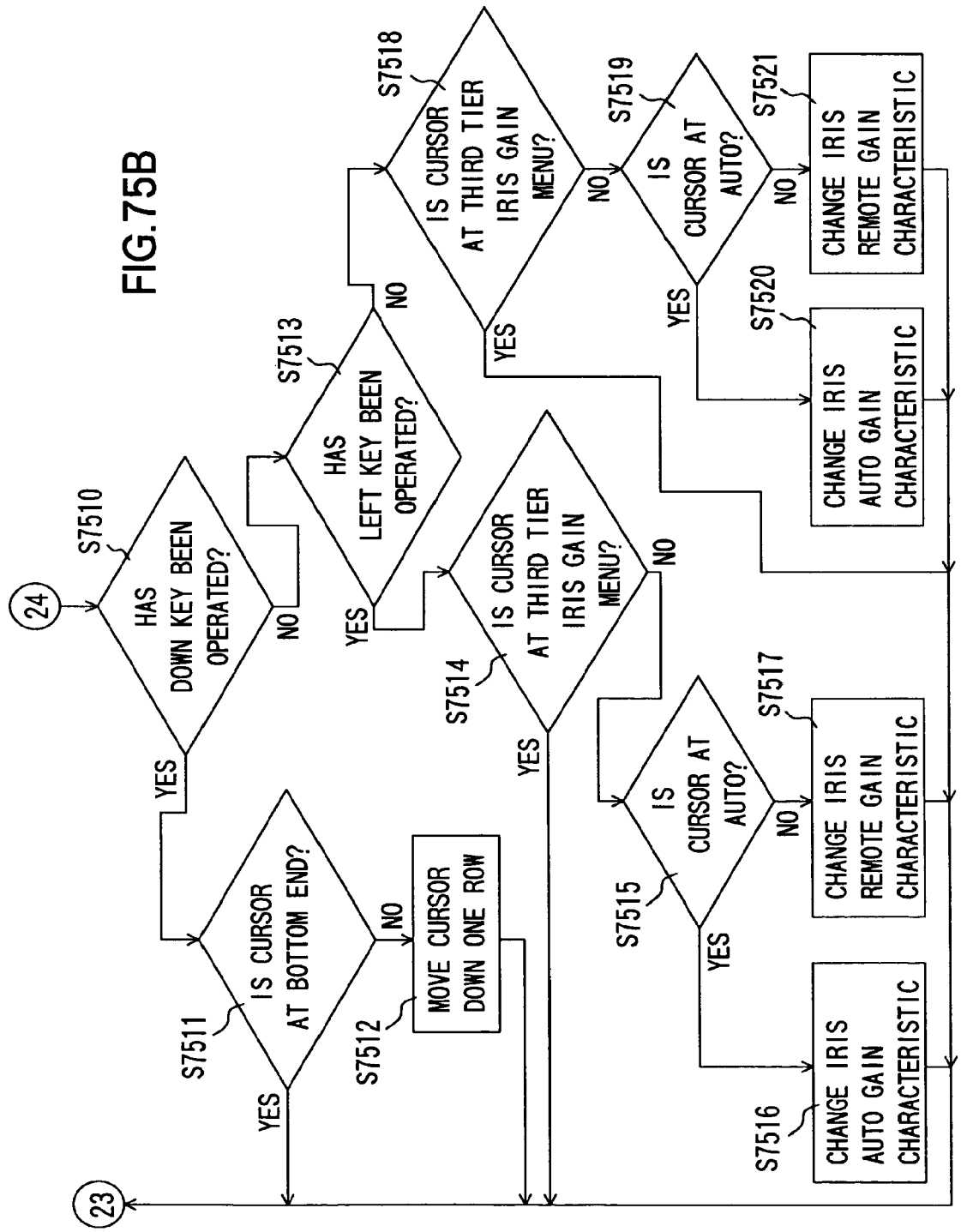

FIG.80
FIG.81
FIG.82
FIG.83

 DOWN KEY
 DOWN KEY
FIG.84
FIG.85
 DOWN KEY
 DOWN KEY
FIG.86
FIG.87

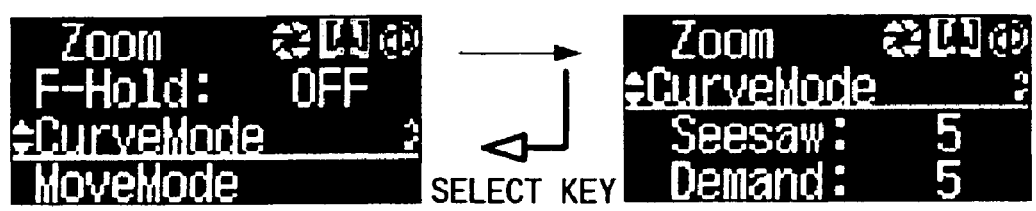
FIG.89
FIG.90  FIG.91

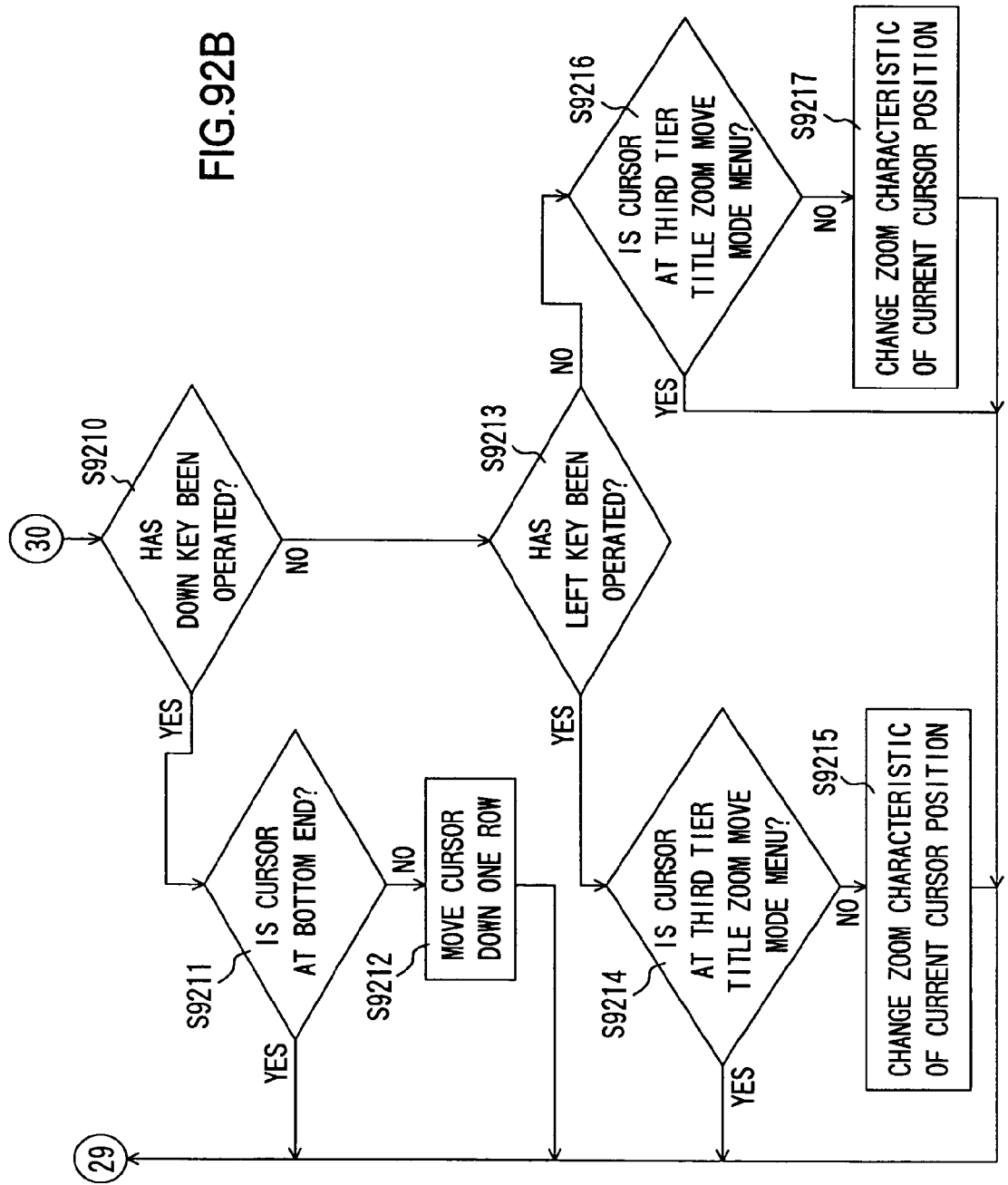

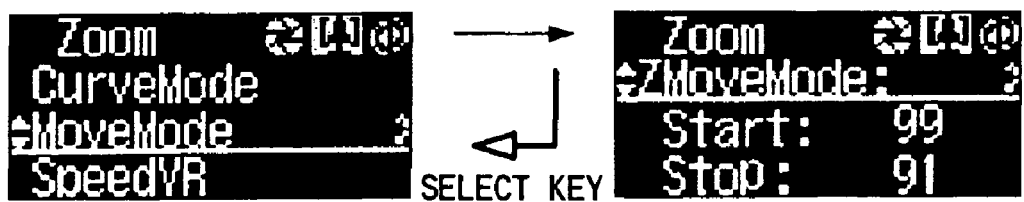
FIG.93
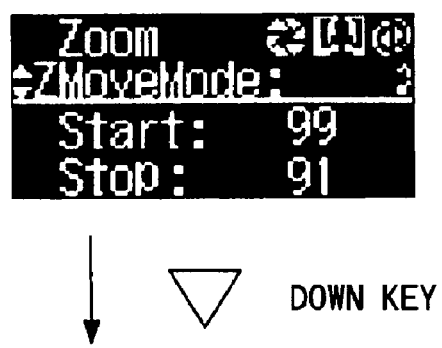
FIG.94
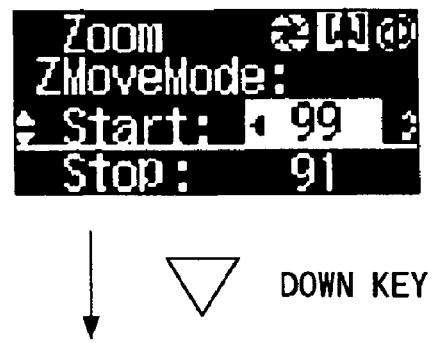
FIG.95
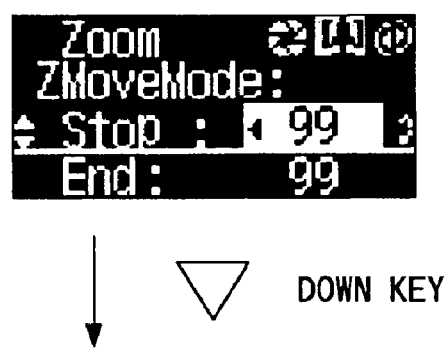
FIG.96

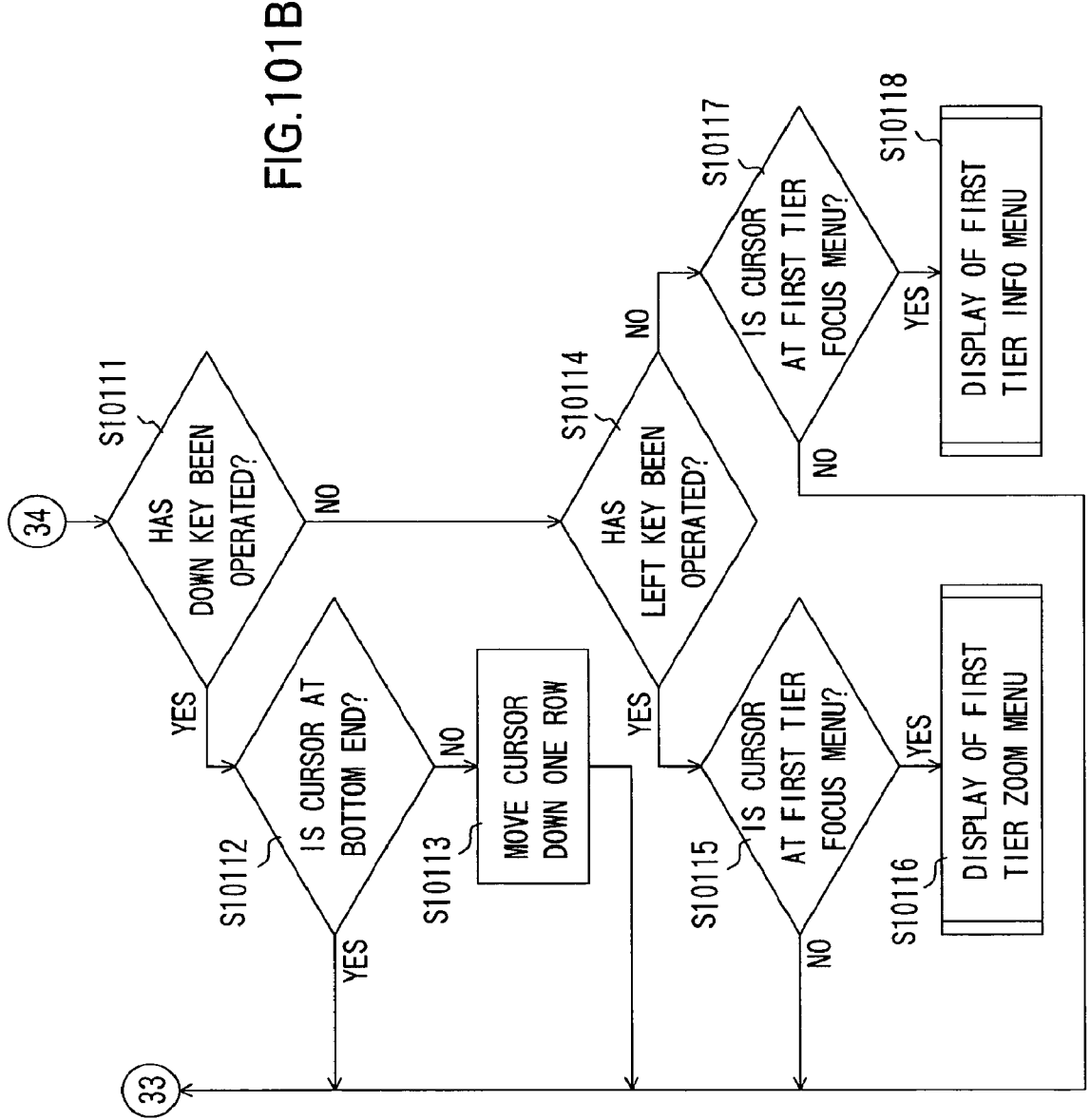

 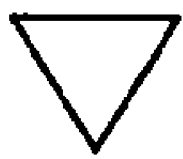 DOWN KEY
FIG.102

FIG.107　　　　　　　　FIG.108
FIG.109　　　　　　　　FIG.110

OPTICAL APPARATUS AND IMAGE-TAKING APPARATUS

BACKGROUND OF THE INVENTION

This is a continuation of prior application Ser. No. 10/808,996, filed Mar. 24, 2004, to which priority under 35 U.S.C. §120 is claimed and which is hereby incorporated by reference in its entirety as if fully set forth herein.

FIELD OF THE INVENTION

This invention relates to an optical apparatus to be used in a lens apparatus for television image-taking, a television lens equipped with camera apparatus that is connected to a lens apparatus, etc.

DESCRIPTION OF RELATED ART

An image-taking (camera) apparatus used for television image-taking comprises a main TV camera body and a TV lens, and is used by mounting the TV lens onto the TV camera. Of these components, the TV lens is largely divided into a main lens body part and a drive unit, and the main lens body part has an image-taking optical system and manual rings for manual operation of the image-taking optical system. The drive unit has, housed in the interior thereof, motors, control boards, and a CPU for electromotive drive of the manual rings and is provided on the external surface with various switches and operating members for instructing electromotive control.

With regard to the TV lens, though manual zooming and iris operations were carried out in the majority of cases of image-taking in the past, image-taking using electromotive servo has come to be carried out frequently recently, and various functions have been added to the drive unit as well. These include for example, a preset function, with which once an arbitrary zoom position is stored, a motor is driven to the stored zoom position by the pressing of a switch, and a function, by which a user can freely assign this preset function to a switch at a position of choice among the plurality of switches provided on the drive unit.

As a means of setting such various functions, a DIP switch is provided inside the drive unit and a cameraperson removes a rubber cap provided on the external surface of the drive unit and sets the DIP switch according to the image-taking circumstances. Such functions that can be set thus enable the scope of image-taking by a cameraperson to be widened and optimal camera work to be realized in accordance with various image-taking circumstances.

However, with the conventional TV lens, since the function setting part for the lens is provided inside the drive unit, the setting circumstances of the functions cannot be viewed at a glance, and there is also the troublesomeness of operation of having to remove the rubber cap each time to check the setting state. The act of looking into a small DIP switch provided inside the drive unit is poor in terms of visual recognizability, instant check of the setting state is difficult, and the act of switching the small DIP switch of the operating part with a fingertip is also difficult in terms of operation. The act of operating a DIP switch while checking it is extremely difficult, especially under an environment of inadequate light. Also, in an usage environment unique to TV lenses wherein a single image-taking equipment is shared by a plurality of camerapersons, it is extremely important that it be possible to readily and instantly check the setting circumstances of the cameraperson using the equipment priorly, and such a need could not be answered readily by the conventional TV lens. The enabling of instant check of the setting circumstances of TV lenses, which will become even more complex in the future, and the provision of a setting means which is even better in operability are issues for TV lenses.

SUMMARY OF THE INVENTION

In order to attain the above object, one aspect of the present invention is an optical apparatus which has a plurality of functions for controlling the driving of an optical element and comprises a first memory storing a default setting data set which includes default setting values for the plurality of functions and a second memory storing a user setting data set which includes user setting values for the plurality of functions. The default setting values are non-rewritable, and the user setting values are rewritable based on the default setting values.

Another aspect of the present invention is an optical apparatus which has a function for controlling the driving of an optical element, and comprises a display device and a controller. The controller controls the display device for displaying a startup menu and a setting changing menu. The startup menu is displayed first when the power of the display device is turned on, and the setting changing menu includes a setting changing icon for changing a setting value of the function. The setting changing icon is displayed inside the startup menu.

Another aspect of the present invention is an optical apparatus which has a plurality of functions for controlling the driving of an optical element, and comprises a display device and a controller. The controller controls the display device for displaying a startup menu, a function selection menu and a setting changing menu. The startup menu is displayed first when the power of the display device is turned on, the function selection menu is displayed for selecting one of the plurality of functions, and the setting changing menu is displayed for changing a setting value of the function. A transition from the startup menu to the setting changing menu is performed via the function selection menu.

Another aspect of the present invention is an optical apparatus which has a plurality of functions for controlling the driving of an optical element, and comprises a display device and a controller. The controller controls the display device for displaying a first function selection menu, a second function selection menu which is different from the first function selection menu, and a setting changing menu. The first function selection menu is displayed for selecting one of the plurality of functions, and the setting changing menu is transited from the first function selection menu and displayed for changing a setting value of the function. A transition from the setting changing menu to the second function selection menu is inhibited.

Another aspect of the present invention is an optical apparatus which has a plurality of first functions for controlling the driving of an optical element and a plurality of second functions for setting a user's data set, and comprises a display device and a controller. The controller controls the display device for displaying a startup menu, a first function selection menu, a user function selection menu and a transition confirmation menu. The startup menu is displayed first when the power of the display device is turned on, the first function selection menu is transited from the startup menu and displayed for selecting one of the plurality of first functions, the user function selection menu is transited from the startup menu and displayed for selecting one of the plurality of second functions, and the transition confirmation menu is interposed in a transition from the first function selection menu to the startup menu. When a transition from the first function selection menu to the transition confirmation menu has been performed, a reverse transition from the transition confirmation menu to the first function selection menu is allowed and a transition from the transition confirmation menu to the user function selection menu is inhibited.

Another aspect of the present invention is an optical apparatus which has a plurality of functions for controlling the driving of an optical element, and comprises a display device and a controller. The controller controls the display device for displaying a startup menu, a first function selection menu, a second function selection menu which is different from the first function selection menu, and a transition confirmation menu. The startup menu is displayed first when the power of the display device is turned on, the first function selection menu is transited from the startup menu and displayed for selecting one of the plurality of functions, and the transition confirmation menu is interposed in a transition from the first function selection menu to the startup menu. When a transition from the first function selection menu to the transition confirmation menu has been performed, a reverse transition from the transition confirmation menu to the first function selection menu is allowed and a transition from the transition confirmation menu to the second function selection menu is inhibited.

Another aspect of the present invention is an optical apparatus which has a plurality of first functions for controlling the driving of an optical element and a plurality of second functions for setting a user's data set, and comprises a display device and a controller. The controller controls the display device for displaying a startup menu, a first function selection menu and a user function selection menu. The startup menu is displayed first when the power of the display device is turned on, the first function selection menu is transited from the startup menu and displayed for selecting one of the plurality of first functions, and the user function selection menu is transited from the startup menu and displayed for selecting one of the plurality of second functions. A transition from the startup menu to the first function selection menu is performed via the user function selection menu, and a direct transition from the startup menu to the first function selection menu is inhibited.

A detailed configuration of the Optical apparatus of the invention, the above and other objects and features of the invention will be apparent from the embodiment, described below.

BRIEF DESCRIPTION OF THE DRAWINGS

FIG. 9 is a detailed diagram of the display panel of the embodiment.
FIG. 10 is a detailed diagram of the display panel of the embodiment.
FIG. 15 is a detailed diagram of the display panel of the embodiment.
FIG. 16 is a detailed diagram of the display panel of the embodiment.
FIG. 17 is a detailed diagram of the display panel of the embodiment.
FIG. 27 is a detailed diagram of the display panel of the embodiment.
FIG. 28 is a detailed diagram of the display panel of the embodiment.
FIG. 29 is a detailed diagram of the display panel of the embodiment.
FIG. 30 is a display operation flowchart of the embodiment.
FIG. 31 is a detailed diagram of the display panel of the embodiment.
FIG. 32 is a detailed diagram of the display panel of the embodiment.
FIG. 33 is a detailed diagram of the display panel of the embodiment.
FIG. 37 is a detailed diagram of the display panel of the embodiment.
FIG. 38 is a detailed diagram of the display panel of the embodiment.
FIG. 39 is a detailed diagram of the display panel of the embodiment.
FIG. 40 is a detailed diagram of the display panel of the embodiment.
FIG. 41 is a detailed diagram of the display panel of the embodiment.
FIG. 42 is a detailed diagram of the display panel of the embodiment.
FIG. 43 is a detailed diagram of the display panel of the embodiment.

FIG. 45 is a detailed diagram of the display panel of the embodiment.
FIG. 46 is a detailed diagram of the display panel of the embodiment.
FIG. 47 is a detailed diagram of the display panel of the embodiment.
FIG. 48 is a detailed diagram of the display panel of the embodiment.
FIG. 49 is a detailed diagram of the display panel of the embodiment.
FIG. 50 is a detailed diagram of the display panel of the embodiment.
FIG. 51 is a detailed diagram of the display panel of the embodiment.
FIG. 53 is a detailed diagram of the display panel of the embodiment.
FIG. 54 is a detailed diagram of the display panel of the embodiment.
FIG. 55 is a detailed diagram of the display panel of the embodiment.
FIG. 56 is a detailed diagram of the display panel of the embodiment.
FIG. 57 is a detailed diagram of the display panel of the embodiment.
FIG. 59 is a detailed diagram of the display panel of the embodiment.
FIG. 60 is a detailed diagram of the display panel of the embodiment.
FIG. 61 is a detailed diagram of the display panel of the embodiment.
FIG. 62 is a detailed diagram of the display panel of the embodiment.
FIG. 63 is a detailed diagram of the display panel of the embodiment.
FIG. 64 is a detailed diagram of the display panel of the embodiment.
FIG. 66 is a detailed diagram of the display panel of the embodiment.
FIG. 67 is a detailed diagram of the display panel of the embodiment.
FIG. 68 is a detailed diagram of the display panel of the embodiment.
FIG. 70 is a detailed diagram of the display panel of the embodiment.
FIG. 71 is a detailed diagram of the display panel of the embodiment.
FIG. 72 is a detailed diagram of the display panel of the embodiment.
FIG. 73 is a detailed diagram of the display panel of the embodiment.
FIG. 80 is a detailed diagram of the display panel of the embodiment.
FIG. 81 is a detailed diagram of the display panel of the embodiment.
FIG. 82 is a detailed diagram of the display panel of the embodiment.
FIG. 83 is a detailed diagram of the display panel of the embodiment.
FIG. 84 is a detailed diagram of the display panel of the embodiment.
FIG. 85 is a detailed diagram of the display panel of the embodiment.
FIG. 86 is a detailed diagram of the display panel of the embodiment.
FIG. 87 is a detailed diagram of the display panel of the embodiment.
FIG. 89 is a detailed diagram of the display panel of the embodiment.
FIG. 90 is a detailed diagram of the display panel of the embodiment.
FIG. 91 is a detailed diagram of the display panel of the embodiment.
FIG. 93 is a detailed diagram of the display panel of the embodiment.
FIG. 94 is a detailed diagram of the display panel of the embodiment.
FIG. 95 is a detailed diagram of the display panel of the embodiment.
FIG. 96 is a detailed diagram of the display panel of the embodiment.
FIG. 102 is a detailed diagram of the display panel of the embodiment.
FIG. 107 is a detailed diagram of the display panel of the embodiment.
FIG. 108 is a detailed diagram of the display panel of the embodiment.
FIG. 109 is a detailed diagram of the display panel of the embodiment.

FIG. 110 is a detailed diagram of the display panel of the embodiment.

DETAILED DESCRIPTION OF THE PREFERRED EMBODIMENTS

An embodiment of the present invention shall now be described based on the drawings.

Figure 3:
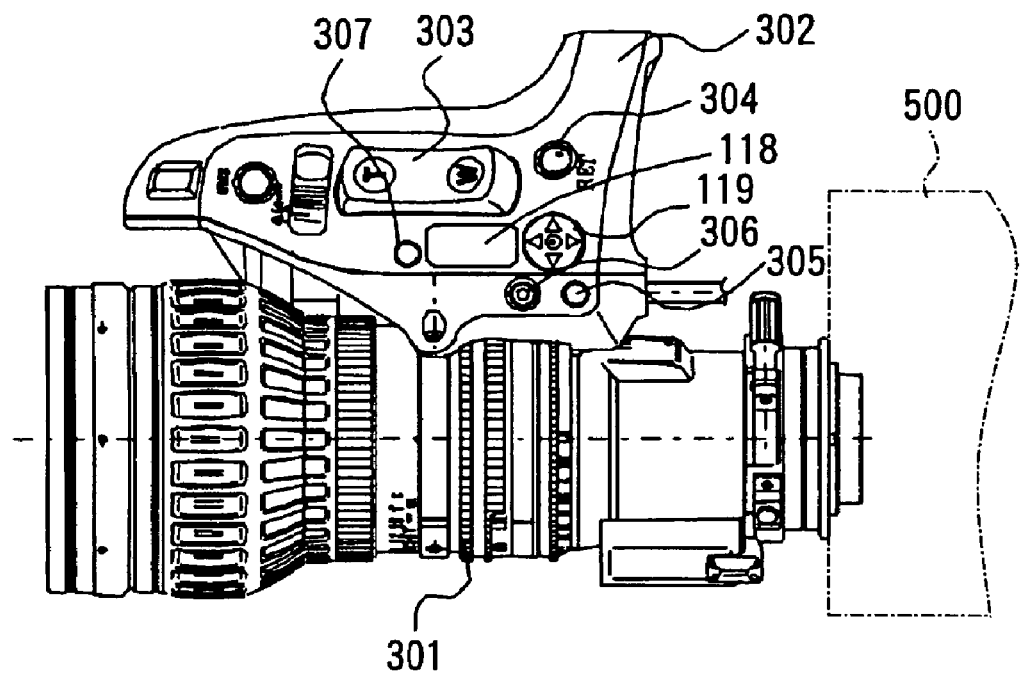
FIG. 3 is an external view of the television lens of the embodiment.
Figure 4:
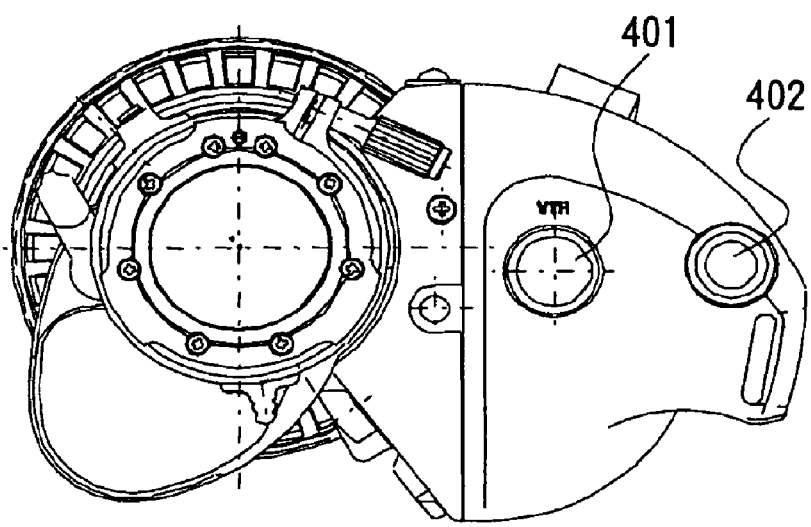
FIG. 4 is an external view of the television lens of the embodiment.

FIG. 3 and FIG. 4 show the entirety of a TV lens. In these figures, Reference Numeral 301 denotes a main lens body having an image-taking optical system in its interior and having manual rings for manual operation of focus, zoom, and iris. Reference Numeral 302 denotes a drive unit, which is detachably mounted to the main lens body 301 and has, housed in the interior thereof, motors, control boards, CPU, memory, etc., for electromotive driving of the manual rings. Reference Numeral 303 denotes a seesaw switch, which is operated for servo zoom drive, and when this switch is depressed in the direction of T or in the direction of W in the figure, the zoom is changed in the telephoto direction or the wide direction at a speed corresponding to the amount of depression. Reference Numeral 304 denotes a return switch, which returns signals to the camera in accordance with switch operations. Reference Numeral 401 denotes a VTR switch, which serves as a trigger for recording. The seesaw switch 303, return switch 304, and VTR switch 401 are the most basic switches related to television image-taking and, from the standpoint of passing on the operability of TV lenses, are positioned at the illustrated positions as they have been through the long history of TV lenses.

Reference Numeral 305 denotes a function switch A, and a single function, among various functions related to image-taking using the lens, can be assigned to this function switch A. For example, when a preset function is assigned to this switch, a cameraperson can store a present zoom position by simultaneously pressing a memory switch 306 and the function switch A. Thereafter, no matter at what position the zoom is set at, the zoom can be returned to the stored position by pressing this function switch A 305. Also, Reference Numeral 402 denotes a function switch B, and a single function, among the various functions related to image-taking using the lens, can be assigned to this function switch B as well. For example, if a function, by which a reciprocal zooming operation is performed upon pressing of a switch, is assigned to this switch, when a cameraperson continues to press the function switch B, the lens is zoomed to the telephoto end, and when the cameraperson's hand is released from the function switch B after focusing is performed at the telephoto end of shallow focal depth, the lens is returned to the original zoom position. This function can thus be used as an assist function for focusing. These function switches can also be set so that when a cameraperson is manually operating the lens, the function switch A or the function switch B will not function even if it is pressed, thus preventing sudden zoom movement upon erroneous operation of a switch.

Reference Numeral 118 denotes a liquid crystal display panel, disposed on the upper surface of the drive unit 302, and Reference Numeral 119 denotes a function setting switch for setting various functions of the lens related to image-taking. Reference Numeral 500 denotes a video camera to which the lens is connected (mounted).

Figure 5:
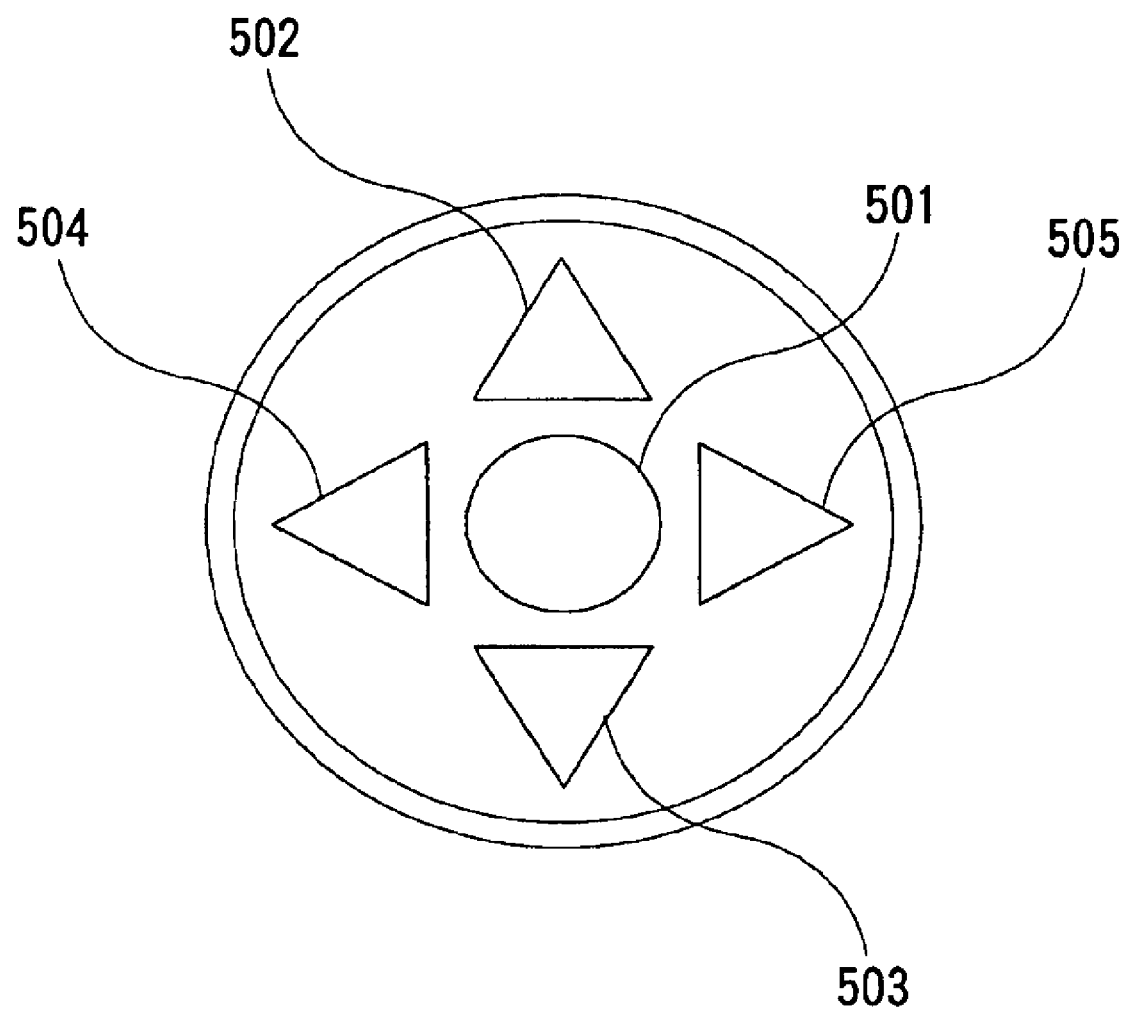
FIG. 5 is a detailed diagram of a switch of the embodiment.

FIG. 5 shows the function setting switch 119 in an enlarged manner. The function setting switch 119 that is shown in FIG. 5 comprises four arrow keys 502 to 505 and one select key 501 as shown in the figure, and by means of the four arrow keys 502 to 505, a cursor is moved in accordance with hierarchical menus, displayed on the display panel 118, to select a function from among a plurality of functions, and the selection is finalized by means of the select key 501.

307 in FIG. 3 denotes a display switch for turning ON/OFF the display on the display panel 118, and by arranging the display panel 118 to be lit only when necessary, the consumption power is reduced.

Figure 1:
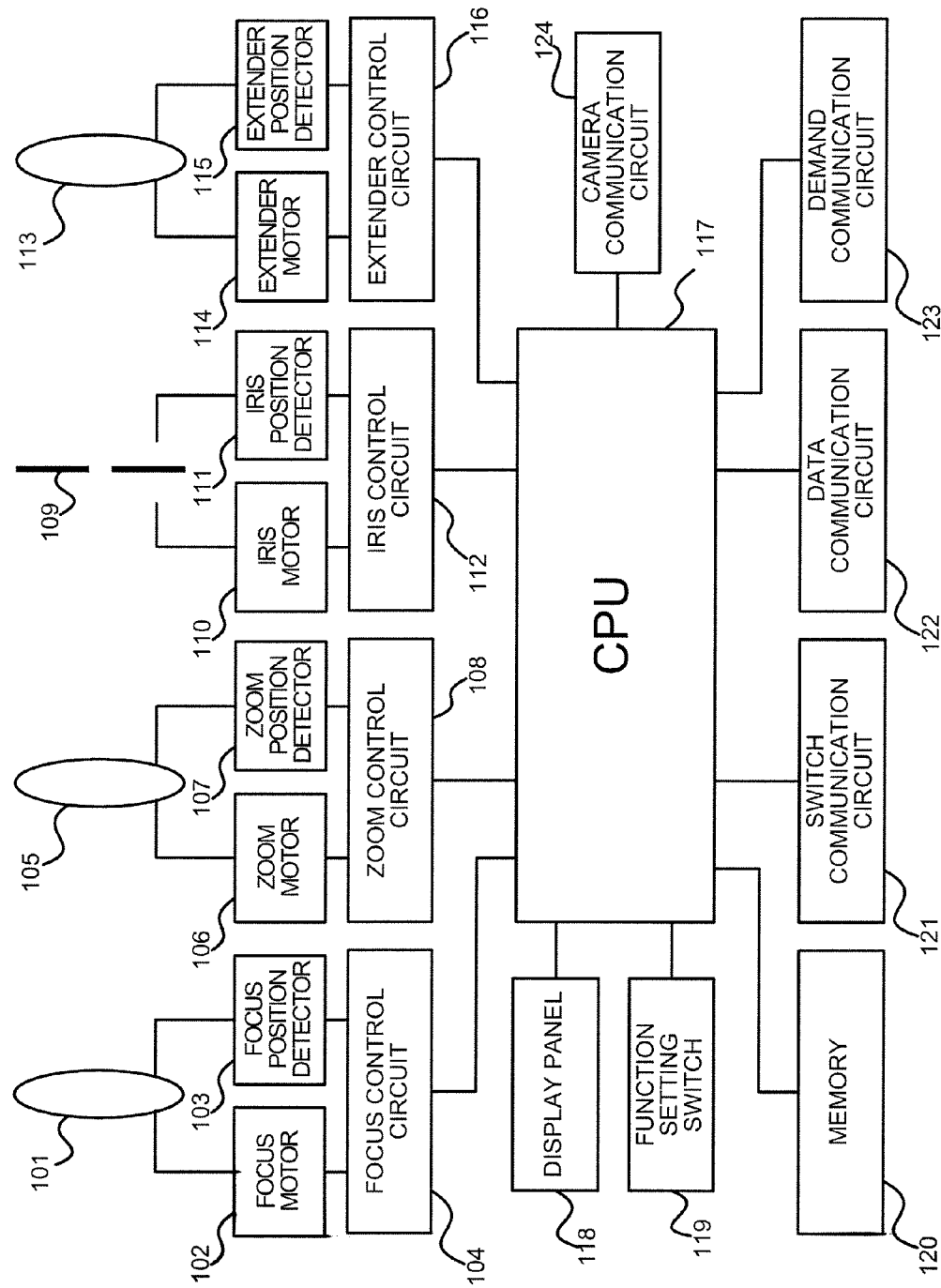
FIG. 1 is a block diagram of a television lens of an embodiment of the present invention.

The internal structure of the main lens body 301 is shown in FIG. 1.

In FIG. 1, Reference Numeral 101 denotes a focus lens optical system for performing focus adjustment. Reference Numeral 102 denotes a focus motor, driving the focus lens optical system 101. Reference Numeral 103 denotes a focus position detector, outputting a position signal in accordance with the position of the focus lens optical system 101. Reference Numeral 104 denotes a focus control circuit, controlling the focus lens optical system 101. Reference Numeral 105 denotes a zoom lens optical system for performing zoom adjustment. Reference Numeral 106 denotes a zoom motor, driving the zoom lens optical system 105. Reference Numeral 107 denotes a zoom position detector, outputting a position signal in accordance with the position of the zoom lens optical system 105. Reference Numeral 108 denotes a zoom control circuit, controlling the zoom lens optical system 105. Reference Numeral 109 denotes iris blades for performing aperture adjustment. Reference Numeral 110 denotes an iris motor, driving the iris blades 109. Reference Numeral 111 denotes an iris position detector, outputting a position signal in accordance with the positions of iris blades 109. Reference Numeral 112 denotes an iris control circuit, controlling the iris blades 109.

Reference Numeral 113 denotes an extender optical system for changing the focal length to 1.5 times or 2.0 times, etc. Reference Numeral 114 denotes an extender motor, driving the extender optical system 113. Reference Numeral 115 denotes an extender position detector, outputting a position signal in accordance with the position of the extender optical system 113. Reference Numeral 116 denotes an extender control circuit, controlling the extender lens optical system 113.

Reference Numeral 117 denotes a CPU which is a controller that governs the control parts including the display panel 118 of the present embodiment, Reference Numeral 118 denotes the liquid crystal display panel, disposed on the upper surface of the drive unit 302. Reference Numeral 119 denotes the function setting switch for setting various functions of the lens related to image-taking. Reference Numeral 120 denotes a memory, storing default setting information and user setting information for various functions and characteristics of the lens related to image-taking. Here, the default setting information is non-rewritable data and the user setting information is rewritable data. Reference Numeral 121 denotes a switch communication circuit which communicates with the various switches mounted on the drive unit 302. Reference Numeral 122 denotes a data communication circuit which communicates with the exterior of the lens. Reference Numeral 123 denotes a demand communication circuit which communicates with various demands. Reference Numeral 124 denotes a camera communication circuit which communicates with the television camera.

Figure 2:
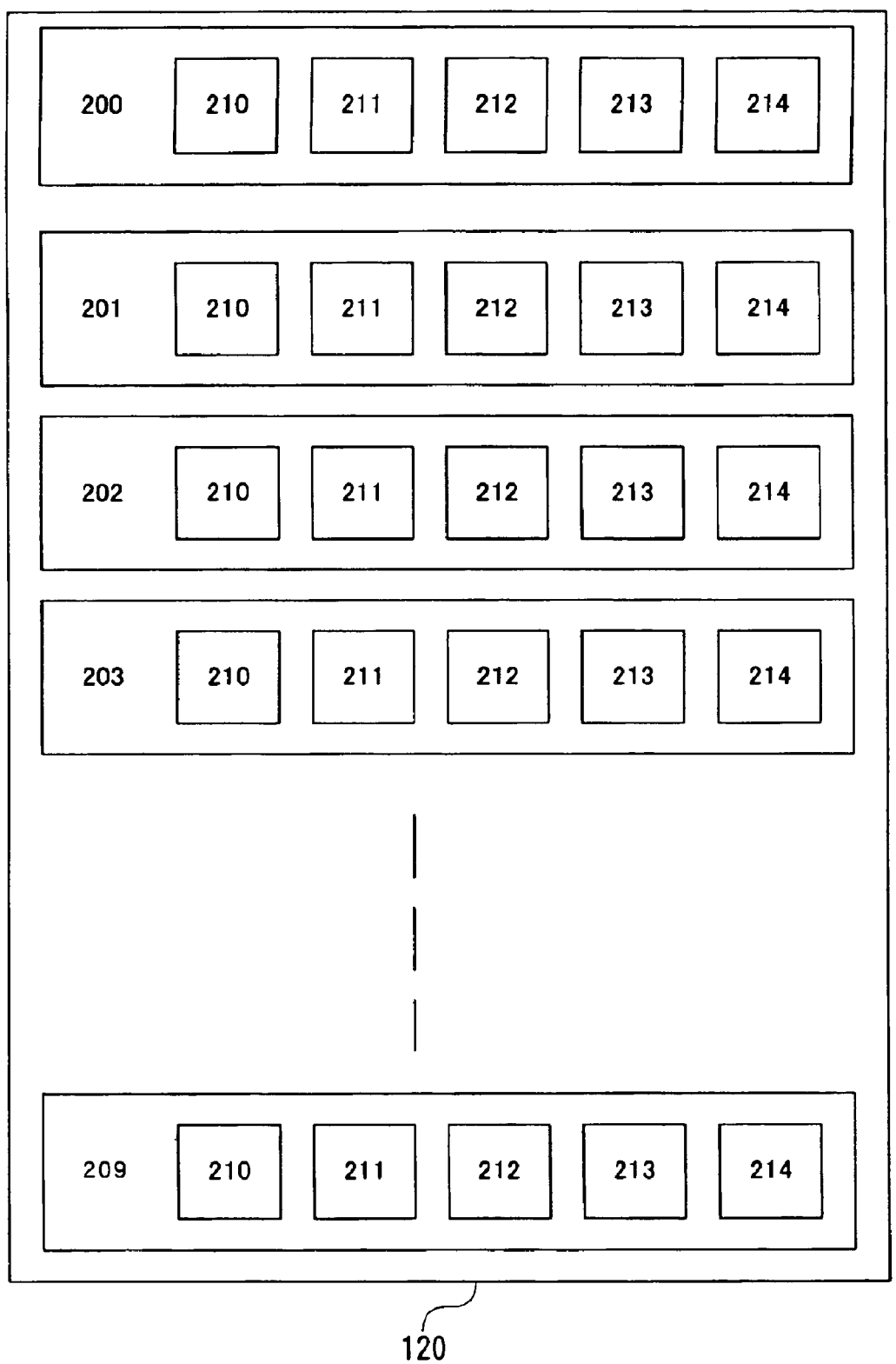
FIG. 2 is an internal block diagram of a memory of the embodiment.

FIG. 2 shows the internal structure of the memory 120. As shown in the figure, the memory 120 is divided in to a plurality of regions 200, 201, 202, and 203 to 209 corresponding to a plurality of users (ten users in the embodiment), and five function setting regions are assigned inside each region. Reference Numeral 210 denotes a function assignment information storage region for the various switches mounted to the drive unit 302, Reference Numeral 211 denotes a preset operation characteristics information storage region, Reference Numeral 212 denotes an iris operation characteristics information storage region, Reference Numeral 213 denotes a zooming characteristics information storage region, and Reference Numeral 214 denotes a focusing characteristics information storage region. The five regions from 210 to 214 can be set individually according to each of the regions 201 to 209 using the display panel 118 and the function setting switch 119. Here, just the region (a first memory) 200 is arranged as a non-rewritable region for the default setting information, and each of the regions 201 to 209 is arranged as a rewritable region for the user setting information.

A method of setting functions related to the operational characteristics of the lens using the display panel 118 and the function setting switch 119 and the operations that are carried out when writing or rewriting into the memory 120 is performed with the above-described arrangement shall now be described in detail based on the drawings.

Figure 7:
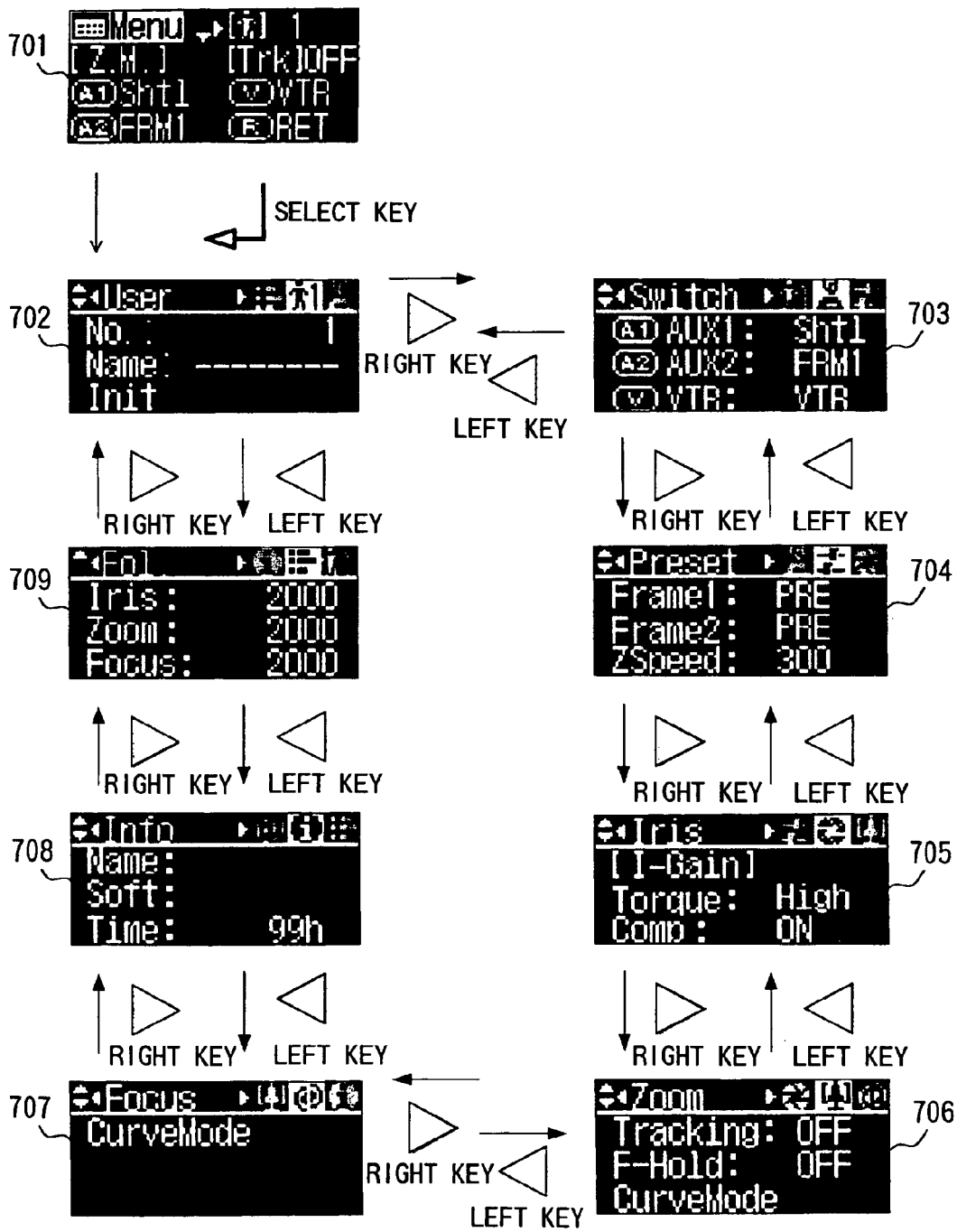
FIG. 7 is a detailed diagram of the display panel of the embodiment.

When the power to the lens is turned on in step S601, a startup menu 701, which is shown in FIG. 7, is displayed on the display panel 118 in step S602. In step S603, the cursor position on the display panel 118 is set to the Menu function at the upper left corner. In step S604, the operation of the function setting switch 119 is awaited. When any of the four arrow keys 502 to 505 or the select key 501 is operated, step S605 is entered.

In step S605, it is judged whether or not the select key 501 has been operated, and if the select key 501 has been operated, step S606 is entered while if a key besides the select key 501 has been operated, step S609 is entered. In step S606, it is judged whether or not the cursor is currently positioned at the Menu function, and if the cursor is at the Menu function, step S607 is entered while if the cursor is not at the Menu function, step S608 is entered. In step S607, a transition to a first tier User menu, which is divided according to the respective functions, is carried out.

FIG. 7 is a diagram showing the display flow of the display panel 118, which is divided according to the respective functions. In the figure, by setting the cursor on the Menu function in the startup menu 701 using the four arrow keys 502 to 505 of the function setting switch 119 and then operating the select key 501, the first tier User function menu is displayed first on the display panel 118 as shown in 702 of FIG. 7. The respective first tier function menus 703 to 709 of FIG. 7 can then be displayed by operating the left arrow key 504 or the right arrow key 505.

The items besides the Menu function in the startup menu 701 of FIG. 7 and the respective operations of step S608 to step S619 of FIG. 6 shall be described later.

Figure 8A:
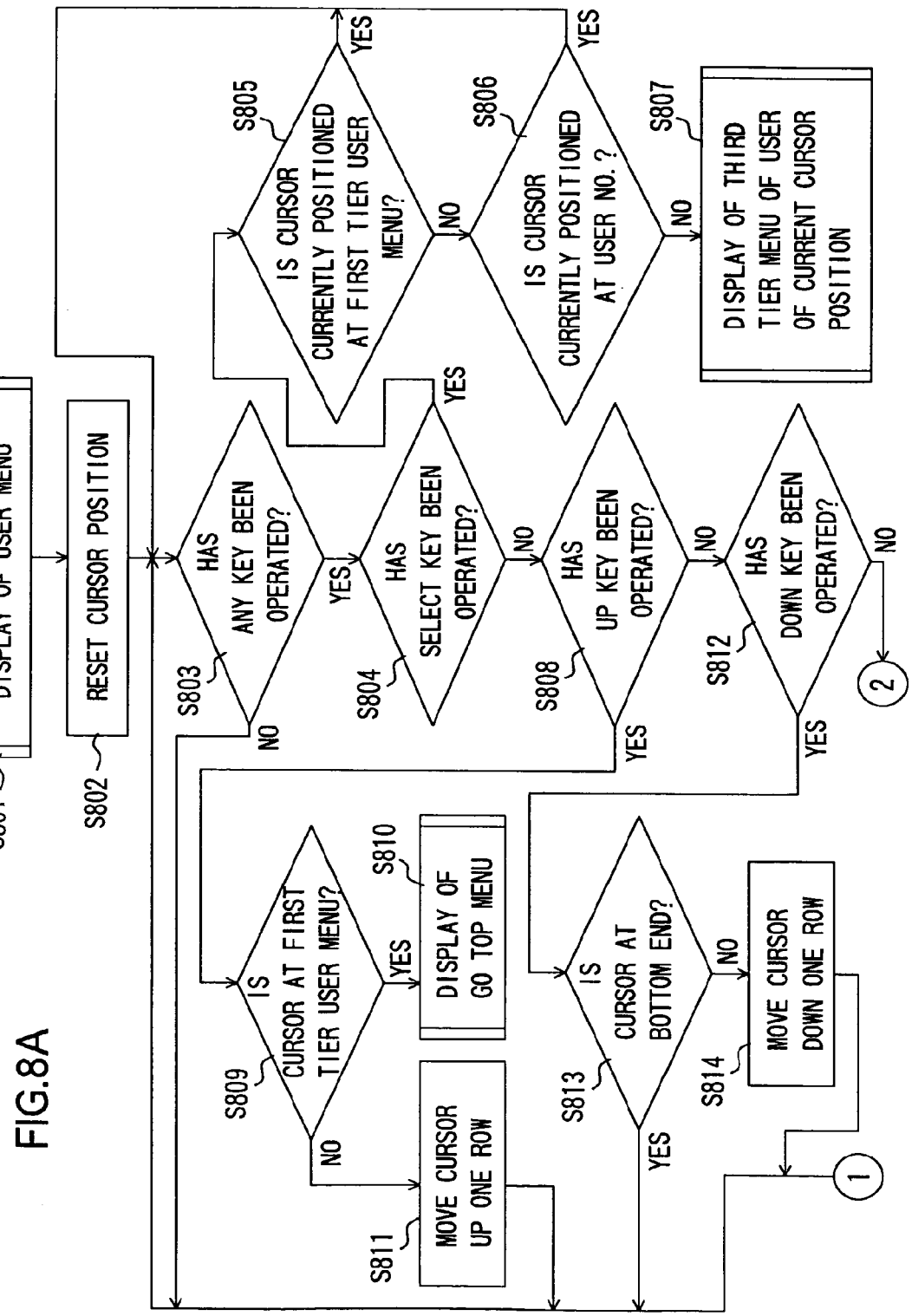
FIG. 8 is a display operation flowchart of the embodiment.
Figure 8B:
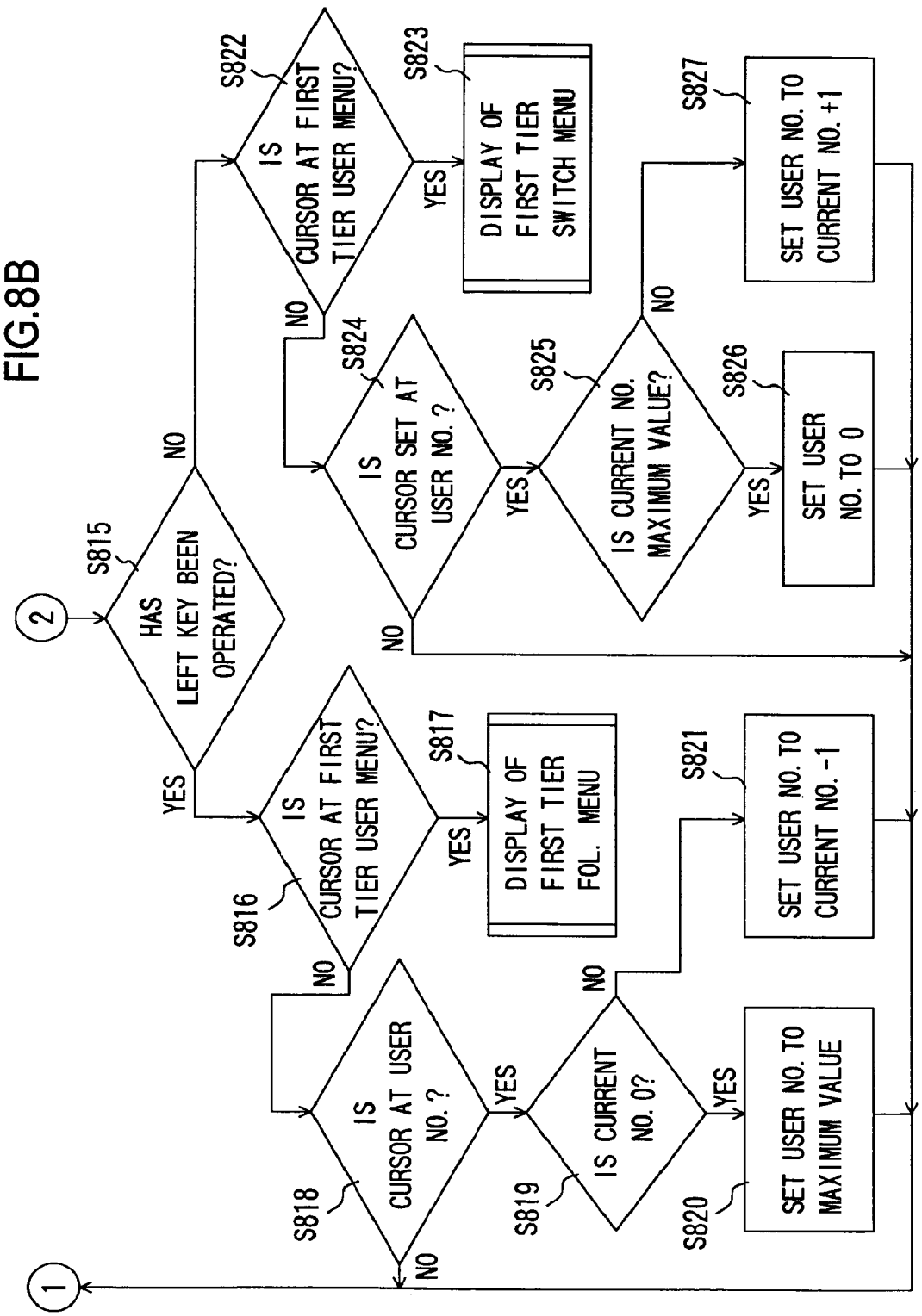

FIGS. 8A and 8B show the operation flow for the first tier and second tier User function menus, and in step S801, the display of the display panel 118 is renewed as shown in 702 of FIG. 7. Portions where the same circled number are added in these flowcharts are connected with each other, and this is the same for other flowcharts.

In step S802, the cursor position is set at the first tier User menu icon.

In step S803, the operation of the function setting switch 119 is awaited. When any of the four arrow keys 502 to 505 or the select key 501 is operated, step S804 is entered. In step S804, it is judged whether or not the select key 501 has been operated, and if the select key 501 has been operated, step S805 is entered while if a key besides the select key 501 has been operated, step S808 is entered. In step S805, it is judged whether or not the cursor is currently positioned at the first tier User menu icon, and if the cursor is at the first tier User menu icon, step S803 is entered and the operation of the function setting switch 119 is awaited again. If the cursor is set at a position besides the first tier User menu icon, step S806 is entered.

In step S806, it is judged whether or not the cursor is currently positioned at the second tier User No. position, and if the cursor is at the second tier User No. position, step S803 is entered and the operation of the function setting switch 119 is awaited again. If the cursor is set at a position besides the second tier User No. position, step S807 is entered. In step S807, a transition to a third tier User menu, corresponding to the current cursor position, is carried out.

In step S808, it is judged whether or not the up arrow key 502 has been operated and if the up arrow key 502 has been operated, step S809 is entered while if a key besides the up arrow key 502 has been operated, step S812 is entered. In step S809, it is judged whether or not the cursor is currently positioned at the first tier User menu icon, and if the cursor is at the first tier User menu icon, step S810 is entered while if the cursor is set at a position besides the first tier User menu icon, step S811 is entered.

In step S810, a transition confirmation menu (GO TOP menu), which is shown in FIG. 9 and is for choosing between returning or not returning the display on the display panel 107 to the startup menu, is displayed. Here, if the startup menu is to be returned to, the select key 501 is operated, and if not, the down arrow key 503 is operated and the first tier User menu is displayed again.

As the abovementioned transition confirmation menu, the same transition confirmation menu is displayed from all of the first tier function menus 702 to 709. If the transition to the startup menu is performed immediately when the up arrow key 502 is operated erroneously in a first tier function menu, then, for example, one select key operation and four arrow key operations will become necessary to go to the first tier Zoom function menu 706. There will thus be a problem in terms of operability. By interposing a transition confirmation menu, this operability can be improved.

In step S811, the cursor position is moved up one row and then step S803 is entered, upon which the operation of the function setting switch 119 is awaited again.

In step S812, it is judged whether or not the down arrow key 503 has been operated and if the down arrow key 503 has been operated, step S813 is entered while if a key besides the down arrow key 503 has been operated, step S815 is entered. In step S813, it is judged whether or not the cursor is currently positioned at the bottom end of the functions assigned to the second tier User menu, and if the cursor is set at the bottom end of the functions assigned to the second tier User menu, step S803 is entered and the operation of the function setting switch 119 is awaited again.

If the cursor is set at a position besides the bottom end of the functions assigned to the second tier User menu, step S814 is entered. In step S814, the cursor position is moved down one row and then step S803 is entered, upon which the operation of the function setting switch 119 is awaited again. In step S815, it is judged whether or not the left arrow key 504 has been operated and if the left arrow key 504 has been operated, step S816 is entered while if a key besides the left arrow key 504 has been operated, step S822 is entered. In step S816, it is judged whether or not the cursor is currently positioned at the first tier User menu icon, and if the cursor is at the first tier User menu icon, step S817 is entered while if the cursor is set at a position besides the first tier User menu icon, step S818 is entered. In step S817, a transition to a first tier Fol. menu, which is divided according to the respective functions, is carried out.

In step S818, it is judged whether or not the cursor is currently positioned at the second tier User No. position, and if the cursor is at the second tier User No. position, step S819 is entered while if the cursor is at a position besides the second tier User No. position, step S803 is entered, upon which the operation of the function setting switch 119 is awaited again.

In step S819, it is judged whether or not the current User No. is 0 and if the User No. is 0, step S820 is entered while if the User No. is a number besides 0, step S821 is entered. In step S820, the User No. is set to the maximum value (ten in the embodiment) that can be stored in the memory 120 inside the lens, the respective function settings of the User No. of the maximum value that is set are read from the memory 120 to initialize the state of the lens, and thereafter, the display on the display panel 118 is renewed to the User No. that is set and step S803 is entered, upon which the operation of the function setting switch 119 is awaited again.

In step S821, a value obtained by shifting the current User No. down by one is set as the User No., and as in step S820, the respective function settings of the User No. that is set are read from the memory 120 to initialize the state of the lens, and thereafter, the display on the display panel 118 is renewed to the User No. which is set and step S803 is entered, upon which the operation of the function setting switch 119 is awaited again.

In step S822, it is judged whether or not the cursor is currently positioned at the first tier User menu icon, and if the cursor is at the first tier User menu icon, step S823 is entered while if the cursor is set at a position besides the first tier User menu icon, step S824 is entered. In step S823, a transition to a first tier Switch menu, which is divided according to the respective functions, is carried out.

In step S824, it is judged whether or not the cursor is currently positioned at the User No. position, and if the cursor is at the User No. position, step S825 is entered while if the cursor is at a position besides the User No. position, step S803 is entered, upon which the operation of the function setting switch 119 is awaited again.

In step S825, it is judged whether or not the current User No. is the maximum value that can be stored in the memory 120 inside the lens and if the User No. is the maximum value, step S826 is entered while if the User No. is a number besides the maximum value, step S827 is entered. In step S826, the User No. is set to 0, the respective function settings of the User No. which is set are read from the memory 120 to initialize the state of the lens, and thereafter, the display on the display panel 118 is renewed to the User No. that is set and step S803 is entered, upon which the operation of the function setting switch 119 is awaited again. In step S827, a value obtained by shifting the current User No. upwards by one is set as the User No., and as in step S826, the respective function settings of the User No. that is set are read from the memory 120 to initialize the state of the lens, and thereafter, the display on the display panel 118 is renewed to the User No. which is set and step S803 is entered, upon which the operation of the function setting switch 119 is awaited again.

The User No. setting procedure shall now be described. When the down arrow key 503 is operated in the first tier User menu, the display on the display panel 118 is renewed as shown in FIG. 10. By operating the left arrow key 504 or the right arrow key 505 with the cursor being positioned at User No., the User No. is changed. The User Nos. correspond to the respective storage regions 200 to 209 shown in FIG. 2. By changing the User No., the stored information in the respective function operation storage regions 210 to 214 of the corresponding region (any of 200 to 209) are read from the memory 120 and the CPU 117 initializes the respective functions and operation characteristics based on the stored information that is read.

Figure 11B:
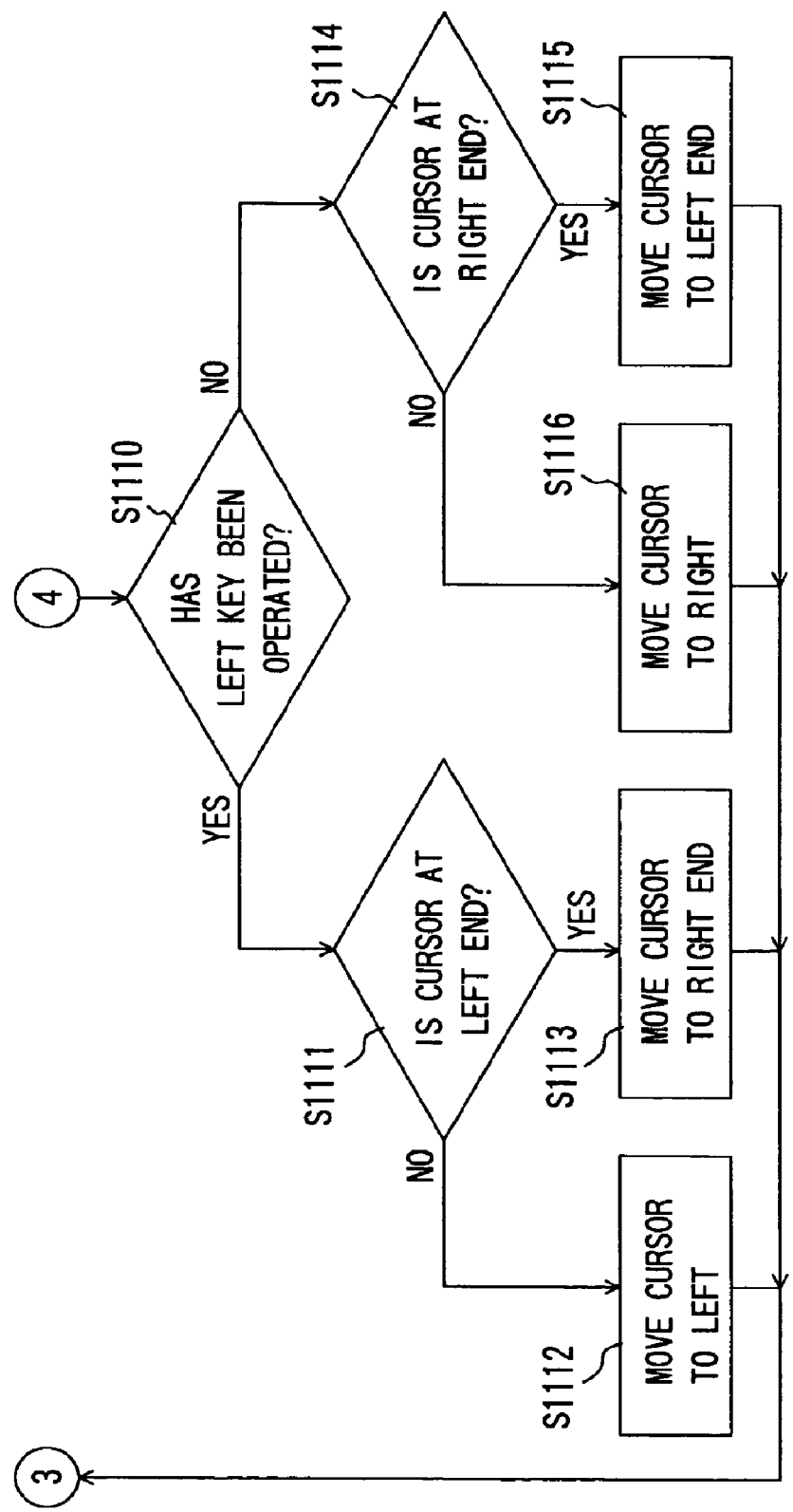
FIG. 11 is a display operation flowchart of the embodiment.
Figure 12:
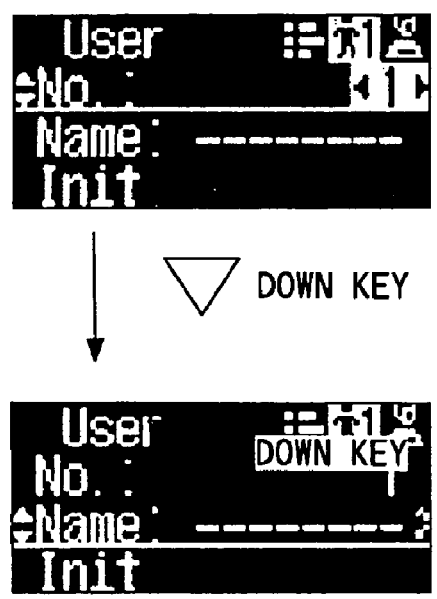
FIG. 12 is a detailed diagram of the display panel of the embodiment.
Figure 13:
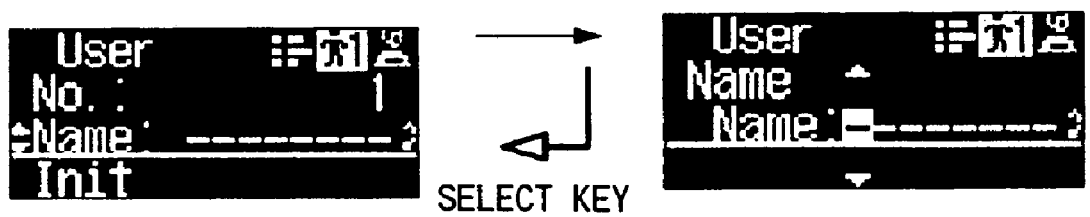
FIG. 13 is a detailed diagram of the display panel of the embodiment.

FIGS. 11A and 11B show the operation flow for a third tier User Name setting menu, and by this flow, an arbitrary Name can be stored for each of the abovementioned User Nos. When it is judged in step 807 of FIG. 8A that the cursor is positioned at the second tier User Name position, the third tier User Name setting menu, which is shown in FIG. 12 and FIG. 13, is displayed on the display panel 118 in step 1101. In step S1102, the cursor position is set at the position of the first character of the User Name.

In step S1103, the operation of the function setting switch 119 is awaited. When any of the four arrow keys 502 to 505 or the select key 501 is operated, step S1104 is entered. In step S1104, it is judged whether or not the select key 501 has been operated, and if the select key 501 has been operated, step S1105 is entered while if a key besides the select key 501 has been operated, step S1106 is entered.

In step S1105, the character string, Name, which has been set, is stored in the memory 120 and a return to the second tier User menu is carried out. In step S1106, it is judged whether or not the up arrow key 502 has been operated and if the up arrow key 502 has been operated, step S1107 is entered while if a key besides the up arrow key 502 has been operated, step S1108 is entered. In step S1107, the character at the current cursor position is changed to that which is one prior in the order of characters. Here, the order of characters that can be entered is: the capital alphabet characters A to Z, then the lower case alphabet characters a to z, and then the numerals 0 to 9. After the change of character, step S1103 is entered, upon which the operation of the function setting switch 119 is awaited again. In step S1108, it is judged whether or not the down arrow key 503 has been operated and if the down arrow key 503 has been operated, step S1109 is entered while if a key besides the down arrow key 503 has been operated, step S1110 is entered. In step S1109, the character at the current cursor position is changed to that which is one subsequent in the order of characters. After the change of character, step S1103 is entered, upon which the operation of the function setting switch 119 is awaited again.

In step S1110, it is judged whether or not the left arrow key 504 has been operated and if the left arrow key 504 has been operated, step S1111 is entered while if a key besides the left arrow key 504 has been operated, step S1114 is entered. In step S1111, it is judged whether or not the cursor is currently positioned at the head (left end) of the character string that can be entered, and if the cursor is currently positioned at the head, step S1113 is entered while if the cursor is at a position besides the head, step S1112 is entered.

In step S1113, the cursor position is moved to the last character position (right end) at which an entry can be set and then step S1103 is entered, upon which the operation of the function setting switch 119 is awaited again.

In step S1112, the cursor position is moved leftward by one, and then step S1103 is entered, upon which the operation of the function setting switch 119 is awaited again. In step S1114, it is judged whether or not the cursor is currently positioned at the last character position, and if the cursor is currently positioned at the last character position, step S1115 is entered while if the cursor is at a position besides the last character position at which a setting entry can be made, step S1116 is entered.

In step S1115, the cursor position is moved to the head of the character string and step S1103 is entered, upon which the operation of the function setting switch 119 is awaited again. In step S1116, the cursor position is moved rightward by one, and then step S1103 is entered, upon which the operation of the function setting switch 119 is awaited again. After thus setting a suitable Name, the select key 501 is operated to store the characters of the Name, which has been set, in the memory 120.

Figure 14A:
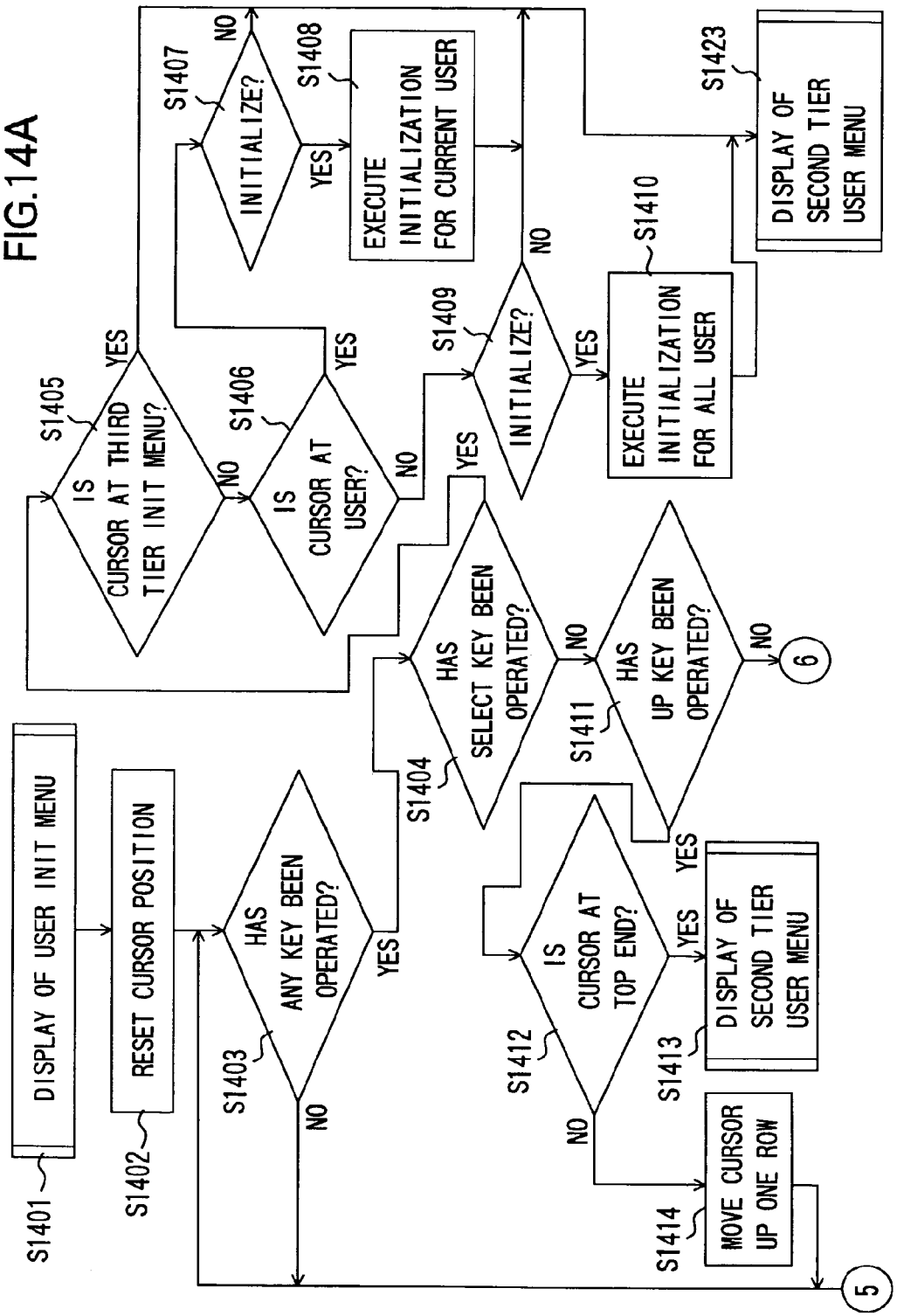
FIG. 14 is a display operation flowchart of the embodiment.
Figure 14B:
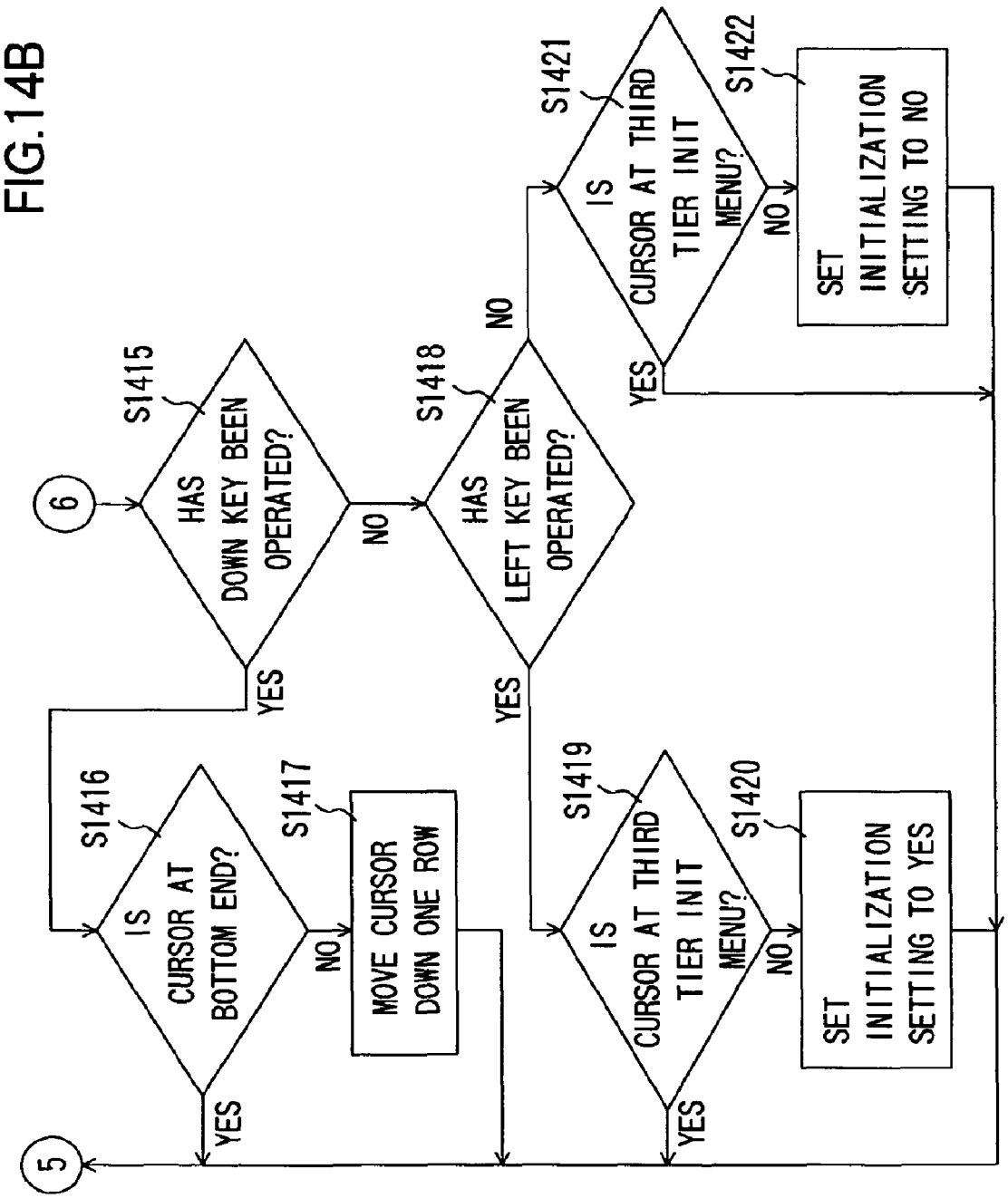

FIGS. 14A and 14B show the operation flow for a third tier User Init setting menu, and when it is judged in step 807 of FIG. 8A that the cursor is positioned at the second tier User Init position as shown in FIG. 15, the third tier User Init setting menu, shown in FIG. 16, is displayed on the display panel 118 in step 1401 of FIG. 14A.

In step S1402, the cursor position is set at the third tier Init menu. In step S1403, the operation of the function setting switch 119 is awaited. When any of the four arrow keys 502 to 505 or the select key 501 is operated, step S1404 is entered. In step S1404, it is judged whether or not the select key 501 has been operated, and if the select key 501 has been operated, step S1405 is entered while if a key besides the select key 501 has been operated, step S1411 is entered. In step S1405, it is judged whether or not the cursor is currently positioned at the third tier User Init setting menu and if the cursor is at the third tier User Init setting menu, step S1423 is entered while if the cursor is at a position besides the third tier User Init setting menu, step S1406 is entered.

In step S1423, a transition to the second tier User menu is carried out. In step S1406, it is judged whether or not the cursor is currently positioned at the User position and if the cursor is set at User, step S1407 is entered while if the cursor is set at a position besides that of User, step S1409 is entered. In step S1407, the User Init mode is judged and if the User Init mode is the initialization mode, step S1408 is entered while if it is not, step S1423 is entered. In step S1408, the setting information of the respective functions for the current User No. is initialized to the default setting information. The default setting information here refers to non-rewritable data stored in the abovementioned region 200 of FIG. 2.

In step S1409, the All User mode is judged and if the All User mode is the initialization mode, step S1410 is entered while if it is not, step S1423 is entered. In step S1410, the setting information of the respective functions for each of all User No. regions is initialized to the default setting information. In step S1411, it is judged whether or not the up arrow key 502 has been operated, and if the up arrow key 502 has been operated, step S1412 is entered while if a key besides the up arrow key 502 has been operated, step S1415 is entered.

In step S1412, it is judged whether or not the cursor is currently positioned at the top end, and if the cursor is positioned at the top end, step S1413 is entered while if the cursor is positioned at a position besides the top end, step S1414 is entered.

In step S1413, a transition to the second tier User Menu is carried out. In step S1414, the cursor position is moved up one row, and then step S1403 is entered, upon which the operation of the function setting switch 119 is awaited again. In step S1415, it is judged whether or not the down arrow key 503 has been operated and if the down arrow key 503 has been operated, step S1416 is entered while if a key besides the down arrow key 503 has been operated, step S1418 is entered.

In step S1416, it is judged whether or not the cursor is currently positioned at the bottom end, and if the cursor is positioned at the bottom end, step S1403 is entered, upon which the operation of the function setting switch 119 is awaited again. If the cursor is positioned at a position besides the bottom end, step S1417 is entered.

In step S1417, the cursor position is moved down one row and then step S1403 is entered, upon which the operation of the function setting switch 119 is awaited again.

In step S1418, it is judged whether or not the left arrow key 504 has been operated, and if the left arrow key 504 has been operated, step S1419 is entered while if a key besides the left arrow key 504 has been operated, step S1421 is entered. In step S1419, it is judged whether or not the cursor is currently positioned at the third tier User Init setting menu, and if the cursor is positioned at the third tier User Init setting menu, step S1403 is entered and the operation of the function setting switch 119 is awaited again. If the cursor is positioned at a position besides the third tier User Init setting menu, the Init mode of the current cursor position is set to YES and step S1403 is entered, upon which the operation of the function setting switch 119 is awaited again.

In step S1421, it is judged whether or not the cursor is currently positioned at the third tier User Init setting menu, and if the cursor is positioned at the third tier User Init setting menu, step S1403 is entered and the operation of the function setting switch 119 is awaited again. If the cursor is positioned at a position besides the third tier User Init setting menu, the Init mode of the current cursor position is set to NO and step S1403 is entered, upon which the operation of the function setting switch 119 is awaited again.

Figure 18:
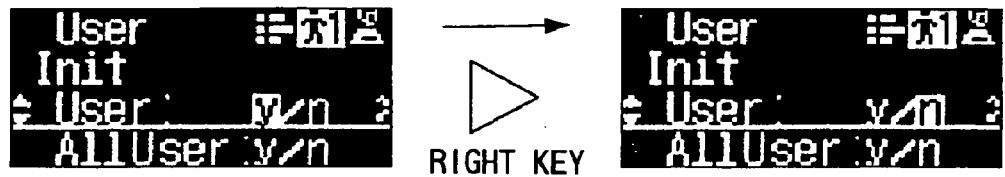
FIG. 18 is a detailed diagram of the display panel of the embodiment.
Figure 19:
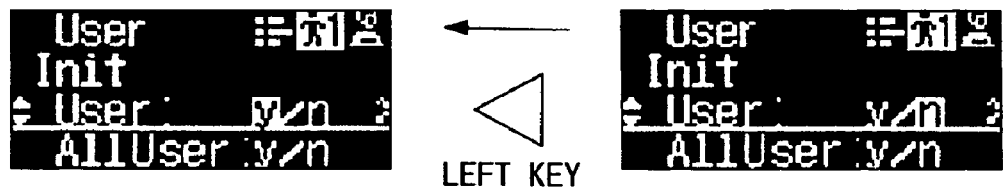
FIG. 19 is a detailed diagram of the display panel of the embodiment.

The User Init procedure shall now be described. When the select key 501 is operated in the second tier User setting menu, the display on the display panel 118 is renewed as shown in FIG. 16. When the down arrow key 503 is operated, the display on the display panel 118 is renewed as shown in FIG. 17. When the left arrow key 504 is operated here, the Init mode becomes YES as shown in FIG. 19. When the right arrow key 505 is operated here, the Init mode becomes NO as shown in FIG. 18. Last, when the select key is operated, the setting information of the respective functions for the current User No. is initialized.

Figure 20:
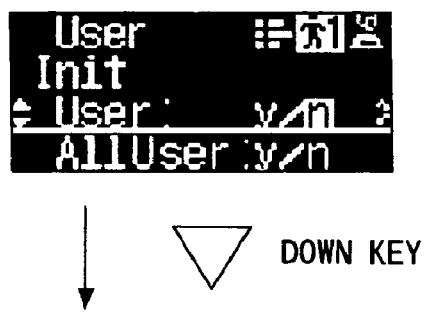
FIG. 20 is a detailed diagram of the display panel of the embodiment.
Figure 21:
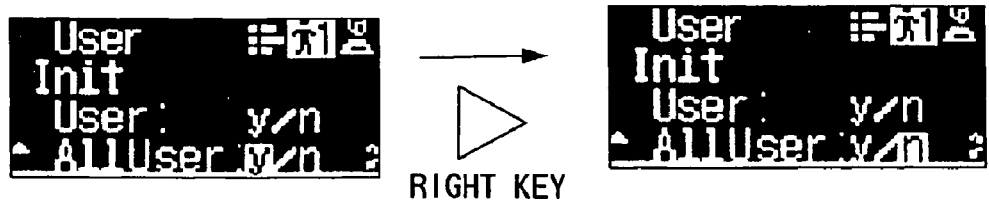
FIG. 21 is a detailed diagram of the display panel of the embodiment.
Figure 22:
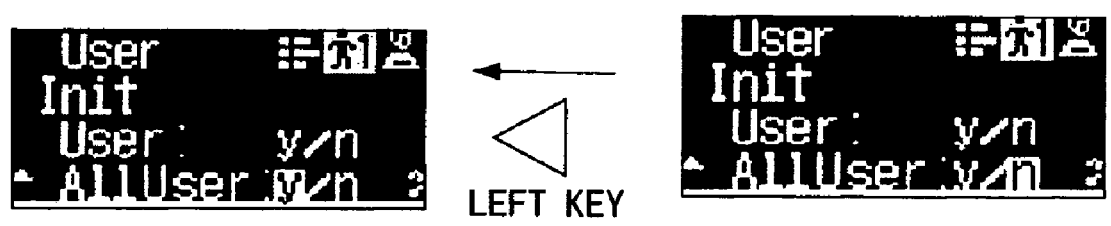
FIG. 22 is a detailed diagram of the display panel of the embodiment.

Likewise, with the initialization procedure for all User Nos., the down arrow key 503 is operated as shown in FIG. 20 to move the cursor to All User. The left arrow key 504 or the right arrow key 505 is then operated to select the Init mode as shown in FIG. 21 or 22. Last, when the select key 50 is operated, the setting information of the respective functions for all User Nos. is initialized.

Figure 23A:
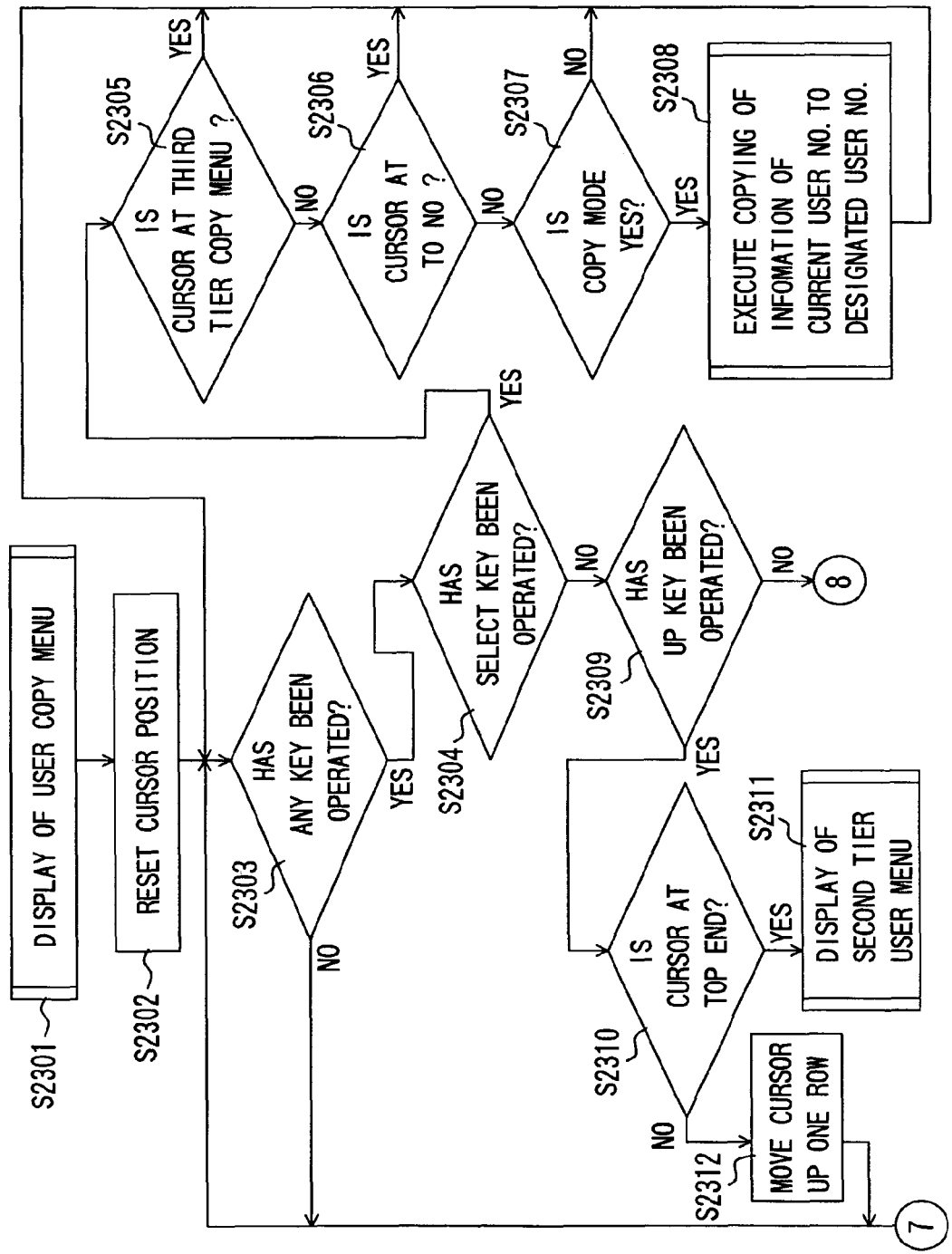
FIG. 23 is a display operation flowchart of the embodiment.
Figure 24:
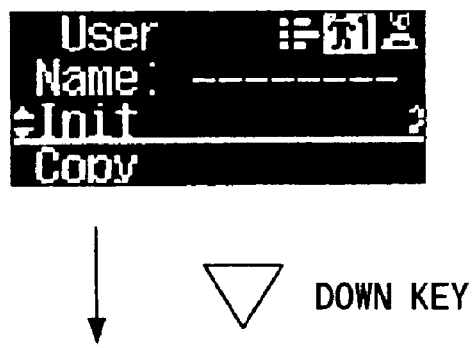
FIG. 24 is a detailed diagram of the display panel of the embodiment.
Figure 25:
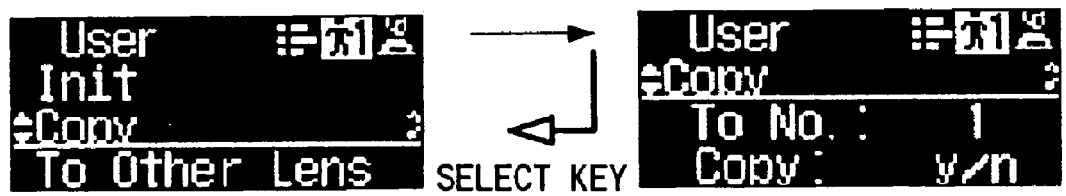
FIG. 25 is a detailed diagram of the display panel of the embodiment.
Figure 26:
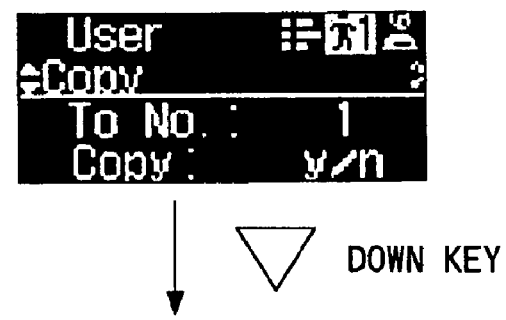
FIG. 26 is a detailed diagram of the display panel of the embodiment.

FIGS. 23A and 23B show the operation flow for a third tier User Copy setting menu, and when it is judged in step 807 of FIG. 8 that the cursor is positioned at the second tier User Copy position as shown in FIG. 24 and FIG. 25, the third tier User Copy setting menu, shown in FIG. 25, is displayed on the display panel 118 in step 2301 of FIGS. 23A and 23B. In step S2302, the cursor is positioned at the third tier Copy menu. In step S2303, the operation of the function setting switch 119 is awaited. When any of the four arrow keys 502 to 505 or the select key 501 is operated, step S2304 is entered.

In step S2304, it is judged whether or not the select key 50 has been operated, and if the select key 501 has been operated, step S2305 is entered while if a key besides the select key 501 has been operated, step S2309 is entered. In step S2305, it is judged whether or not the cursor is currently positioned at the third tier User Copy setting menu and if the cursor is positioned at the third tier User Copy setting menu, step S2303 is entered and the operation of the function setting switch 119 is awaited again.

If the cursor is positioned at a position besides the third tier User Copy setting menu, step S2306 is entered. In step S2306, it is judged whether or not the cursor is currently positioned at the To No position and if the cursor is set at the To No position, step S2303 is entered and the operation of the function setting switch 119 is awaited again. If the cursor is set at a position besides the To No position, step S2307 is entered. In step S2307, the User Copy mode is judged and if the User Copy mode is YES, step S2308 is entered while if it is not, step S2303 is entered and the operation of the function setting switch 119 is awaited again. In step S2308, the respective function setting information of the current User No. are copied into the User No. designated at To No.

In step S2309, it is judged whether or not the up arrow key 502 has been operated, and if the up arrow key 502 has been operated, step S2310 is entered while if a key besides the up arrow key 502 has been operated, step S2313 is entered. In step S2310, it is judged whether or not the cursor is currently positioned at the top end, and if the cursor is positioned at the top end, step S2311 is entered while if the cursor is positioned at a position besides the top end, step S2312 is entered. In step S2311, a transition to the second tier User menu is carried out.

In step S2312, the cursor position is moved up one row, and then step S2303 is entered, upon which the operation of the function setting switch 119 is awaited again. In step S2313, it is judged whether or not the down arrow key 503 has been operated and if the down arrow key 503 has been operated, step S2314 is entered while if a key besides the down arrow key 503 has been operated, step S2316 is entered. In step S2314, it is judged whether or not the cursor is currently positioned at the bottom end, and if the cursor is positioned at the bottom end, step S2303 is entered and the operation of the function setting switch 119 is awaited again. If the cursor is positioned at a position besides the bottom end, step S2315 is entered.

In step S2315, the cursor position is moved down one row and then step S2303 is entered, upon which the operation of the function setting switch 119 is awaited again. In step S2316, it is judged whether or not the left arrow key 504 has been operated, and if the left arrow key 504 has been operated, step S2317 is entered while if a key besides the left arrow key 504 has been operated, step S2323 is entered. In step S2317, it is judged whether or not the cursor is currently positioned at the third tier User Copy menu, and if the cursor is positioned at the third tier User Copy setting menu, step S2303 is entered and the operation of the function setting switch 119 is awaited again. If the cursor is positioned at a position besides the third tier User Copy setting menu, step S2318 is entered. In step S2318, it is judged whether or not the cursor is currently positioned at the To No. position and if the cursor is currently positioned at the To No. position, step S2319 is entered while if the cursor is currently positioned at a position besides the To No. position, step S2322 is entered. In step S2319, it is judged whether or not the current To No. value is the maximum value, and if the current To No. value is the maximum value, step S2320 is entered while if the current To No. value is a value besides the maximum value, step S2321 is entered.

In step S2320, the To No. value is set to 1 and then step S2303 is entered, upon which the operation of the function setting switch 119 is awaited again. In step S2321, the To No. value is shifted down by one, and then step S2303 is entered, upon which the operation of the function setting switch 119 is awaited again. In step S2322, the Copy mode is set to YES, and then step S2303 is entered, upon which the operation of the function setting switch 119 is awaited again. In step S2323, it is judged whether or not the cursor is currently positioned at the third tier User Copy setting menu, and if the cursor is positioned at the third tier User Copy setting menu, step S2303 is entered and the operation of the function setting switch 119 is awaited again. If the cursor is positioned at a position besides the third tier User Copy setting menu, step S2324 is entered.

In step S2324, it is judged whether or not the cursor is currently positioned at the To No. position, and if the cursor is currently positioned at the To No. position, step S2325 is entered while if the current To No. value is a value besides the maximum value, step S2328 is entered.

In step S2325, it is judged whether or not the current To No. value is the minimum value, and if the current To No. value is the minimum value, step S2326 is entered while if the current To No. value is a value besides the minimum value, step S2327 is entered. In step S2326, the To No. is set to the maximum value and then step S2303 is entered, upon which the operation of the function setting switch 119 is awaited again. In step S2327, the To No. value is shifted up by one, and then step S2303 is entered, upon which the operation of the function setting switch 119 is awaited again. In step S2328, the Copy mode is set to No, and then step S2303 is entered, upon which the operation of the function setting switch 119 is awaited again.

The relationships between the display contents of the display panel 118 and the operations of the function setting switch 119 are shown in FIG. 26 to FIG. 29.

FIGS. 30A and 30B show the operation flow for a third tier User Copy To Other Lens setting menu, and when it is judged in step 807 of FIG. 8A that the cursor is positioned at the second tier User To Other Lens position as shown in FIG. 31 and FIG. 32, the third tier User Copy To Other Lens setting menu, shown in FIG. 32, is displayed on the display panel 118 in step 3001 of FIG. 30A. In step S3002, the cursor position is set at the third tier Copy To Other Lens menu. In step S3003, the operation of the function setting switch 119 is awaited. When any of the four arrow keys 502 to 505 or the select key 501 is operated, step S3004 is entered.

In step S3004, it is judged whether or not the select key 501 has been operated, and if the select key 501 has been operated, step S3005 is entered while if a key besides the select key 501 has been operated, step S3009 is entered. In step S3005, it is judged whether or not the cursor is currently positioned at the third tier User Copy To Other Lens setting menu and if the cursor is at the third tier User Copy To Other Lens setting menu, step S3006 is entered while if the cursor is at a position besides the third tier User Copy To Other Lens setting menu, step S3007 is entered. In step S3006, a transition to the second tier User menu is carried out. In step S3007, the current Connect mode is judged, and if the Connect mode is YES, step S3008 is entered while if the Connect mode is NO, step S3006 is entered.

In step S3008, a transition to a fourth tier User menu is carried out. In step S3009, it is judged whether or not the up arrow key 502 has been operated, and if the up arrow key 502 has been operated, step S3010 is entered while if a key besides the up arrow key 502 has been operated, step S3013 is entered. In step S3010, it is judged whether or not the cursor is currently positioned at the top end, and if the cursor is positioned at the top end, step S3011 is entered while if the cursor is positioned at a position besides the top end, step S3012 is entered. In step S3011, a transition to the second tier User Menu is carried out. In step S3012, the cursor position is moved up one row, and then step S3003 is entered, upon which the operation of the function setting switch 119 is awaited again.

In step S3013, it is judged whether or not the down arrow key 503 has been operated and if the down arrow key 503 has been operated, step S3014 is entered while if a key besides the down arrow key 503 has been operated, step S3016 is entered. In step S3014, it is judged whether or not the cursor is currently positioned at the bottom end, and if the cursor is positioned at the bottom end, step S3003 is entered and the operation of the function setting switch 119 is awaited again. If the cursor is positioned at a position besides the bottom end, step S3015 is entered.

In step S3015, the cursor position is moved down one row and then step S3003 is entered, upon which the operation of the function setting switch 119 is awaited again. In step S3016, it is judged whether or not the left arrow key 504 has been operated, and if the left arrow key 504 has been operated, step S3017 is entered while if a key besides the left arrow key 504 has been operated, step S3019 is entered. In step S3017, it is judged whether or not the cursor is currently positioned at the third tier User Copy To Other Lens menu, and if the cursor is positioned at the third tier User Copy To Other Lens menu, step S3003 is entered and the operation of the function setting switch 119 is awaited again. If the cursor is positioned at a position besides the third tier User Copy To Other Lens menu, step S3018 is entered. In step S3018, the Connect mode is set to YES and then step S3003 is entered, upon which the operation of the function setting switch 119 is awaited again.

In step S3019, it is judged whether or not the cursor is currently positioned at the third tier User Copy To Other Lens menu, and if the cursor is positioned at the third tier User Copy To Other Lens menu, step S3003 is entered and the operation of the function setting switch 119 is awaited again. If the cursor is positioned at a position besides the third tier User Copy To Other Lens menu, step S3020 is entered. In step S3020, the Connect mode is set to NO and then step S3003 is entered, upon which the operation of the function setting switch 119 is awaited again.

Figure 36A:
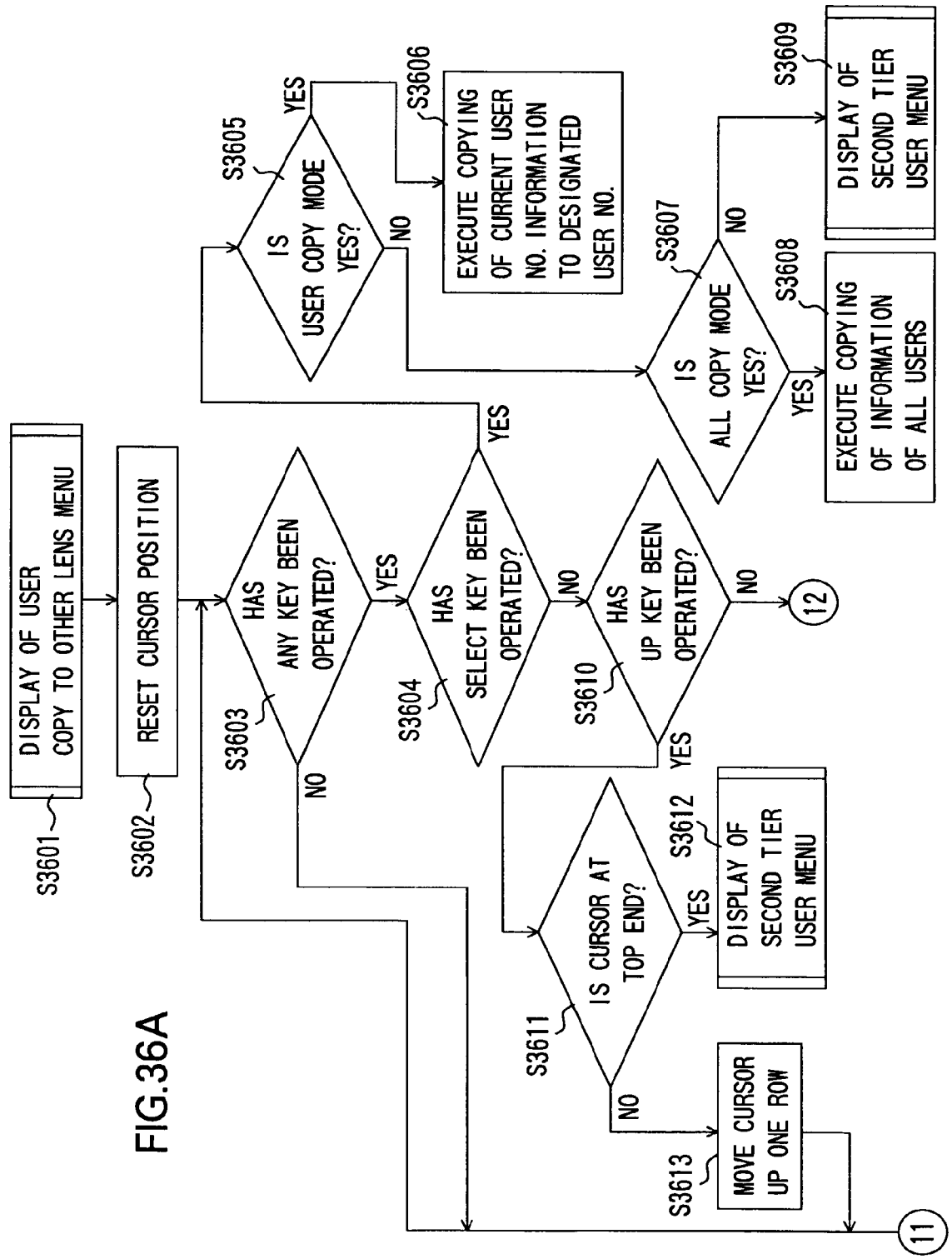
FIG. 36 is a display operation flowchart of the embodiment.
Figure 36B:
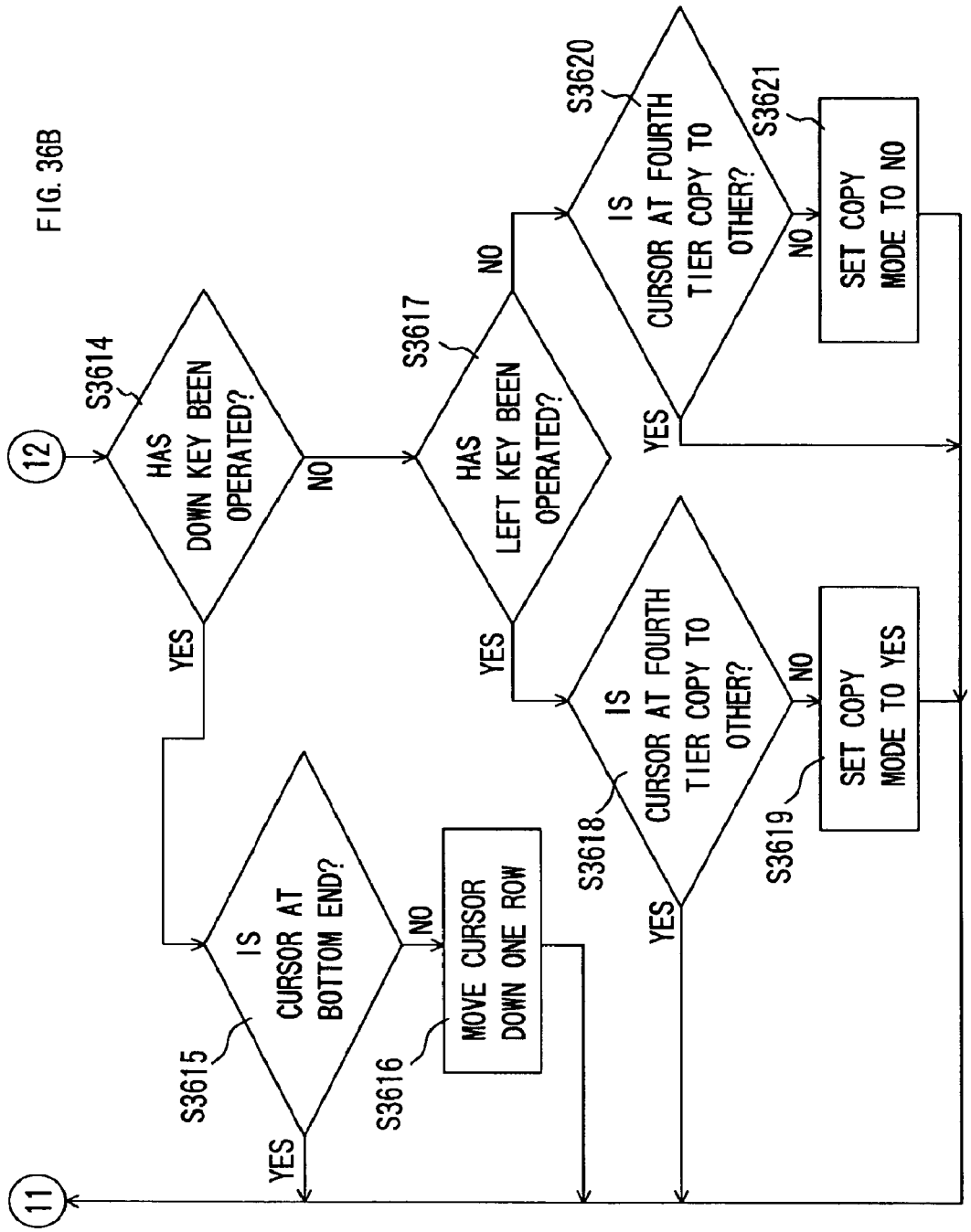

FIGS. 36A and 36B show the operation flow for a fourth tier User Copy To Other Lens setting menu, and when it is judged in step 3007 of FIG. 30A that the Connect mode is YES, the fourth tier User Copy To Other Lens setting menu, shown in FIG. 37, is displayed on the display panel 118 in step 3601 of FIG. 36A. In step S3602, the cursor position is set at the fourth tier Copy To Other Lens menu.

In step S3603, the operation of the function setting switch 119 is awaited. When any of the four arrow keys 502 to 505 or the select key 501 is operated, step S3604 is entered. In step S3604, it is judged whether or not the select key 501 has been operated, and if the select key 501 has been operated, step S3605 is entered while if a key besides the select key 501 has been operated, step S3610 is entered. In step S3605, it is judged whether or not the cursor is currently positioned at the User Copy position and the Copy mode is YES, and if the cursor is at the User Copy position and the Copy mode is YES, step S3606 is entered while if the cursor is at a position besides the User Copy position and the Copy mode is not YES, step S3607 is entered.

In step S3606, the setting information of the respective functions for the current User No. is copied as the setting information of the same User No. of another lens. In step S3607, it is judged whether or not the cursor is currently positioned at the All User Copy position and the Copy mode is YES, and if the cursor is at the All User Copy position and the Copy mode is YES, step S3608 is entered while if the cursor is at a position besides the All User Copy position and the Copy mode is not YES, step S3609 is entered. In step S3608, the setting information of the respective functions for each of all User Nos. is copied as the setting information for each of all User Nos. of the other lens. In step S3609, a transition to the second tier User menu is carried out.

In step S3610, it is judged whether or not the up arrow key 502 has been operated, and if the up arrow key 502 has been operated, step S3611 is entered while if a key besides the up arrow key 502 has been operated, step S3614 is entered. In step S3611, it is judged whether or not the cursor is currently positioned at the top end, and if the cursor is positioned at the top end, step S3612 is entered while if the cursor is positioned at a position besides the top end, step S3613 is entered. In step S3612, a transition to the second tier User Menu is carried out. In step S3613, the cursor position is moved up one row, and then step S3603 is entered, upon which the operation of the function setting switch 119 is awaited again.

In step S3614, it is judged whether or not the down arrow key 503 has been operated and if the down arrow key 503 has been operated, step S3615 is entered while if a key besides the down arrow key 503 has been operated, step S3617 is entered. In step S3615, it is judged whether or not the cursor is currently positioned at the bottom end, and if the cursor is positioned at the bottom end, step S3603 is entered and the operation of the function setting switch 119 is awaited again. If the cursor is positioned at a position besides the bottom end, step S3616 is entered.

In step S3616, the cursor position is moved down one row and then step S3603 is entered, upon which the operation of the function setting switch 119 is awaited again.

In step S3617, it is judged whether or not the left arrow key 504 has been operated, and if the left arrow key 504 has been operated, step S3618 is entered while if a key besides the left arrow key 504 has been operated, step S3620 is entered. In step S3618, it is judged whether or not the cursor is currently positioned at the fourth tier User Copy To Other Lens menu, and if the cursor is positioned at the fourth tier User Copy To Other Lens menu, step S3603 is entered and the operation of the function setting switch 119 is awaited again. If the cursor is positioned at a position besides the fourth tier User Copy To Other Lens menu, step S3619 is entered. In step S3619, the Copy mode is set to YES and then step S3603 is entered, upon which the operation of the function setting switch 119 is awaited again.

In step S3620, it is judged whether or not the cursor is currently positioned at the fourth tier User Copy To Other Lens menu, and if the cursor is positioned at the fourth tier User Copy To Other Lens menu, step S3603 is entered and the operation of the function setting switch 119 is awaited again.

If the cursor is positioned at a position besides the fourth tier User Copy To Other Lens menu, step S3621 is entered. In step S3621, the Copy mode is set to NO and then step S3603 is entered, upon which the operation of the function setting switch 119 is awaited again.

The process of copying the respective function settings to another lens shall now be described according to the display flow.

Figure 34:
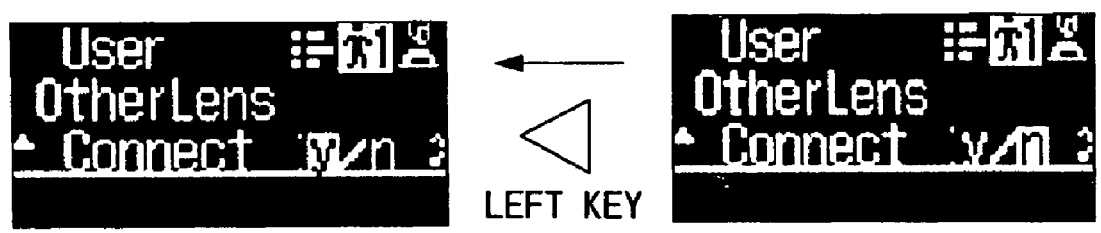
FIG. 34 is a detailed diagram of the display panel of the embodiment.
Figure 35:
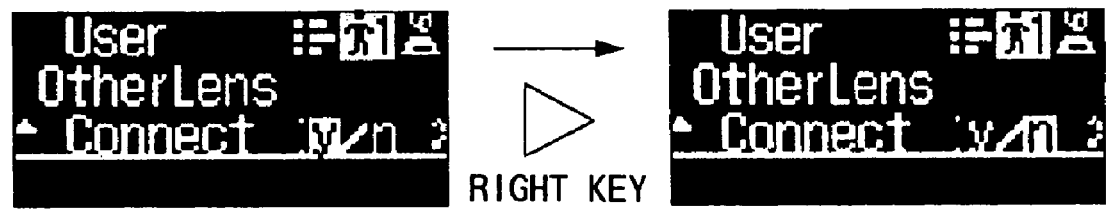
FIG. 35 is a detailed diagram of the display panel of the embodiment.

As shown in FIG. 32, the cursor is set at the To Other Lens position in the second tier User menu and the select key 501 is operated. The display on the display panel 118 is renewed and the third tier User Other Lens menu is displayed. The down arrow key 503 is then operated as shown in FIG. 33 to set the cursor at the Connect position. The left arrow key 504 or the right arrow key 505 is operated as shown in FIG. 34 or 35 to set the Connect mode to YES. When the Connect mode has been set to YES, the select key 501 is operated to start communication with another lens via the data communication circuit 122. When communication with the other lens is performed normally via the data communication circuit 122, the fourth tier User Copy To Other Lens menu, shown in FIG. 37, is displayed.

If copying for one User No. is to be performed, the down arrow key 503 is operated to set the cursor at the User Copy position as shown in FIG. 38. The left arrow key 504 or the right arrow key 505 is then operated as shown in FIG. 39 or 40 to set the User Copy mode to YES or NO. Last, when the select key 501 is operated, the setting information of the respective functions for the selected User No. is copied into the other lens via the data communication circuit 122.

If copying for all User Nos. is to be performed, the down arrow key 503 is operated to set the cursor at the All Copy position as shown in FIG. 41. The left arrow key 504 or the right arrow key 505 is then operated as shown in FIG. 42 or 43 to set the All Copy mode to YES or NO.

Last, when the select key 501 is operated, the setting information of the respective functions for each of all User Nos. is copied into the other lens via the data communication circuit 122.

Figure 44A:
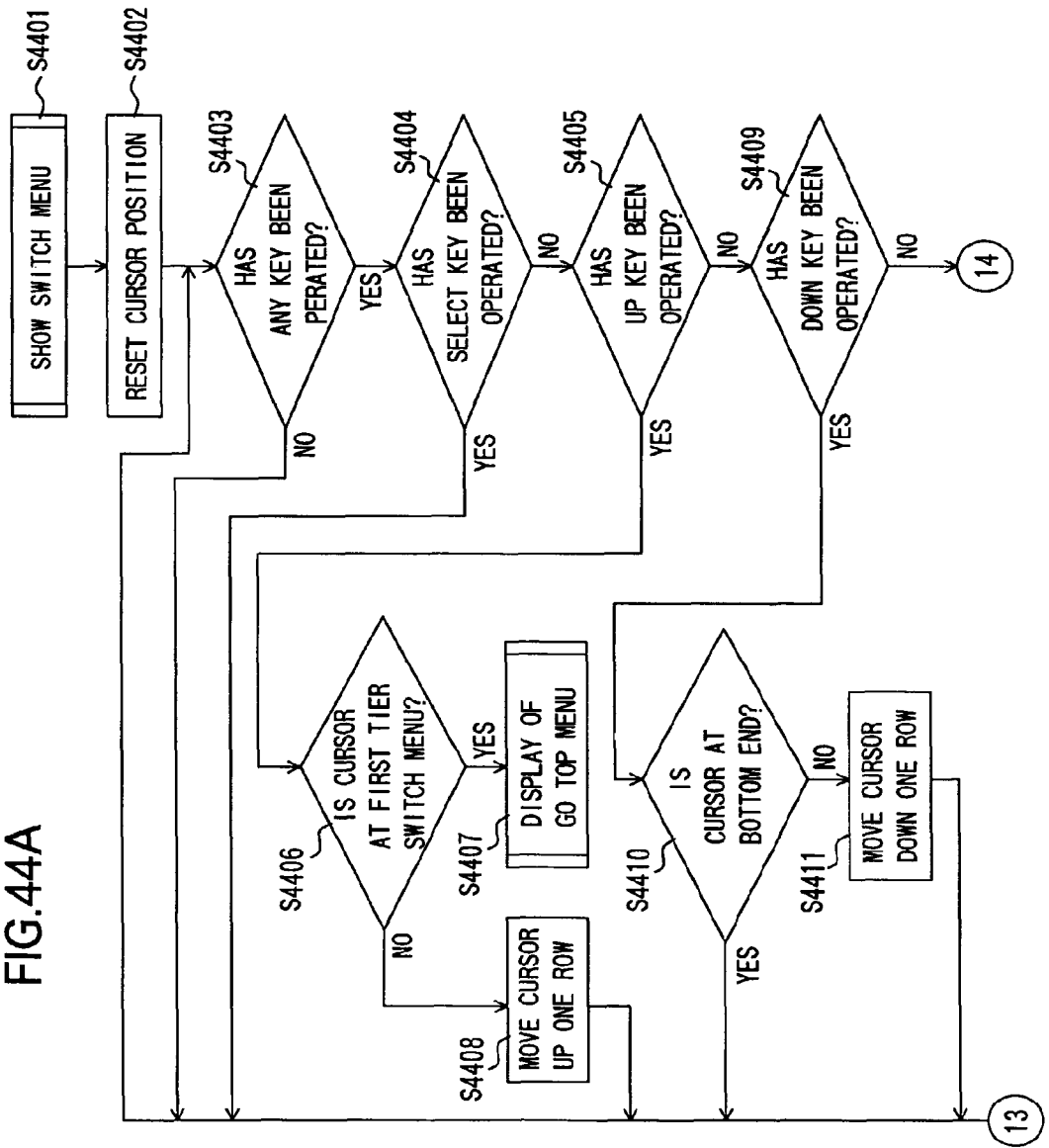
FIG. 44 is a display operation flowchart of the embodiment.
Figure 44B:
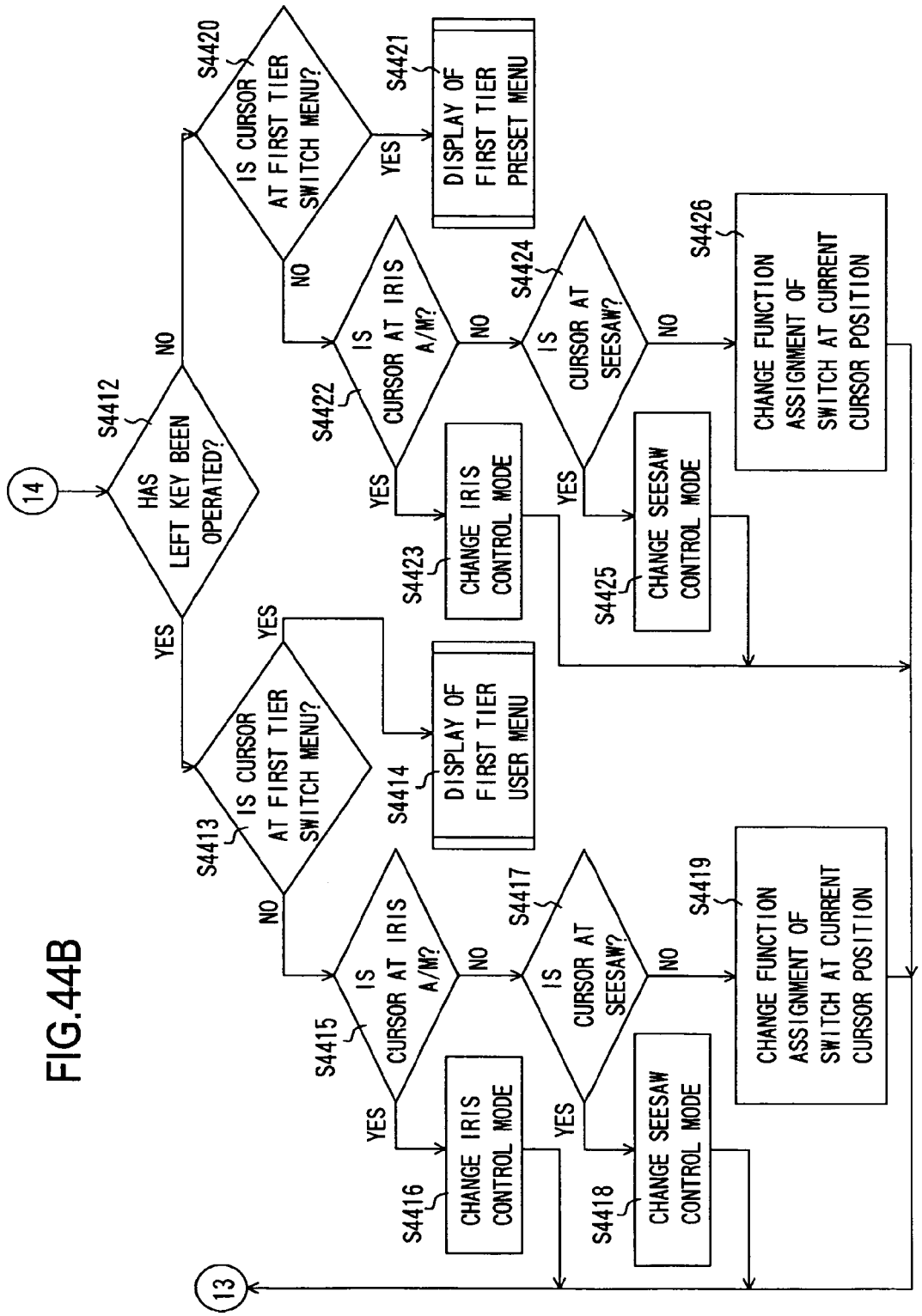

FIGS. 44A and 44B show the operation flow for first tier and second tier Switch function menus, and in step S4401, the display of the display panel 118 is renewed as shown in 703 of FIG. 7. In step S4402, the cursor position is set at the first tier Switch menu icon.

In step S4403, the operation of the function setting switch 119 is awaited. When any of the four arrow keys 502 to 505 or the select key 501 is operated, step S4404 is entered. In step S4404, it is judged whether or not the select key 501 has been operated, and if the select key 501 has been operated, step S4403 is entered and the operation of the function setting switch 119 is awaited again. If a key besides the select key 501 has been operated, step S4405 is entered.

In step S4405, it is judged whether or not the up arrow key 502 has been operated and if the up arrow key 502 has been operated, step S4406 is entered while if a key besides the up arrow key 502 has been operated, step S4409 is entered. In step S4406, it is judged whether or not the cursor is currently positioned at the first tier Switch menu icon, and if the cursor is at the first tier Switch menu icon, step S4407 is entered while if the cursor is set at a position besides the first tier Switch menu icon, step S4408 is entered.

In step S4407, the transition confirmation menu (GO TOP menu), which is shown in FIG. 45 and is for choosing between returning or not returning the display on the display panel 107 to the startup menu, is displayed. Here, if the startup menu is to be returned to, the select key 501 is operated, and if not, the down arrow key 503 is operated and the first tier Switch menu is displayed again. In step S4408, the cursor position is moved up one row and then step S4403 is entered, upon which the operation of the function setting switch 119 is awaited again.

In step S4409, it is judged whether or not the down arrow key 503 has been operated and if the down arrow key 503 has been operated, step S4410 is entered while if a key besides the down arrow key 503 has been operated, step S4412 is entered.

In step S4410, it is judged whether or not the cursor is currently positioned at the bottom end, and if the cursor is at the bottom end, step S4403 is entered and the operation of the function setting switch 119 is awaited again. If the cursor is set at a position besides the bottom end, step S4411 is entered. In step S4411, the cursor position is moved down one row and then step S4403 is entered, upon which the operation of the function setting switch 119 is awaited again.

In step S4412, it is judged whether or not the left arrow key 504 has been operated and if the left arrow key 504 has been operated, step S4413 is entered while if a key besides the left arrow key 504 has been operated, step S4420 is entered. In step S4413, it is judged whether or not the cursor is currently positioned at the first tier User Switch menu, and if the cursor is at the first tier User Switch menu, step S4414 is entered while if the cursor is set at a position besides the first tier User Switch menu, step S4415 is entered.

In step S4414, a transition to the first tier User menu is carried out. In step S4415, it is judged whether or not the cursor is currently positioned at the Iris A/M (auto/manual) position, and if the cursor is currently positioned at Iris A/M, step S4416 is entered while if the cursor is at a position besides Iris A/M, step S4417 is entered. In step S4416 the Iris A/M mode setting is changed and then step S4403 is entered to await the operation of the function setting switch 119 again.

In step S4417, it is judged whether or not the cursor is currently positioned at the Seesaw position, and if the cursor is currently positioned at Seesaw, step S4418 is entered while if the cursor is at a position besides Seesaw, step S4419 is entered. In step S4418, the Seesaw control mode is changed and then step S4403 is entered to await the operation of the function setting switch 119 again. In step S4419, the function assignment of the switch at the current cursor position is changed and then step S4403 is entered to await the operation of the function setting switch 119 again.

In step S4420, it is judged whether or not the cursor is currently positioned at the first tier User Switch menu, and if the cursor is positioned at the first tier User Switch menu, step S4421 is entered while if the cursor is set at a position besides the first tier User Switch menu, step S4422 is entered.

In step S4421, a transition to a first tier Preset menu is carried out. In step S4422, it is judged whether or not the cursor is currently positioned at the Iris A/M position, and if the cursor is currently positioned at Iris A/M, step S4423 is entered while if the cursor is at a position besides Iris A/M, step S4424 is entered.

The Iris A/M mode setting is changed in step S4423 and then step S4403 is entered to await the operation of the function setting switch 119 again. In step S4424, it is judged whether or not the cursor is currently positioned at the Seesaw position, and if the cursor is currently positioned at Seesaw, step S4425 is entered while if the cursor is at a position besides Seesaw, step S4426 is entered.

In step S4425, the Seesaw control mode is changed and then step S4403 is entered to await the operation of the function setting switch 119 again. In step S4426, the function assignment of the switch at the current cursor position is changed and then step S4403 is entered to await the operation of the function setting switch 119 again.

The function enabling the change of settings in the Switch menu shall now be described.

As shown in FIG. 46 to FIG. 49, changing of the function assignments of the four types of switches of the AUX1 switch 305, AUX2 switch 402, VTR switch 401, and RET switch 304 is enabled. For example, by moving the cursor to AUX1 as shown in FIG. 46 and operating the left arrow key 504 or the right arrow key 505, the function of the AUX1 switch can be changed among Frame Preset 1, Frame Preset 2, Speed, Shuttle Shot, VTR, and RET. The same applies to the AUX2, VTR, and RET switches. "Frame Preset" is a zooming function in which the zoom lens optical system 105 is moved to a preset (memorized) position by the operation of the switch, and "Speed" is a zooming function in which the zoom lens optical system 105 is moved at a preset speed to a preset direction by the operation of the switch. "Shuttle Shot" is a zooming function in which the zoom lens optical system 105 is moved to a preset zoom position by a first operation of the switch and returned to a position memorized at the time of the first operation of the switch by a second operation of the switch. Then by moving the cursor to A/M as shown in FIG. 50 and then operating the left arrow key 504 or the right arrow key 505, the iris switch setting can be changed among Normal, Reverse, Auto Only, and Manual Only.

Then by moving the cursor to SSaw as shown in FIG. 51 and then operating the left arrow key 504 or the right arrow key 505, the function of the zoom seesaw switch can be changed in regard to the object of control among Zoom, Iris, and Focus.

Figure 52A:
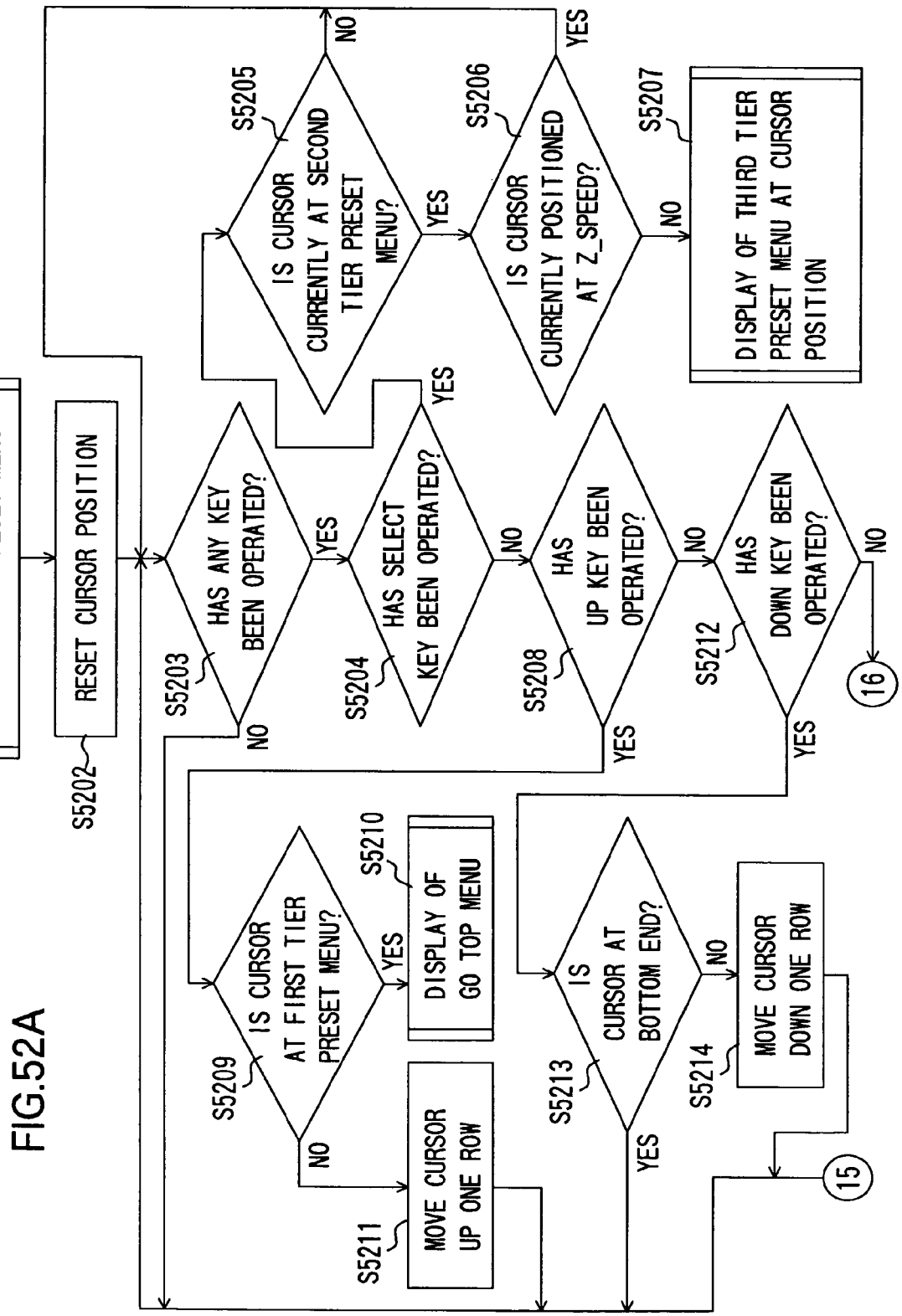
FIG. 52 is a display operation flowchart of the embodiment.
Figure 52B:
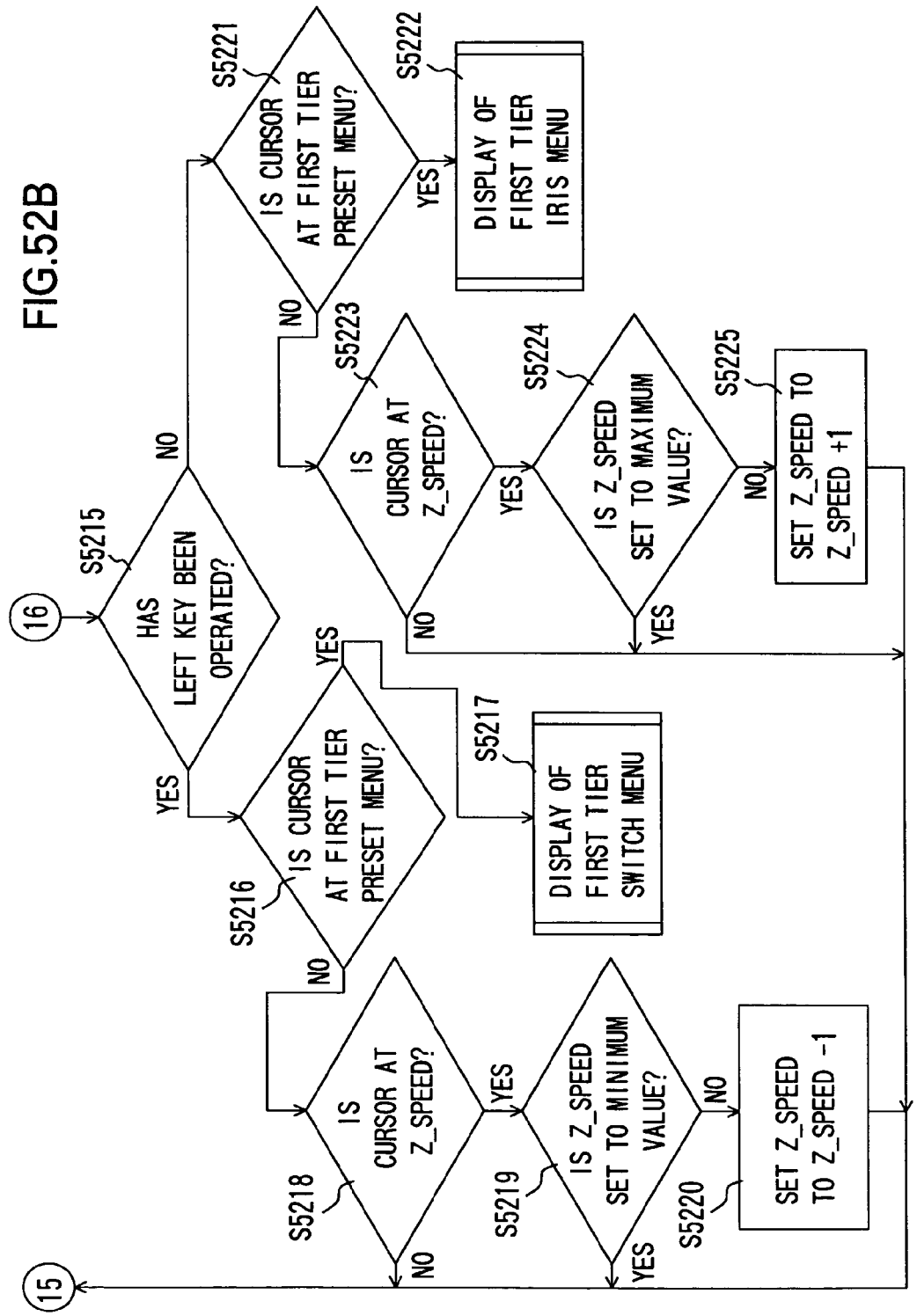

FIGS. 52A and 52B show the operation flow for first tier and second tier Preset function menus, and in step S5201, the display of the display panel 118 is renewed as shown in 704 of FIG. 7. In step S5202, the cursor position is set at the first tier Preset menu icon.

In step S5203, the operation of the function setting switch 119 is awaited. When any of the four arrow keys 502 to 505 or the select key 501 is operated, step S5204 is entered. In step S5204, it is judged whether or not the select key 501 has been operated, and if the select key 501 has been operated, step S5205 is entered while if a key besides the select key 501 has been operated, step S5208 is entered.

In step S5205, it is judged whether or not the cursor is currently positioned at the second tier Preset menu, and if the cursor is at the second tier Preset menu, step S5206 is entered while if the cursor is set at a position besides the second tier Preset menu, step S5203 is entered and the operation of the function setting switch 119 is awaited again. In step S5206, it is judged whether or not the cursor is currently positioned at the Z_Speed position, and if the cursor is currently positioned at the Z_Speed, step S5203 is entered and the operation of the function setting switch 119 is awaited again. If the cursor is currently positioned at a position besides Z_Speed, step S5207 is entered. In step S5207, a transition to the third tier Preset menu, corresponding to the current cursor position, is carried out.

In step S5208, it is judged whether or not the up arrow key 502 has been operated and if the up arrow key 502 has been operated, step S5209 is entered while if a key besides the up arrow key 502 has been operated, step S5212 is entered. In step S5209, it is judged whether or not the cursor is currently positioned at the first tier Preset menu icon, and if the cursor is at the first tier Preset menu icon, step S5210 is entered while if the cursor is at a position besides the first tier Preset menu icon, step S5211 is entered.

In step S5210, the transition confirmation menu (GO TOP menu), which is shown in FIG. 53 and is for choosing between returning or not returning the display on the display panel 107 to the startup menu, is displayed. Here, if the startup menu is to be returned to, the select key 501 is operated, and if not, the down arrow key 503 is operated and the first tier Preset menu is displayed again.

In step S5211, the cursor position is moved up one row and then step S5203 is entered, upon which the operation of the function setting switch 119 is awaited again. In step S5212, it is judged whether or not the down arrow key 503 has been operated and if the down arrow key 503 has been operated, step S5213 is entered while if a key besides the down arrow key 503 has been operated, step S5215 is entered.

In step S5213, it is judged whether or not the cursor is currently positioned at the bottom end, and if the cursor is at the bottom end, step S5203 is entered and the operation of the function setting switch 119 is awaited again. If the cursor is set at a position besides the bottom end, step S5214 is entered. In step S5214, the cursor position is moved down one row and then step S5203 is entered, upon which the operation of the function setting switch 119 is awaited again.

In step S5215, it is judged whether or not the left arrow key 504 has been operated and if the left arrow key 504 has been operated, step S5216 is entered while if a key besides the left arrow key 504 has been operated, step S5221 is entered.

In step S5216, it is judged whether or not the cursor is currently positioned at the first tier Preset menu, and if the cursor is positioned at the first tier Preset menu, step S5217 is entered while if the cursor is positioned at a position besides the first tier Preset menu, step S5218 is entered. In step S5217, a transition to the first tier Switch menu is carried out.

In step S5218, it is judged whether or not the cursor is currently positioned at the Z_Speed position, and if the cursor is currently positioned at Z_Speed, step S5219 is entered while if the cursor is currently positioned at a position besides Z_Speed, step S5203 is entered and the operation of the function setting switch 119 is awaited again. In step S5219, it is judged whether or not the Z_Speed value is set to the minimum value, that can be set in the lens and if Z_Speed is set to the minimum value, step S5203 is entered and the operation of the function setting switch 119 is awaited again. If Z_Speed is set to a value besides the minimum value, step S5220 is entered.

In step S5220, the Z_Speed value is shifted down by one and then step S5203 is entered, upon which the operation of the function setting switch 119 is awaited again. In step S5221, it is judged whether or not the cursor is currently positioned at the first tier Preset menu, and if the cursor is positioned at the first tier Preset menu, step S5222 is entered while if the cursor is positioned at a position besides the first tier Preset menu, step S5223 is entered. In step S5222, a transition to the first tier Iris menu is carried out.

In step S5223, it is judged whether or not the cursor is currently positioned at the Z_Speed position, and if the cursor is currently positioned at Z_Speed, step S5224 is entered while if the cursor is currently positioned at a position besides Z_Speed, step S5203 is entered and the operation of the function setting switch 119 is awaited again. In step S5224, it is judged whether or not the Z_Speed value is set to the maximum value, that can be set in the lens and if Z_Speed is set to the maximum value, step S5203 is entered and the operation of the function setting switch 119 is awaited again. If Z_Speed is set to a value besides the maximum value, step S5225 is entered. In step S5225, the Z_Speed value is shifted up by one and then step S5203 is entered, upon which the operation of the function setting switch 119 is awaited again.

The relationships between the display contents of the display panel 118 and the operations of the function setting switch 119 are shown in FIG. 54 to FIG. 57.

Figure 58A:
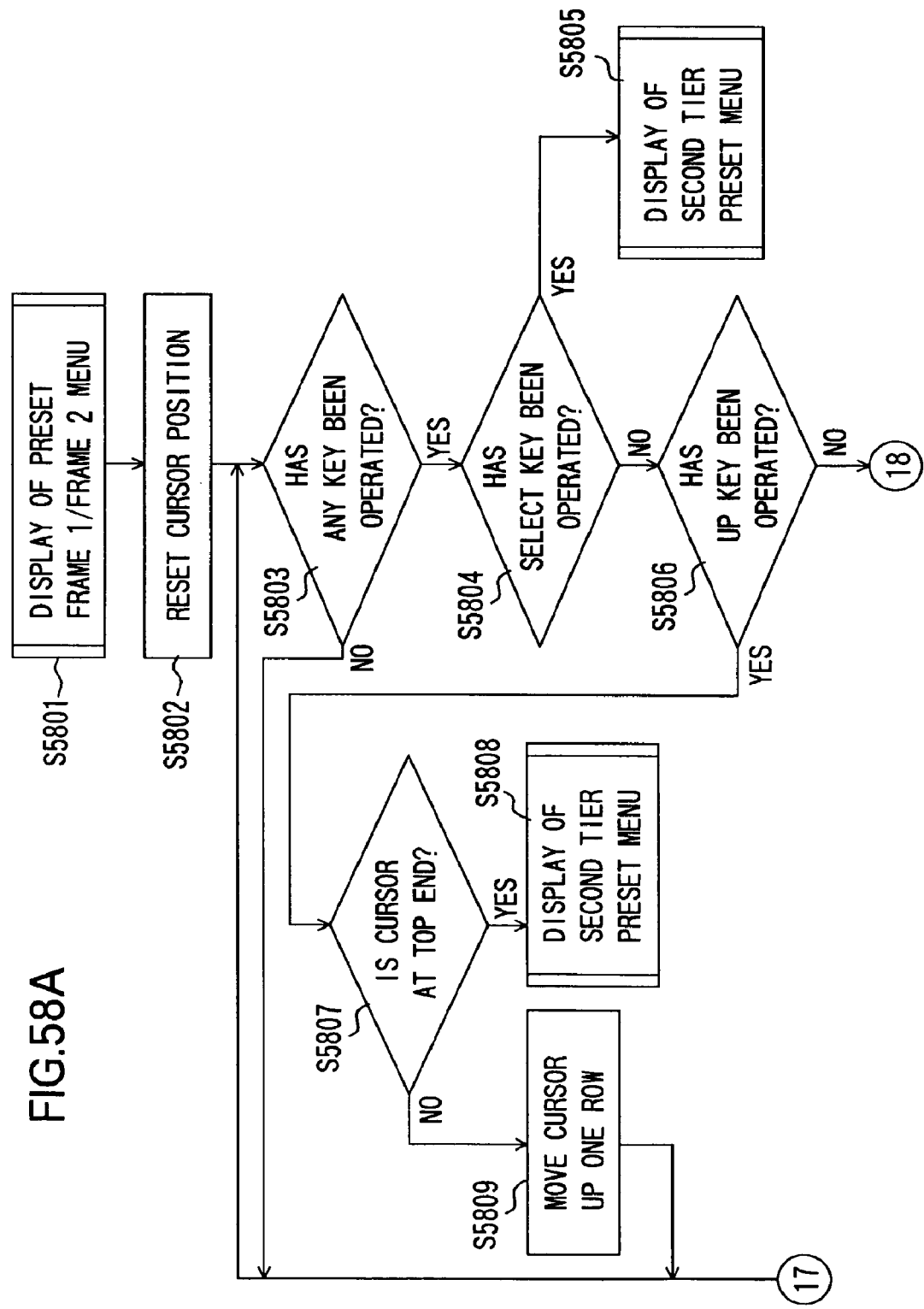
FIG. 58 is a display operation flowchart of the embodiment.
Figure 58B:
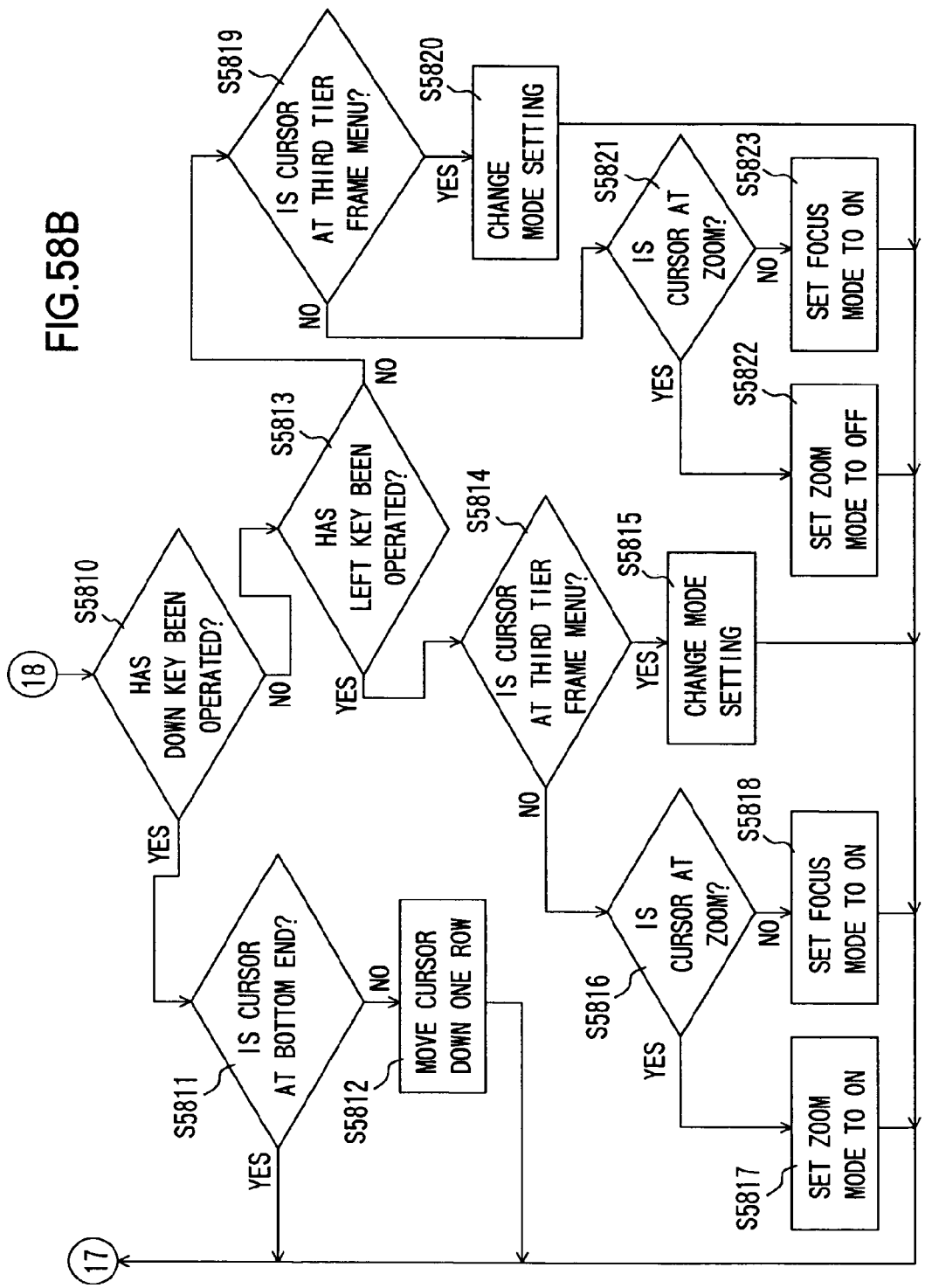

FIGS. 58A and 58B show the operation flow for third tier Frame Preset 1 and Frame Preset 2 function menus, and in step S5801, the display of the display panel 118 is renewed as shown in FIG. 59. In step S5802, the cursor position is set at the third tier Frame 1/2 position.

In step S5803, the operation of the function setting switch 119 is awaited. When any of the four arrow keys 502 to 505 or the select key 501 is operated, step S5804 is entered. In step S5804, it is judged whether or not the select key 501 has been operated, and if the select key 501 has been operated, step S5805 is entered while if a key besides the select key 501 has been operated, step S5806 is entered. In step S5805, a transition to the second tier Preset menu is carried out.

In step S5806, it is judged whether or not the up arrow key 502 has been operated and if the up arrow key 502 has been operated, step S5807 is entered while if a key besides the up arrow key 502 has been operated, step S5810 is entered. In step S5807, it is judged whether or not the cursor is currently positioned at the top end, and if the cursor is currently positioned at the top end, step S5808 is entered while if the cursor is currently positioned at a position besides the top end, step S5809 is entered. In step S5808, a transition to the second tier Preset menu is carried out.

In step S5809, the cursor position is moved up one row and then step S5803 is entered, upon which the operation of the function setting switch 119 is awaited again.

In step S5810, it is judged whether or not the down arrow key 503 has been operated and if the down arrow key 503 has been operated, step S5811 is entered while if a key besides the down arrow key 503 has been operated, step S5813 is entered. In step S5811, it is judged whether or not the cursor is currently positioned at the bottom end, and if the cursor is positioned at the bottom end, step S5803 is entered and the operation of the function setting switch 119 is awaited again. If the cursor is positioned at a position besides the bottom end, step S5812 is entered. In step S5812, the cursor position is moved down one row and then step S5803 is entered, upon which the operation of the function setting switch 119 is awaited again.

In step S5813, it is judged whether or not the left arrow key 504 has been operated and if the left arrow key 504 has been operated, step S5814 is entered while if a key besides the left arrow key 504 has been operated, step S5819 is entered. In step S5814, it is judged whether or not the cursor is currently positioned at the third tier Frame menu, and if the cursor is positioned at the third tier Frame menu, step S5815 is entered while if the cursor is positioned at a position besides the third tier Frame menu, step S5816 is entered. The Frame Preset mode setting is changed in step S5815 and then step S5803 is entered to await the operation of the function setting switch 119. In step S5816, it is judged whether or not the cursor is currently positioned at the Zoom position, and if the cursor is currently positioned at Zoom, step S5817 is entered while if the cursor is at a position besides Zoom, step S5818 is entered. In step S5817, the Zoom mode is set to ON and then step S5803 is entered to await the operation of the function setting switch 119 again. In step S5818, the Focus mode is set to ON and then step S5803 is entered to await the operation of the function setting switch 119 again.

In step S5819, it is judged whether or not the cursor is currently positioned at the third tier Frame menu, and if the cursor is positioned at the third tier Frame menu, step S5820 is entered while if the cursor is positioned at a position besides the third tier Frame menu, step S5821 is entered. In step S5820, the Frame Preset mode setting is changed, and then step S5803 is entered, upon which the operation of the function setting switch 119 is awaited again.

In step S5821, it is judged whether or not the cursor is currently positioned at the Zoom position, and if the cursor is currently positioned at Zoom, step S5822 is entered while if the cursor is at a position besides Zoom, step S5823 is entered. In step S5822, the Zoom mode is set to OFF and then step S5803 is entered to await the operation of the function setting switch 119 again. In step S5823, the Focus mode is set to OFF and then step S5803 is entered, upon which the operation of the function setting switch 119 is awaited again.

The function by which settings can be changed in this Frame Preset menu shall now be described.

When the cursor is moved to Frame 1 or Frame 2 as shown in FIG. 59 or FIG. 62 and the select key 501 is operated, the third layer Frame 1 or Frame 2 menu is displayed. By then operating the left arrow key 504 or the right arrow key 505 as shown in FIG. 60 or FIG. 61 or FIG. 63 or FIG. 64, switching between enabling and disabling the Zoom and Focus functions of Frame 1 and Frame 2 can be carried out.

Figure 65A:
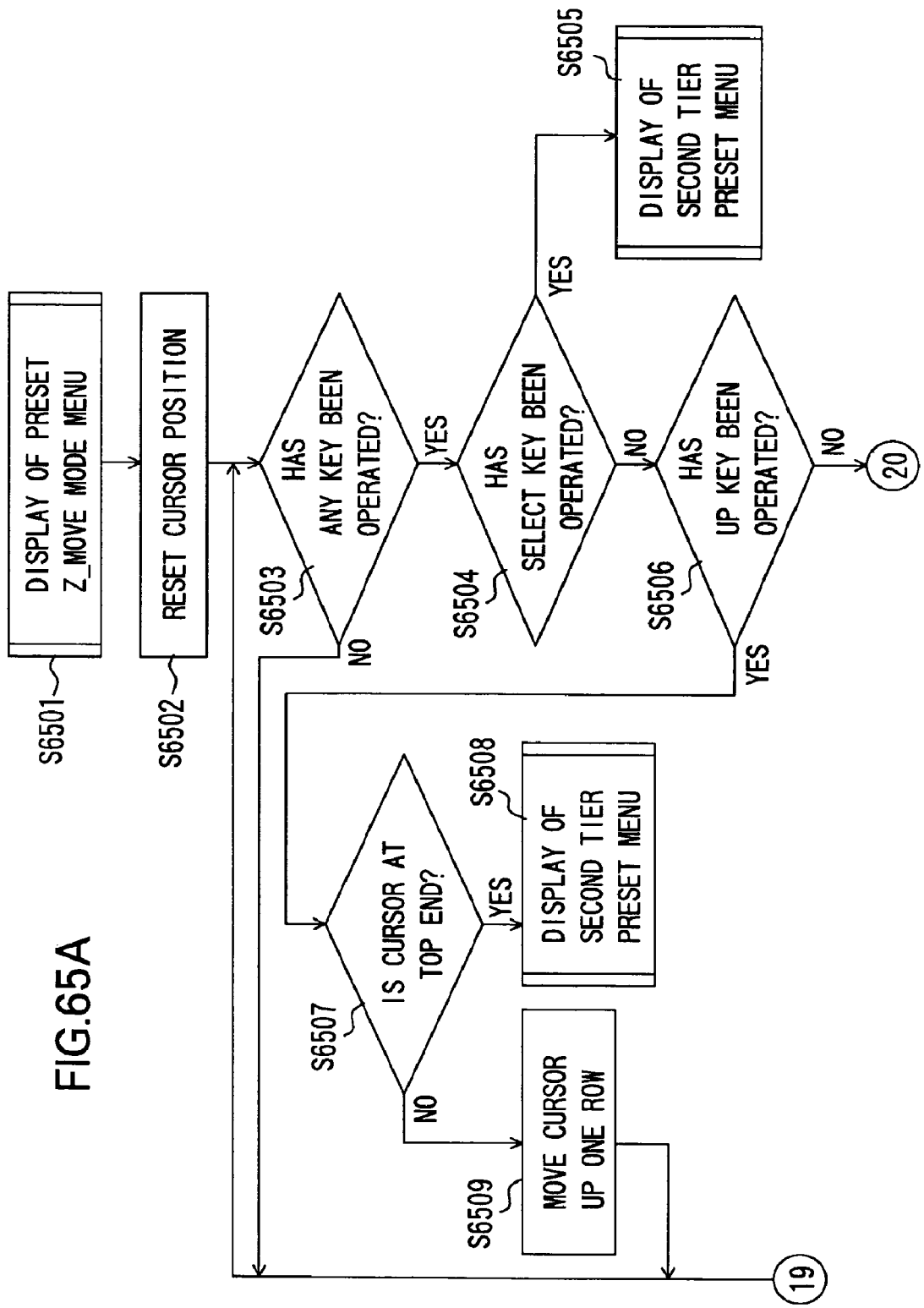
FIG. 65 is a display operation flowchart of the embodiment.
Figure 65B:
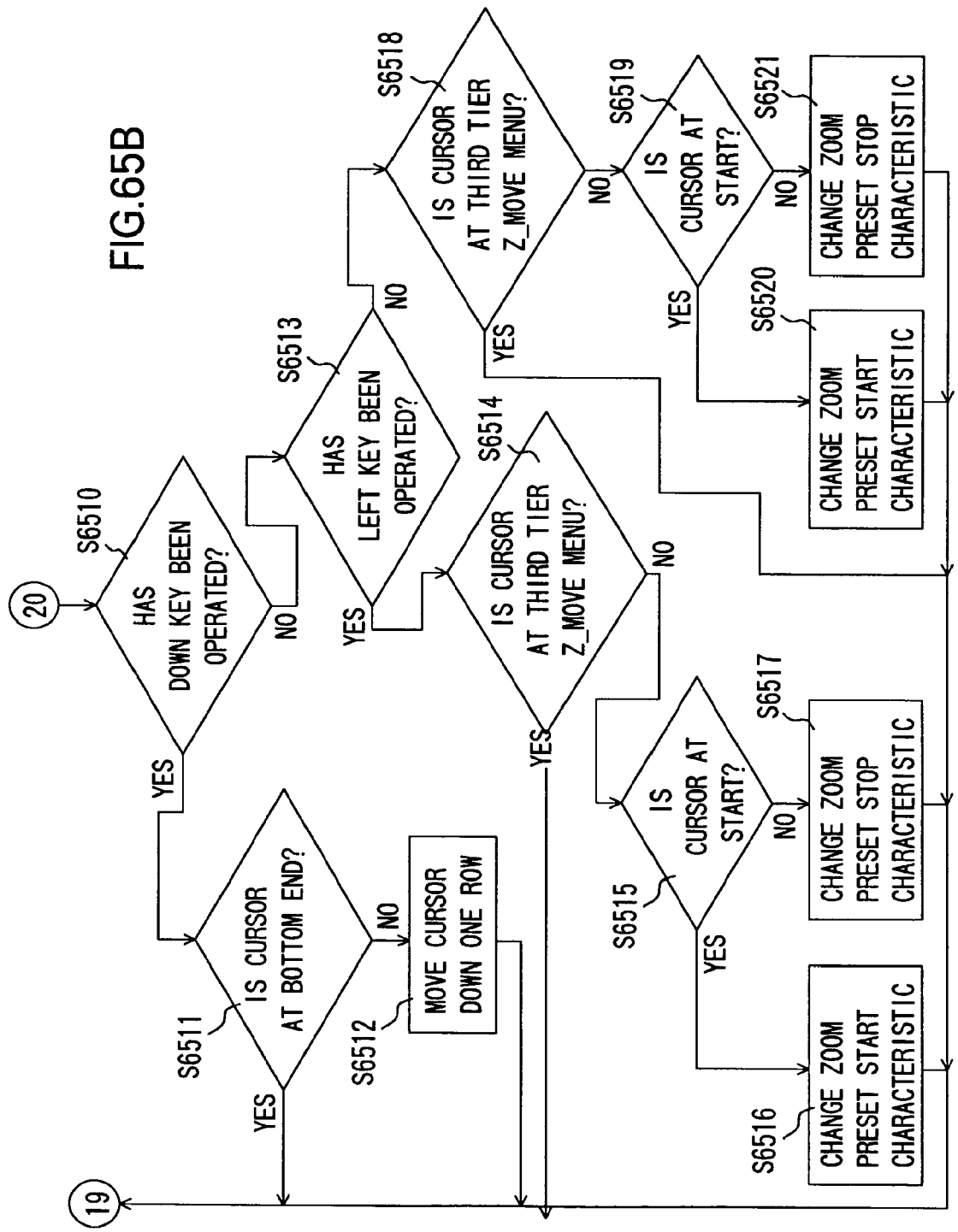

FIGS. 65A and 65B show the operation flow for a third tier Zoom_Move Mode function menu, and in step S6501, the display of the display panel 118 is renewed as shown in FIG. 66. In step S6502, the cursor is positioned at the third tier Zoom_Move Mode position.

In step S6503, the operation of the function setting switch 119 is awaited. When any of the four arrow keys 502 to 505 or the select key 501 is operated, step S6504 is entered. In step S6504, it is judged whether or not the select key 501 has been operated, and if the select key 501 has been operated, step S6505 is entered while if a key besides the select key 501 has been operated, step S6506 is entered. In step S6505, a transition to the second tier Preset menu is carried out.

In step S6506, it is judged whether or not the up arrow key 502 has been operated and if the up arrow key 502 has been operated, step S6507 is entered while if a key besides the up arrow key 502 has been operated, step S6510 is entered. In step S6507, it is judged whether or not the cursor is currently positioned at the top end, and if the cursor is currently positioned at the top end, step S6508 is entered while if the cursor is currently positioned at a position besides the top end, step S6509 is entered. In step S6508, a transition to the second tier Preset menu is carried out. In step S6509, the cursor position is moved up one row and then step S6503 is entered, upon which the operation of the function setting switch 119 is awaited again.

In step S6510, it is judged whether or not the down arrow key 503 has been operated and if the down arrow key 503 has been operated, step S6511 is entered while if a key besides the down arrow key 503 has been operated, step S6513 is entered. In step S6511, it is judged whether or not the cursor is currently positioned at the bottom end, and if the cursor is positioned at the bottom end, step S6503 is entered and the operation of the function setting switch 119 is awaited again. If the cursor is positioned at a position besides the bottom end, step S6512 is entered.

In step S6512, the cursor position is moved down one row and then step S6503 is entered, upon which the operation of the function setting switch 119 is awaited again. In step S6513, it is judged whether or not the left arrow key 504 has been operated and if the left arrow key 504 has been operated, step S6514 is entered while if a key besides the left arrow key 504 has been operated, step S6518 is entered. In step S6514, it is judged whether or not the cursor is currently positioned at the third tier Zoom_Move Mode menu, and if the cursor is positioned at the third tier Zoom_Move Mode menu, step S6503 is entered and the operation of the function setting switch 119 is awaited again.

If the cursor is positioned at a position besides the third tier Zoom_Move Mode menu, step S6515 is entered. In step S6515, it is judged whether or not the cursor is currently positioned at Start, and if the cursor is currently positioned at Start, step S6516 is entered while if the cursor is positioned at a position besides Start, step S6517 is entered.

In step S6516, the zoom start characteristic is changed and then step S6503 is entered to await the operation of the function setting switch 119 again. In step S6517, the zoom stop characteristic is changed and then step S6503 is entered to await the operation of the function setting switch 119 again.

In step S6518, it is judged whether or not the cursor is currently positioned at the third tier Zoom_Move Mode menu, and if the cursor is positioned at the third tier Zoom_Move Mode menu, step S6503 is entered and the operation of the function setting switch 119 is awaited again.

If the cursor is positioned at a position besides the third tier Zoom_Move Mode menu, step S6519 is entered. In step S6519, it is judged whether or not the cursor is currently positioned at Start, and if the cursor is currently positioned at Start, step S6520 is entered while if the cursor is positioned at a position besides Start, step S6521 is entered. In step S6520, the zoom start characteristic is changed and then step S6503 is entered to await the operation of the function setting switch 119 again. In step S6521, the zoom stop characteristic is changed and then step S6503 is entered to await the operation of the function setting switch 119 again. The abovementioned characteristics changing menus of Zoom_Move Mode are shown in FIG. 67 and FIG. 68.

Figure 69A:
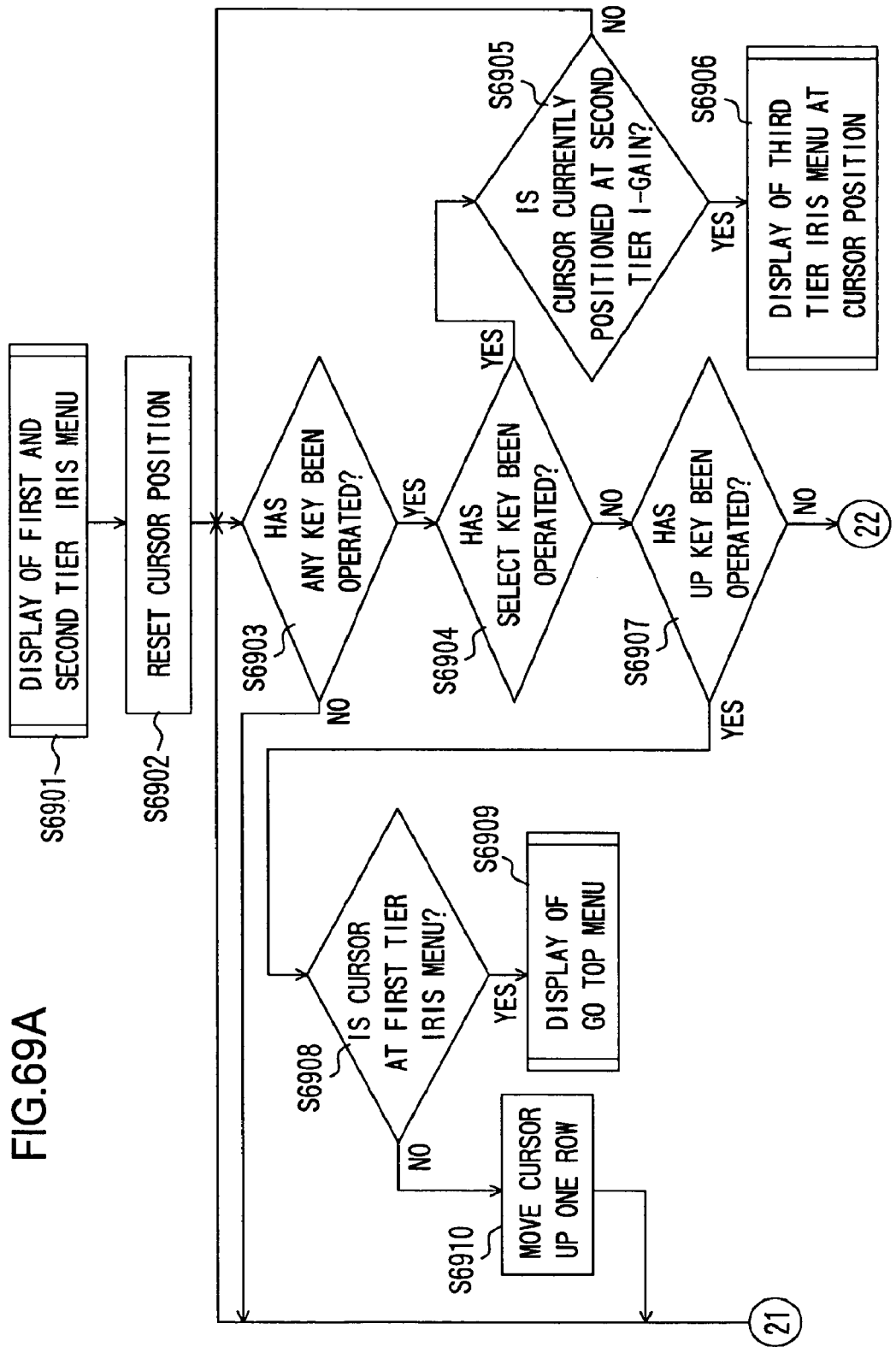
FIG. 69 is a display operation flowchart of the embodiment.
Figure 69B:
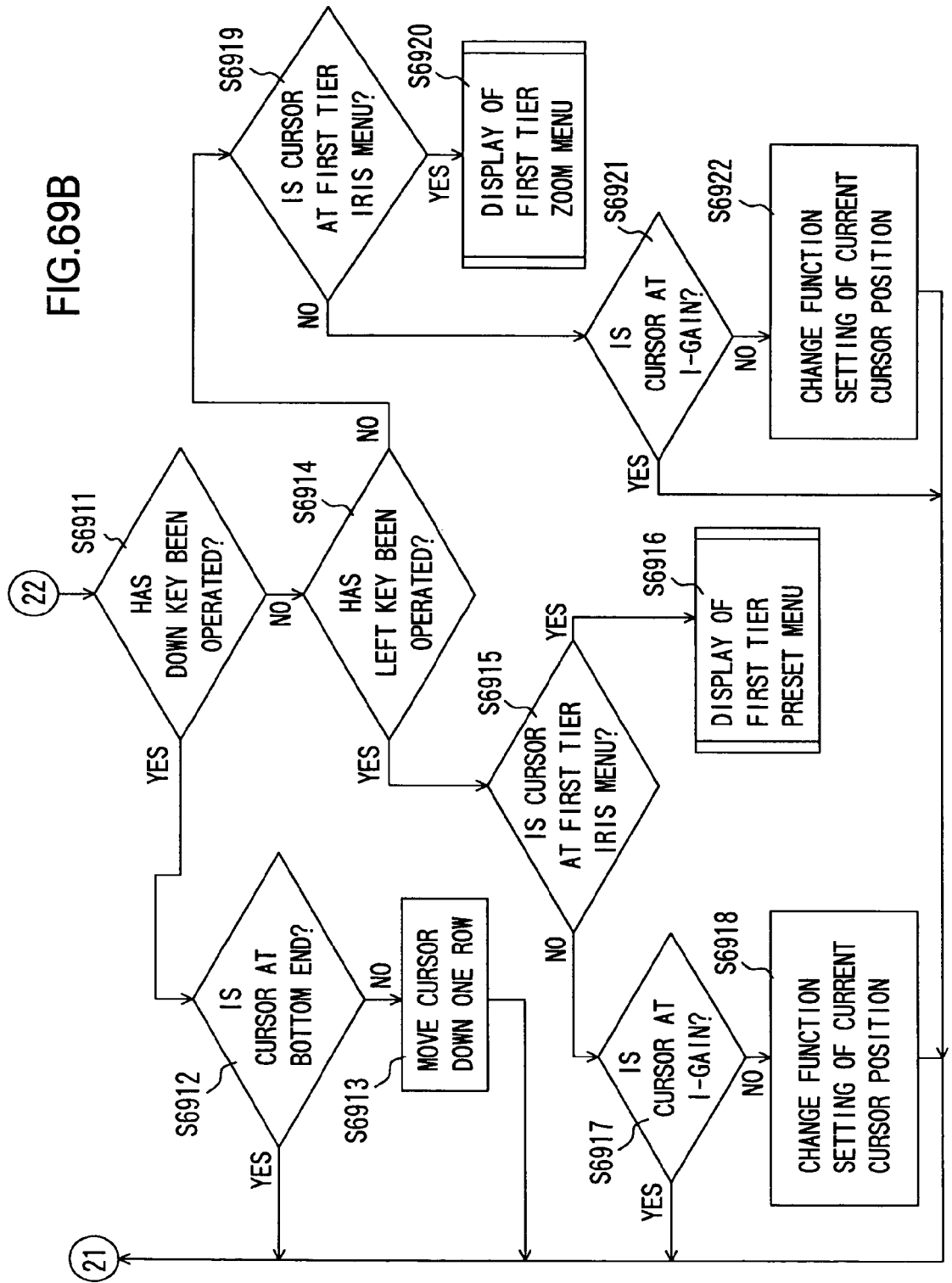
Figure 74:
FIG. 74 is a detailed diagram of the display panel of the embodiment.

FIGS. 69A and 69B show the operation flow for first tier and second tier Iris function menus, and in step S6901, the display of the display panel 118 is renewed as shown in 705 of FIG. 7. In step S6902, the cursor position is set at the first tier Iris function menu icon.

In step S6903, the operation of the function setting switch 119 is awaited. When any of the four arrow keys 502 to 505 or the select key 501 is operated, step S6904 is entered. In step S6904, it is judged whether or not the select key 501 has been operated, and if the select key 501 has been operated, step S6905 is entered while if a key besides the select key 501 has been operated, step S6907 is entered. In step S6905, it is judged whether or not the cursor is currently positioned at the second tier I-Gain menu, and if the cursor is currently positioned at the second tier I-Gain menu, step S6906 is entered while if the cursor is currently positioned at a position besides the second tier I-Gain menu, step S6903 is entered and the operation of the function setting switch 119 is awaited again. In step S6906, a transition to a third tier Iris Gain menu is carried out.

In step S6907, it is judged whether or not the up arrow key 502 has been operated and if the up arrow key 502 has been operated, step S6908 is entered while if a key besides the up arrow key 502 has been operated, step S6911 is entered. In step S6908, it is judged whether or not the cursor is currently positioned at the first tier Iris function menu icon, and if the cursor is at the first tier Iris function menu icon, step S6909 is entered while if the cursor is at a position besides the first tier Iris function menu icon, step S6910 is entered.

In step S6909, the transition confirmation menu (GO TOP menu), which is shown in FIG. 70 and is for choosing between returning or not returning the display on the display panel 107 to the startup menu, is displayed. Here, if the startup menu is to be returned to, the select key 501 is operated, and if not, the down arrow key 503 is operated and the first tier Iris menu is displayed again.

In step S6910, the cursor position is moved up one row and then step S6903 is entered, upon which the operation of the function setting switch 119 is awaited again.

In step S6911, it is judged whether or not the down arrow key 503 has been operated and if the down arrow key 503 has been operated, step S6912 is entered while if a key besides the down arrow key 503 has been operated, step S6914 is entered. In step S6912, it is judged whether or not the cursor is currently positioned at the bottom end, and if the cursor is at the bottom end, step S6903 is entered and the operation of the function setting switch 119 is awaited again. If the cursor is positioned at a position besides the bottom end, step S6913 is entered. In step S6913, the cursor position is moved down one row and then step S6903 is entered, upon which the operation of the function setting switch 119 is awaited again.

In step S6914, it is judged whether or not the left arrow key 504 has been operated and if the left arrow key 504 has been operated, step S6915 is entered while if a key besides the left arrow key 504 has been operated, step S6919 is entered.

In step S6915, it is judged whether or not the cursor is currently positioned at the first tier Iris function menu, and if the cursor is positioned at the first tier Iris function menu, step S6916 is entered while if the cursor is positioned at a position besides the first tier Iris function menu, step S6917 is entered. In step S6916, a transition to the first tier Iris menu is carried out. In step S6917, it is judged whether or not the cursor is currently positioned at the I_Gain position, and if the cursor is currently positioned at I_Gain, step S6903 is entered and the operation of the function setting switch 119 is awaited again.

If the cursor is currently positioned at a position besides I_Gain, step S6918 is entered. In step S6918, the function of the current cursor position is changed and then step S6903 is entered, upon which the operation of the function setting switch 119 is awaited again.

In step S6919, it is judged whether or not the cursor is currently positioned at the first tier Iris function menu, and if the cursor is positioned at the first tier Iris function menu, step S6920 is entered while if the cursor is positioned at a position besides the first tier Iris function menu, step S6921 is entered. In step S6920, a transition to the first tier Iris menu is carried out. In step S6921, it is judged whether or not the cursor is currently positioned at the I_Gain position, and if the cursor is currently positioned at I_Gain, step S6903 is entered and the operation of the function setting switch 119 is awaited again.

If the cursor is currently positioned at a position besides I_Gain, step S6922 is entered. In step S6922, the function of the current cursor position is changed and then step S6903 is entered to await the operation of the function setting switch 119 again.

The relationships between the display contents of the display panel 118 and the operations of the function setting switch 119 are shown in FIG. 71 to FIG. 74.

Figure 75A:
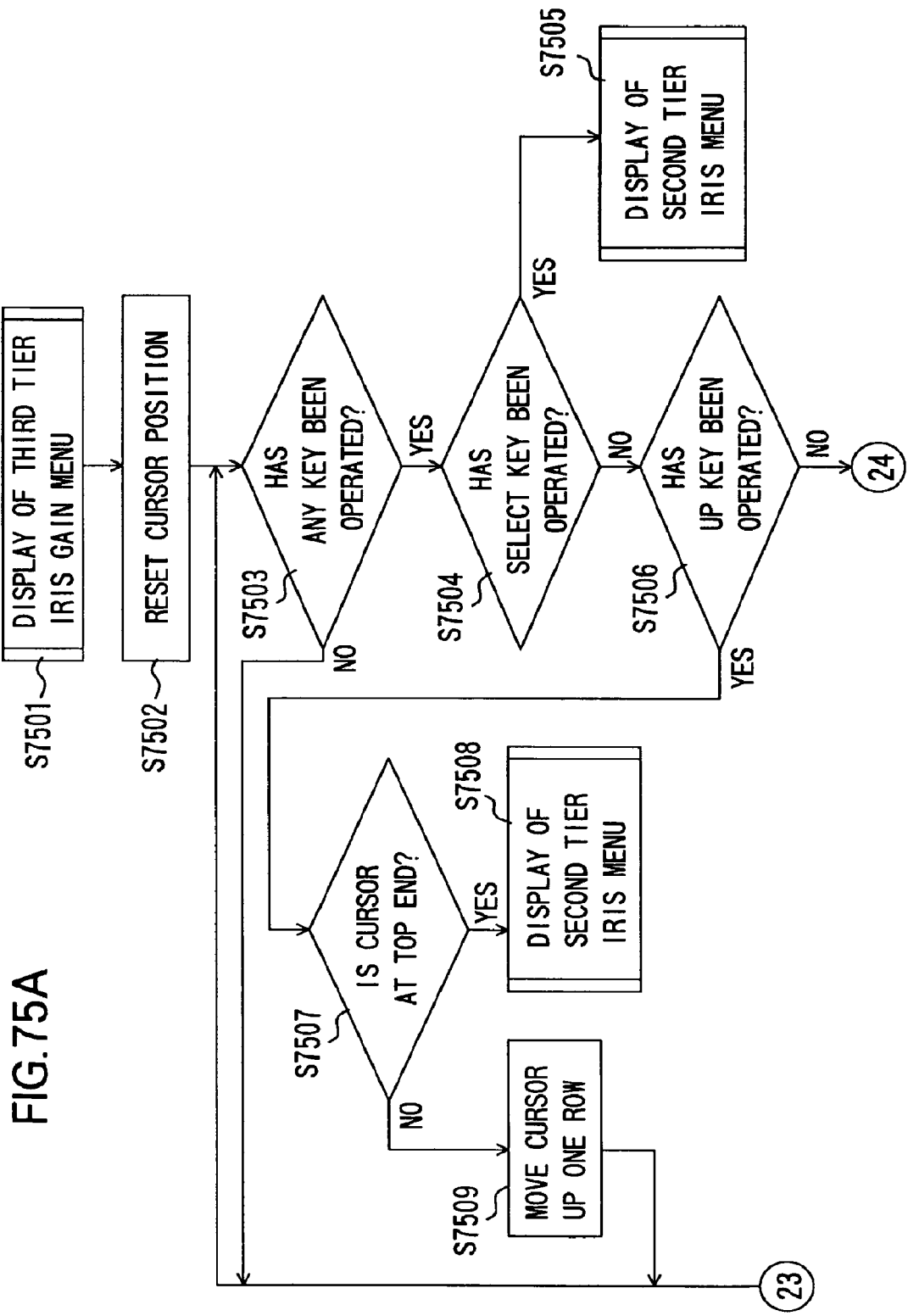
FIG. 75 is a display operation flowchart of the embodiment.
Figure 76:
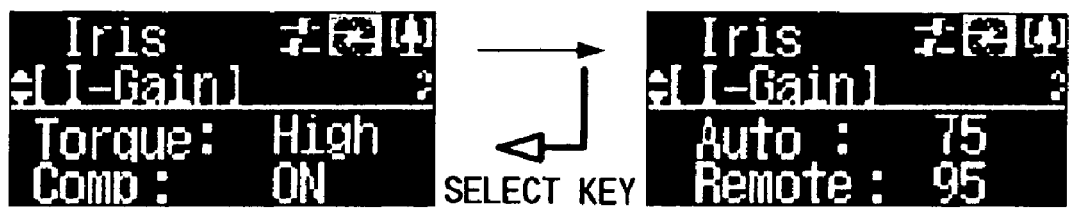
FIG. 76 is a detailed diagram of the display panel of the embodiment.

FIGS. 75A and 75B show the operation flow for a third tier Iris-Gain function menu, and in step S7501, the display of the display panel 118 is renewed as shown in FIG. 76. In step S7502, the cursor is positioned at the third tier Iris-Gain menu icon.

In step S7503, the operation of the function setting switch 119 is awaited. When any of the four arrow keys 502 to 505 or the select key 501 is operated, step S7504 is entered. In step S7504, it is judged whether or not the select key 501 has been operated, and if the select key 501 has been operated, step S7505 is entered while if a key besides the select key 501 has been operated, step S7506 is entered.

In step S7505, a transition to the second tier Iris function menu is carried out. In step S7506, it is judged whether or not the up arrow key 502 has been operated and if the up arrow key 502 has been operated, step S7507 is entered while if a key besides the up arrow key 502 has been operated, step S7510 is entered. In step S7507, it is judged whether or not the cursor is currently positioned at the top end, and if the cursor is currently positioned at the top end, step S7508 is entered while if the cursor is currently positioned at a position besides the top end, step S7509 is entered.

In step S7508, a transition to the second tier Iris function menu is carried out. In step S7509, the cursor position is moved up one row and then step S7503 is entered, upon which the operation of the function setting switch 119 is awaited again.

In step S7510, it is judged whether or not the down arrow key 503 has been operated and if the down arrow key 503 has been operated, step S7511 is entered while if a key besides the down arrow key 503 has been operated, step S7513 is entered. In step S7511, it is judged whether or not the cursor is currently positioned at the bottom end, and if the cursor is positioned at the bottom end, step S7503 is entered and the operation of the function setting switch 119 is awaited again. If the cursor is positioned at a position besides the bottom end, step S7512 is entered. In step S7512, the cursor position is moved down one row and then step S7503 is entered, upon which the operation of the function setting switch 119 is awaited again.

In step S7513, it is judged whether or not the left arrow key 504 has been operated and if the left arrow key 504 has been operated, step S7514 is entered while if a key besides the left arrow key 504 has been operated, step S7518 is entered. In step S7514, it is judged whether or not the cursor is currently positioned at the third tier Iris-Gain menu, and if the cursor is positioned at the third tier Iris-Gain menu, step S7503 is entered and the operation of the function setting switch 119 is awaited again. If the cursor is positioned at a position besides the third tier Iris-Gain menu, step S7515 is entered.

In step S7515, it is judged whether or not the cursor is currently positioned at the Auto position, and if the cursor is currently positioned at Auto, step S7516 is entered while if the cursor is positioned at a position besides Auto, step S7517 is entered. In step S7516, the Iris Auto Gain characteristic is changed and then step S7503 is entered to await the operation of the function setting switch 119 again.

In step S7517, the Iris Remote Gain characteristic is changed and then step S7503 is entered to await the operation of the function setting switch 119 again.

In step S7518, it is judged whether or not the cursor is currently positioned at the third tier Iris-Gain menu, and if the cursor is positioned at the third tier Iris-Gain menu, step S7503 is entered and the operation of the function setting switch 119 is awaited again. If the cursor is positioned at a position besides the third tier Iris-Gain menu, step S7519 is entered. In step S7519, it is judged whether or not the cursor is currently positioned at the Auto position, and if the cursor is currently positioned at Auto, step S7520 is entered while if the cursor is positioned at a position besides Auto, step S7521 is entered.

In step S7520, the Iris Auto Gain characteristic is changed and then step S7503 is entered to await the operation of the function setting switch 119 again. In step S7521, the Iris Remote Gain characteristic is changed and then step S7503 is entered to await the operation of the function setting switch 119 again.

Figure 77:
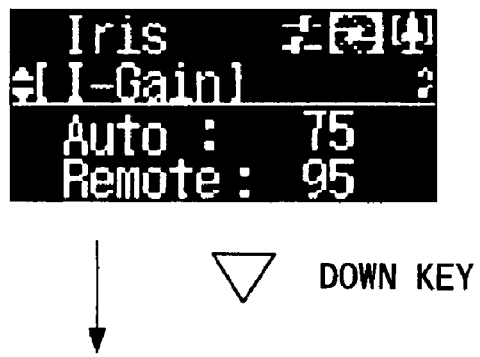
FIG. 77 is a detailed diagram of the display panel of the embodiment.
Figure 78:
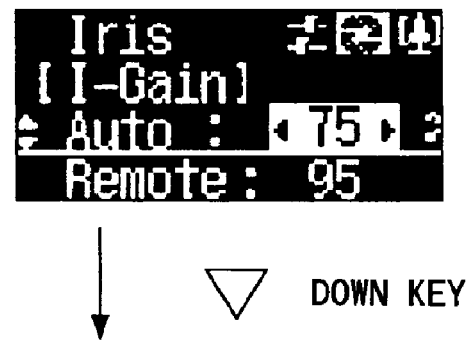
FIG. 78 is a detailed diagram of the display panel of the embodiment.

The relationships between the display contents of the display panel 118 and the operations of the function setting switch 119 are shown in FIG. 77 and FIG. 78.

The function by which settings can be changed in the Iris menu shall now be described.

The characteristic of Auto Iris Gain, with which the iris gain is controlled from the camera 500, and the characteristic of Remote Iris Gain, with which the iris gain is controlled from a demand, etc., can be set individually as shown in FIG. 71 to FIG. 74 and FIG. 76 to FIG. 78, respectively. Also, in order to improve manual operability, the setting of iris manual torque, the setting of iris compensation to ON or OFF when an extender is inserted, and the setting of close detection when compensation is ON are enabled.

Figure 79A:
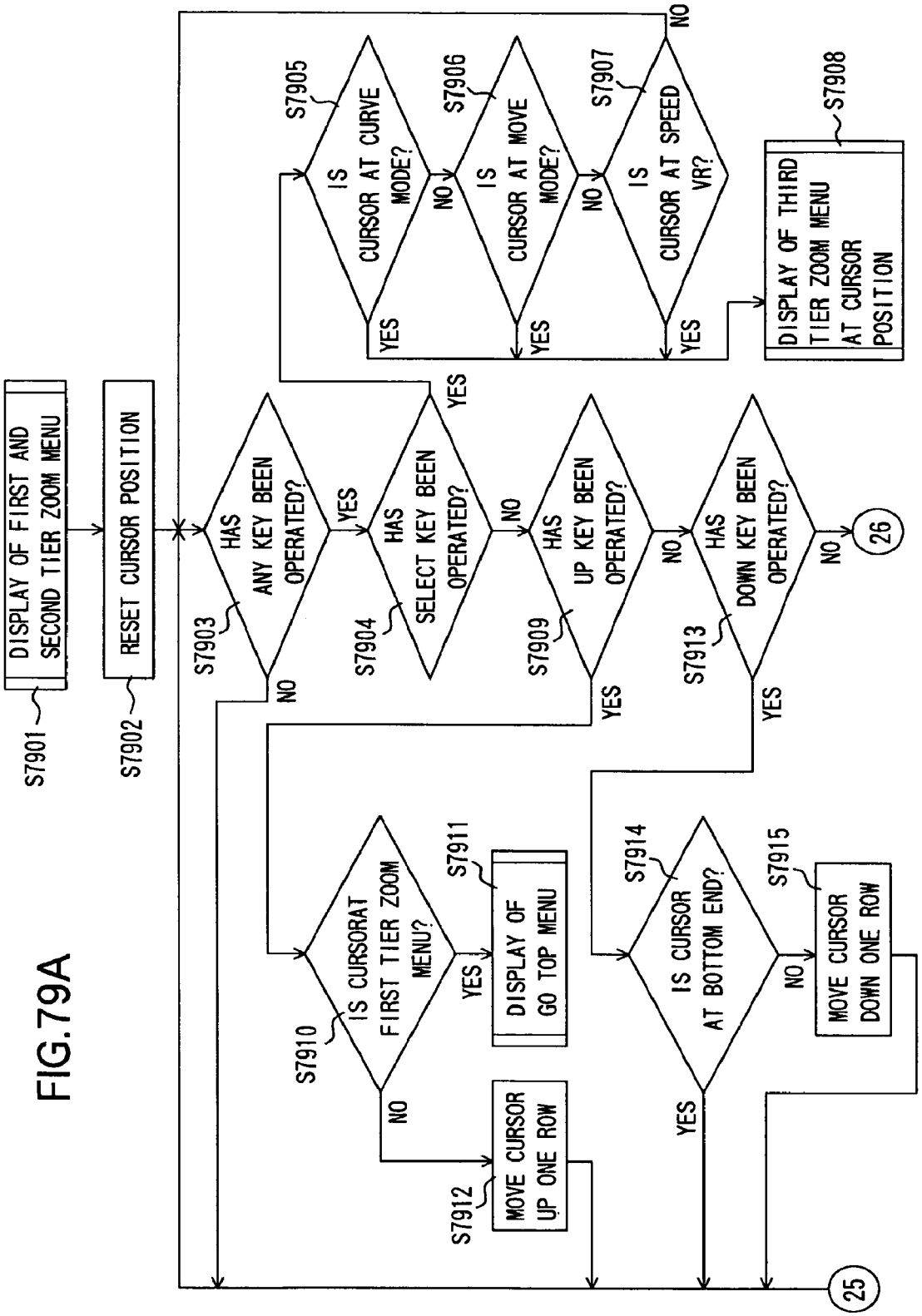
FIG. 79 is a display operation flowchart of the embodiment.
Figure 79B:
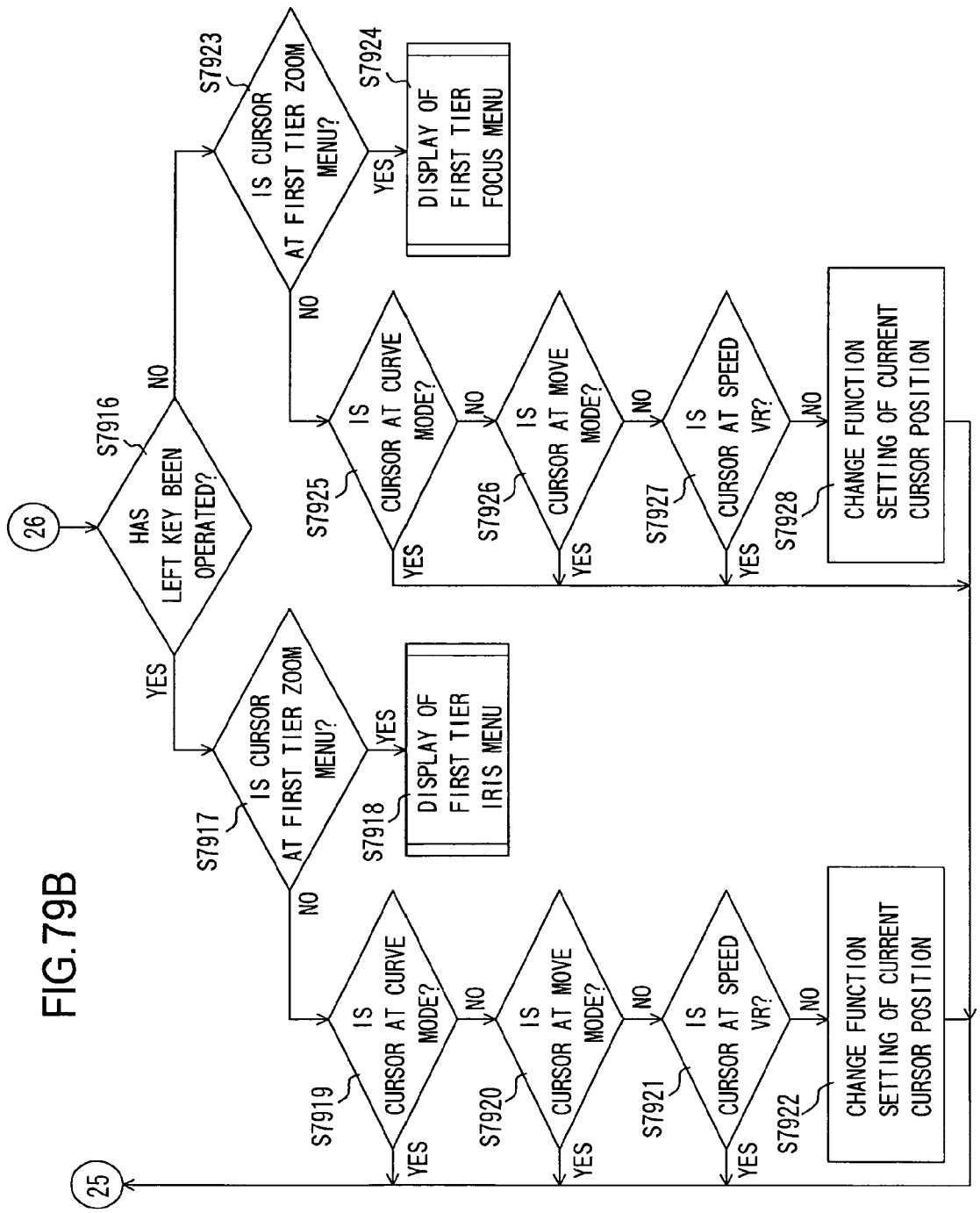

FIGS. 79A and 79B show the operation flow for the first tier and second tier Zoom function menus, and in step S7901, the display of the display panel 118 is renewed as shown in 706 of FIG. 7. In step S7902, the cursor position is set at the first tier Zoom menu icon.

In step S7903, the operation of the function setting switch 119 is awaited. When any of the four arrow keys 502 to 505 or the select key 501 is operated, step S7904 is entered. In step S7904, it is judged whether or not the select key 501 has been operated, and if the select key 501 has been operated, step S7905 is entered while if a key besides the select key 501 has been operated, step S7909 is entered.

In step S7905, it is judged whether or not the cursor is currently positioned at a second tier Curve Mode menu, and if the cursor is currently positioned at the second tier Curve Mode menu, step S7908 is entered while if the cursor is currently positioned at a position besides the second tier Curve Mode menu, step S7906 is entered. In step S7908, a transition to a third tier Zoom menu is carried out.

In step S7906, it is judged whether or not the cursor is currently positioned at a second tier Move Mode menu, and if the cursor is currently positioned at the second tier Move Mode menu, step S7908 is entered while if the cursor is currently positioned at a position besides the second tier Move Mode menu, step S7907 is entered.

In step S7907, it is judged whether or not the cursor is currently positioned at a second tier Speed VR menu, and if the cursor is currently positioned at the second tier Speed VR menu, step S7908 is entered while if the cursor is currently positioned at a position besides the second tier Speed VR menu, step S7903 is entered and the operation of the function setting switch 119 is awaited again.

In step S7909, it is judged whether or not the up arrow key 502 has been operated and if the up arrow key 502 has been operated, step S7910 is entered while if a key besides the up arrow key 502 has been operated, step S7913 is entered. In step S7910, it is judged whether or not the cursor is currently positioned at the first tier Zoom menu icon, and if the cursor is at the first tier Zoom menu icon, step S7911 is entered while if the cursor is at a position besides the first tier Zoom menu icon, step S7912 is entered.

In step S7911, the transition confirmation menu (GO TOP menu), which is for choosing between returning or not returning the display on the display panel 118 to the startup menu, is displayed. Here, if the startup menu is to be returned to, the select key 501 is operated, and if not, the down arrow key 503 is operated and the first tier Zoom menu is displayed again.

In step S7912, the cursor position is moved up one row and then step S7903 is entered, upon which the operation of the function setting switch 119 is awaited again.

In step S7913, it is judged whether or not the down arrow key 503 has been operated and if the down arrow key 503 has been operated, step S7914 is entered while if a key besides the down arrow key 503 has been operated, step S7916 is entered. In step S7914, it is judged whether or not the cursor is currently positioned at the bottom end, and if the cursor is at the bottom end, step S7903 is entered and the operation of the function setting switch 119 is awaited again. If the cursor is positioned at a position besides the bottom end, step S7915 is entered. In step S7915, the cursor position is moved down one row and then step S7903 is entered, upon which the operation of the function setting switch 119 is awaited again.

In step S7916, it is judged whether or not the left arrow key 504 has been operated and if the left arrow key 504 has been operated, step S7917 is entered while if a key besides the left arrow key 504 has been operated, step S7923 is entered. In step S7917, it is judged whether or not the cursor is currently positioned at the first tier Zoom menu, and if the cursor is positioned at the first tier Zoom menu, step S7918 is entered while if the cursor is positioned at a position besides the first tier Zoom menu, step S7919 is entered. In step S7918, a transition to the first tier Iris menu is carried out. In step S7919, it is judged whether or not the cursor is currently positioned at the Curve Mode position, and if the cursor is currently positioned at Curve Mode, step S7903 is entered and the operation of the function setting switch 119 is awaited again. If the cursor is currently positioned at a position besides Curve Mode, step S7920 is entered.

In step S7920, it is judged whether or not the cursor is currently positioned at the Move Mode position, and if the cursor is currently positioned at Move Mode, step S7903 is entered and the operation of the function setting switch 119 is awaited again. If the cursor is currently positioned at a position besides Move Mode, step S7921 is entered.

In step S7921, it is judged whether or not the cursor is currently positioned at the Speed VR position, and if the cursor is currently positioned at Speed VR, step S7903 is entered and the operation of the function setting switch 119 is awaited again. If the cursor is currently positioned at a position besides Speed VR, step S7922 is entered. In step S7922, the function of the current cursor position is changed and then step S7903 is entered to await the operation of the function setting switch 119 again.

In step S7923, it is judged whether or not the cursor is currently positioned at the first tier Zoom menu, and if the cursor is positioned at the first tier Zoom menu, step S7924 is entered while if the cursor is positioned at a position besides the first tier Zoom menu, step S7925 is entered. In step S7924, a transition to the first tier Focus menu is carried out. In step S7925, it is judged whether or not the cursor is currently positioned at the Curve Mode position, and if the cursor is currently positioned at Curve Mode, step S7903 is entered and the operation of the function setting switch 119 is awaited again. If the cursor is currently positioned at a position besides Curve Mode, step S7926 is entered.

In step S7926, it is judged whether or not the cursor is currently positioned at the Move Mode position, and if the cursor is currently positioned at Move Mode, step S7903 is entered and the operation of the function setting switch 119 is awaited again. If the cursor is currently positioned at a position besides Move Mode, step S7927 is entered.

In step S7927, it is judged whether or not the cursor is currently positioned at the Speed VR position, and if the cursor is currently positioned at Speed VR, step S7903 is entered and the operation of the function setting switch 119 is awaited again. If the cursor is currently positioned at a position besides Speed VR, step S7928 is entered. In step S7928, the function of the current cursor position is changed and then step S7903 is entered to await the operation of the function setting switch 119 again.

The relationships between the display contents of the display panel 118 and the operations of the function setting switch 119 are shown in FIG. 80 to FIG. 87.

Figure 88A:
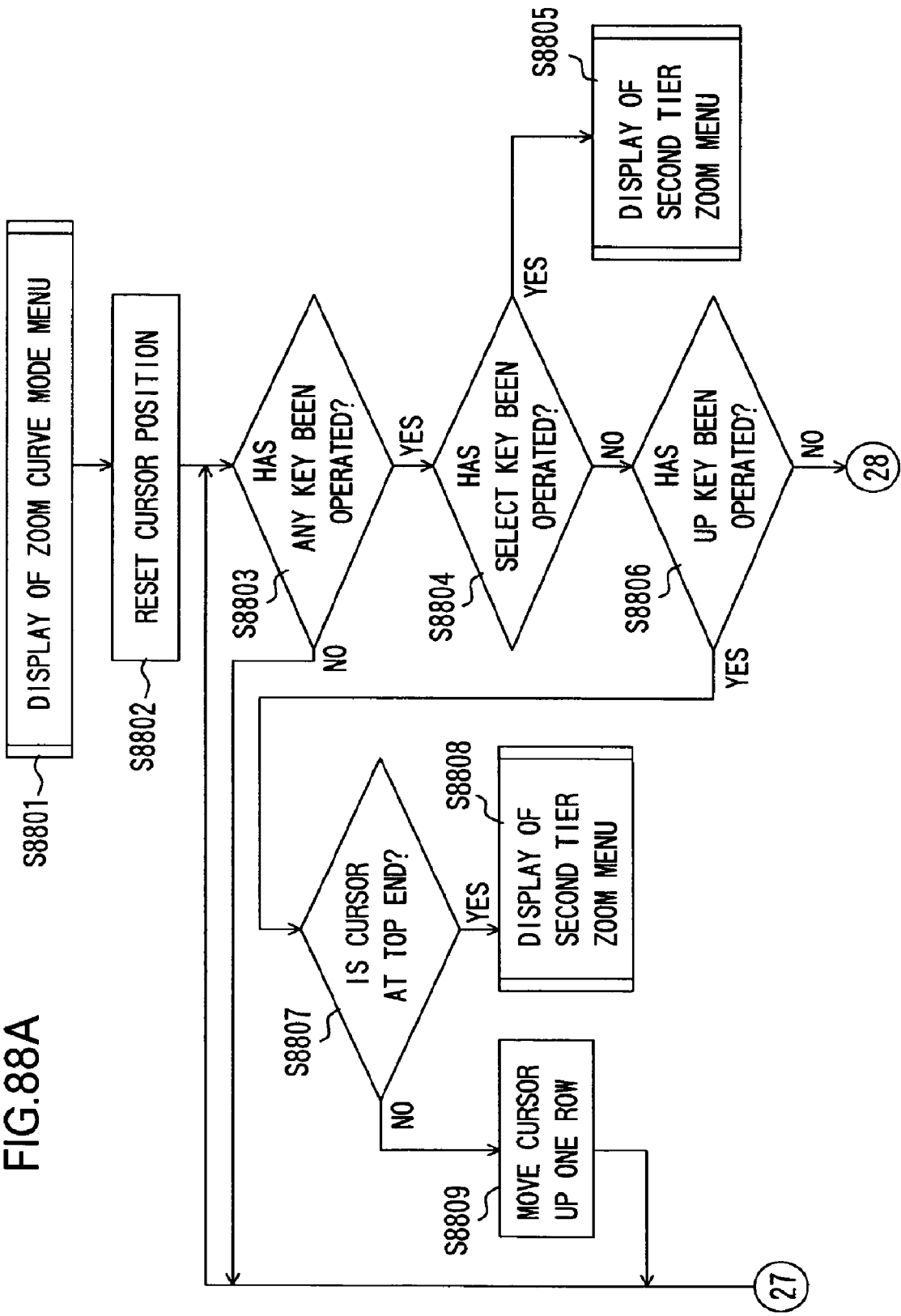
FIG. 88 is a display operation flowchart of the embodiment.
Figure 88B:
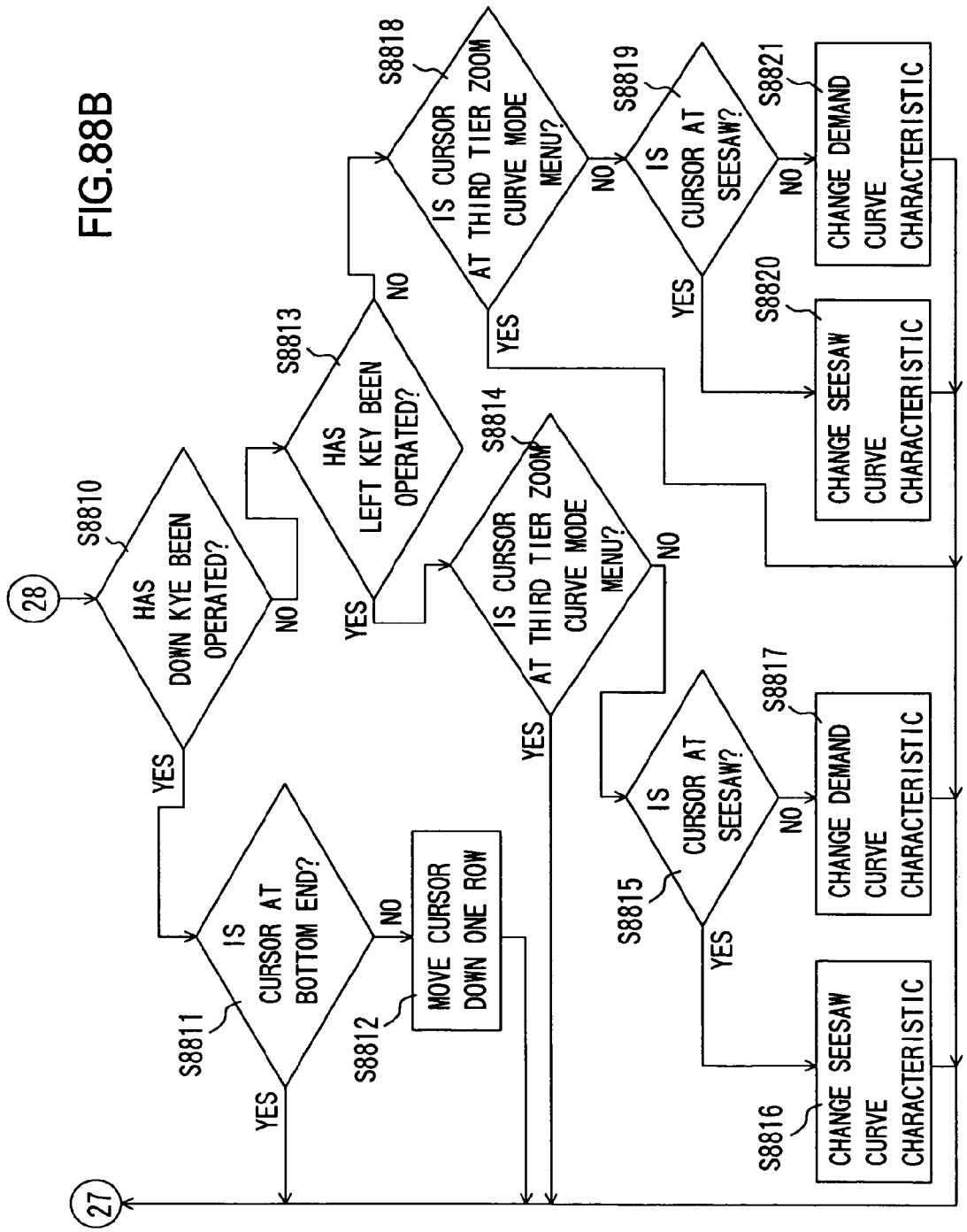

FIGS. 88A and 88B show the operation flow for a third tier Zoom Curve Mode function menu, and in step S8801, the display of the display panel 118 is renewed as shown in FIG. 89. In step S8802, the cursor is positioned at the third tier Zoom Curve Mode position.

In step S8803, the operation of the function setting switch 119 is awaited. When any of the four arrow keys 502 to 505 or the select key 501 is operated, step S8804 is entered. In step S8804, it is judged whether or not the select key 501 has been operated, and if the select key 501 has been operated, step S8805 is entered while if a key besides the select key 501 has been operated, step S8806 is entered. In step S8805, a transition to the second tier Zoom function menu is carried out. In step S8806, it is judged whether or not the up arrow key 502 has been operated and if the up arrow key 502 has been operated, step S8807 is entered while if a key besides the up arrow key 502 has been operated, step S8810 is entered.

In step S8807, it is judged whether or not the cursor is currently positioned at the top end, and if the cursor is currently positioned at the top end, step S8808 is entered while if the cursor is currently positioned at a position besides the top end, step S8809 is entered. In step S8808, a transition to the second tier Zoom function setting menu is carried out. In step S8809, the cursor position is moved up one row and then step S8803 is entered, upon which the operation of the function setting switch 119 is awaited again. In step S8810, it is judged whether or not the down arrow key 503 has been operated and if the down arrow key 503 has been operated, step S8811 is entered while if a key besides the down arrow key 503 has been operated, step S8813 is entered. In step S8811, it is judged whether or not the cursor is currently positioned at the bottom end, and if the cursor is positioned at the bottom end, step S8803 is entered and the operation of the function setting switch 119 is awaited again. If the cursor is positioned at a position besides the bottom end, step S8812 is entered. In step S8812, the cursor position is moved down one row and then step S8803 is entered, upon which the operation of the function setting switch 119 is awaited again.

In step S8813, it is judged whether or not the left arrow key 504 has been operated and if the left arrow key 504 has been operated, step S8814 is entered while if a key besides the left arrow key 504 has been operated, step S8818 is entered. In step S8814, it is judged whether or not the cursor is currently positioned at the third tier Zoom Curve Mode menu, and if the cursor is positioned at the first tier Zoom Curve Mode menu, step S8803 is entered and the operation of the function setting switch 119 is awaited again. If the cursor is positioned at a position besides the third tier Zoom Curve Mode menu, step S8815 is entered. In step S8815, it is judged whether or not the cursor is currently positioned at the Seesaw position, and if the cursor is currently positioned at Seesaw, step S8816 is entered while if the cursor is positioned at a position besides Seesaw, step S8817 is entered.

In step S8816, the zoom seesaw curve characteristic is changed as shown in FIG. 90 and then step S8803 to await the operation of the function setting switch 119 again. In step S8817, the demand curve characteristic is changed as shown in FIG. 91 and then step S8803 is entered to await the operation of the function setting switch 119 again.

In step S8818, it is judged whether or not the cursor is currently positioned at the third tier Zoom Curve Mode menu, and if the cursor is positioned at the first tier Zoom Curve Mode menu, step S8803 is entered and the operation of the function setting switch 119 is awaited again. If the cursor is positioned at a position besides the third tier Zoom Curve Mode menu, step S8819 is entered. In step S8819, it is judged whether or not the cursor is currently positioned at the Seesaw position, and if the cursor is currently positioned at Seesaw, step S8820 is entered while if the cursor is positioned at a position besides Seesaw, step S8821 is entered.

In step S8820, the zoom seesaw curve characteristic is changed and then step S8803 is entered to await the operation of the function setting switch 119 again. In step S8821, the demand curve characteristic is changed and then step S8803 is entered to await the operation of the function setting switch 119 again.

Figure 92A:
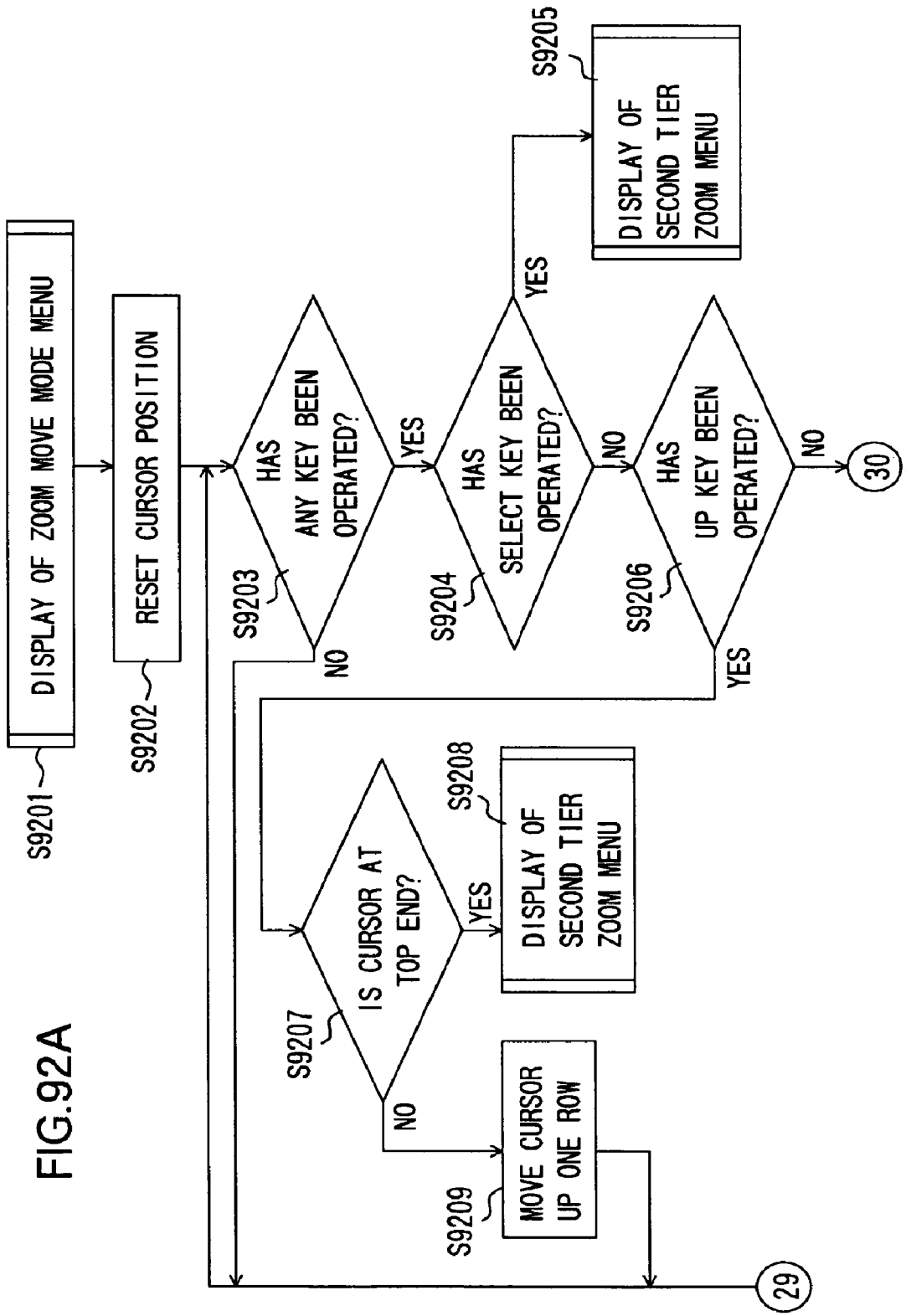
FIG. 92 is a display operation flowchart of the embodiment.

FIGS. 92A and 92B show the operation flow for a third tier Zoom Move Mode function menu, and in step S9201, the display of the display panel 118 is renewed as shown in FIG. 93. In step S9202, the cursor is positioned at the third tier Zoom Move Mode position.

In step S9203, the operation of the function setting switch 119 is awaited. When any of the four arrow keys 502 to 505 or the select key 501 is operated, step S9204 is entered. In step S9204, it is judged whether or not the select key 501 has been operated, and if the select key 501 has been operated, step S9205 is entered while if a key besides the select key 501 has been operated, step S9206 is entered. In step S9205, a transition to the second tier Zoom function menu is carried out. In step S9206, it is judged whether or not the up arrow key 502 has been operated and if the up arrow key 502 has been operated, step S9207 is entered while if a key besides the up arrow key 502 has been operated, step S9210 is entered. In step S9207, it is judged whether or not the cursor is currently positioned at the top end, and if the cursor is currently positioned at the top end, step S9208 is entered while if the cursor is currently positioned at a position besides the top end, step S9209 is entered. In step S9208, a transition to the second tier Zoom function setting menu is carried out.

In step S9209, the cursor position is moved up one row and then step S8803 is entered, upon which the operation of the function setting switch 119 is awaited again.

In step S9210, it is judged whether or not the down arrow key 503 has been operated and if the down arrow key 503 has been operated, step S9211 is entered while if a key besides the down arrow key 503 has been operated, step S9213 is entered.

In step S9211, it is judged whether or not the cursor is currently positioned at the bottom end, and if the cursor is positioned at the bottom end, step S9203 is entered and the operation of the function setting switch 119 is awaited again. If the cursor is positioned at a position besides the bottom end, step S9212 is entered. In step S9212, the cursor position is moved down one row and then step S9203 is entered, upon which the operation of the function setting switch 119 is awaited again.

In step S9213, it is judged whether or not the left arrow key 504 has been operated and if the left arrow key 504 has been operated, step S9214 is entered while if a key besides the left arrow key 504 has been operated, step S9216 is entered. In step S9214, it is judged whether or not the cursor is currently positioned at the third tier Zoom Move Mode menu, and if the cursor is positioned at the third tier Zoom Move Mode menu, step S9203 is entered and the operation of the function setting switch 119 is awaited again. If the cursor is positioned at a position besides the third tier Zoom Move Mode menu, step S9215 is entered.

In step S9215, the zoom characteristic (zoom start, stop, or limit setting) of the current cursor position is changed as shown in FIG. 94 to FIG. 96 and then step S9203 is entered to await the operation of the function setting switch 119 again.

In step S9216, it is judged whether or not the cursor is currently positioned at the third tier Zoom Move Mode menu, and if the cursor is positioned at the third tier Zoom Move Mode menu, step S9203 is entered and the operation of the function setting switch 119 is awaited again. If the cursor is positioned at a position besides the third tier Zoom Move Mode menu, step S9217 is entered. In step S9217, the zoom characteristic of the current cursor position is changed and then step S9203 is entered to await the operation of the function setting switch 119 again The relationships between the display contents of the display panel 118 and the operations of the function setting switch 119 are shown in FIG. 94 to FIG. 96.

Figure 97A:
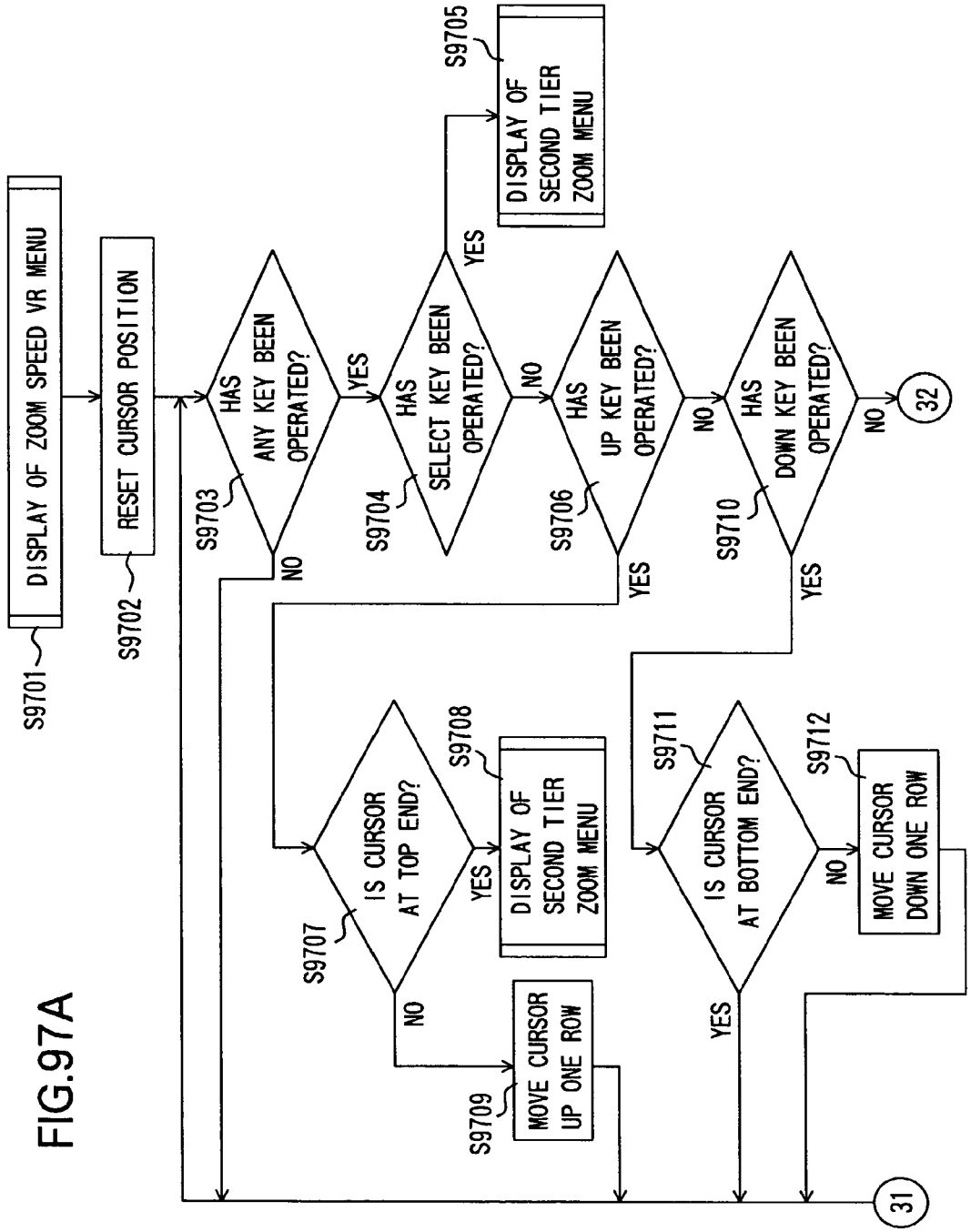
FIG. 97 is a display operation flowchart of the embodiment.
Figure 97B:
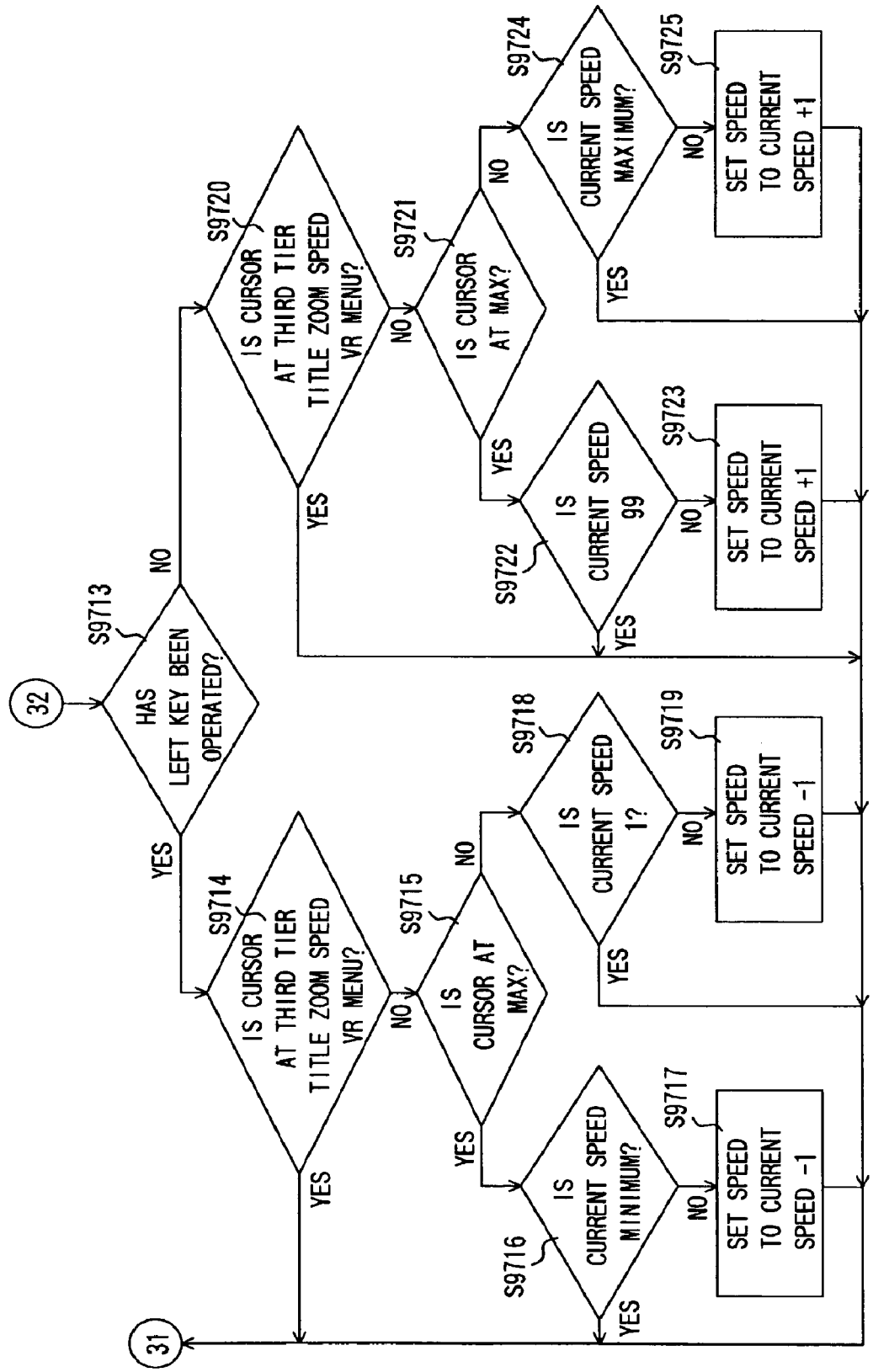
Figure 98:
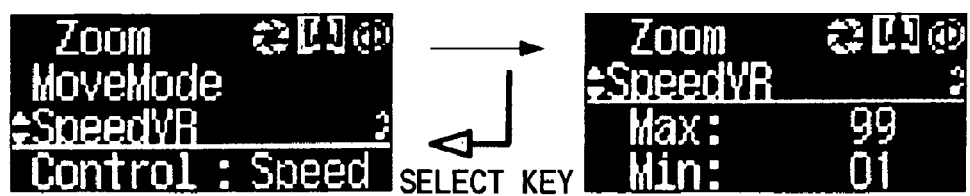
FIG. 98 is a detailed diagram of the display panel of the embodiment.

FIGS. 97A and 97B show the operation flow for a third tier Zoom Speed VR function menu, and in step S9701, the display of the display panel 118 is renewed as shown in FIG. 98. In step S9702, the cursor is positioned at the third tier Zoom Speed VR position.

In step S9703, the operation of the function setting switch 119 is awaited. When any of the four arrow keys 502 to 505 or the select key 501 is operated, step S9704 is entered. In step S9704, it is judged whether or not the select key 501 has been operated, and if the select key 501 has been operated, step S9705 is entered while if a key besides the select key 501 has been operated, step S9706 is entered. In step S9705, a transition to the second tier Zoom function menu is carried out.

In step S9706, it is judged whether or not the up arrow key 502 has been operated and if the up arrow key 502 has been operated, step S9707 is entered while if a key besides the up arrow key 502 has been operated, step S9710 is entered. In step S9707, it is judged whether or not the cursor is currently positioned at the top end, and if the cursor is currently positioned at the top end, step S9708 is entered while if the cursor is currently positioned at a position besides the top end, step S9709 is entered. In step S9708, a transition to the second tier Zoom function setting menu is carried out.

In step S9709, the cursor position is moved up one row and then step S9703 is entered, upon which the operation of the function setting switch 119 is awaited again. In step S9710, it is judged whether or not the down arrow key 503 has been operated and if the down arrow key 503 has been operated, step S9711 is entered while if a key besides the down arrow key 503 has been operated, step S9713 is entered. In step S9711, it is judged whether or not the cursor is currently positioned at the bottom end, and if the cursor is positioned at the bottom end, step S9703 is entered and the operation of the function setting switch 119 is awaited again. If the cursor is positioned at a position besides the bottom end, step S9712 is entered. In step S9712, the cursor position is moved down one row and then step S9703 is entered, upon which the operation of the function setting switch 119 is awaited again.

In step S9713, it is judged whether or not the left arrow key 504 has been operated and if the left arrow key 504 has been operated, step S9714 is entered while if a key besides the left arrow key 504 has been operated, step S9720 is entered.

In step S9714, it is judged whether or not the cursor is currently positioned at the third tier Zoom Speed VR menu, and if the cursor is positioned at the third tier Zoom Speed VR menu, step S9703 is entered and the operation of the function setting switch 119 is awaited again. If the cursor is positioned at a position besides the third tier Zoom Speed VR menu, step S9715 is entered. In step S9715, it is judged whether or not the cursor is currently positioned at the Max position and if the cursor is currently positioned at Max, step S9716 is entered while if the cursor is currently positioned at a position besides Max, step S9718 is entered.

In step S9716, it is judged whether or not the current speed setting value is the minimum value, and if the current speed setting value is the minimum value, step S9703 is entered and the operation of the function setting switch 119 is awaited again. If the current speed setting value is not the minimum value, step S9717 is entered. In step S9717, the speed setting value is shifted down by one from the current speed and then step S9703 is entered, upon which the operation of the function setting switch 119 is awaited again.

In step S9718, it is judged whether or not the current speed setting value is 1, and if the current speed setting value is 1, step S9703 is entered and the operation of the function setting switch 119 is awaited again. If the current speed value is a value besides 1, step S9719 is entered. In step S9719, the speed setting value is shifted down by one from the current speed, and then step S9703 is entered, upon which the operation of the function setting switch 119 is awaited again.

In step S9720, it is judged whether or not the cursor is currently positioned at the third tier Zoom Speed VR menu, and if the cursor is positioned at the third tier Zoom Speed VR menu, step S9703 is entered and the operation of the function setting switch 119 is awaited again. If the cursor is positioned at a position besides the third tier Zoom Speed VR menu, step S9721 is entered. In step S9721, it is judged whether or not the cursor is currently positioned at the Max position and if the cursor is currently positioned at Max, step S9722 is entered while if the cursor is currently positioned at a position besides Max, step S9724 is entered.

In step S9722, it is judged whether or not the current speed setting value is 99, and if the current speed setting value is 99, step S9703 is entered and the operation of the function setting switch 119 is awaited again. If the current speed setting value is not 99, step S9723 is entered. In step S9723, the speed setting value is shifted up by one from the current speed and then step S9703 is entered to await the operation of the function setting switch 119 again. In step S9724, it is judged whether or not the current speed setting value is the maximum, and if the current speed setting value is the maximum, step S9703 is entered and the operation of the function setting switch 119 is awaited again.

Figure 99:
FIG. 99 is a detailed diagram of the display panel of the embodiment.
Figure 100:
FIG. 100 is a detailed diagram of the display panel of the embodiment.

If the current speed value is not the maximum, step S9725 is entered. In step S9725, the speed setting value is shifted up by one from the current speed and then step S9703 is entered, upon which the operation of the function setting switch 119 is awaited again. The maximum speed and minimum speed for zooming can be set as shown in FIG. 99 and FIG. 100, respectively.

Figure 101A:
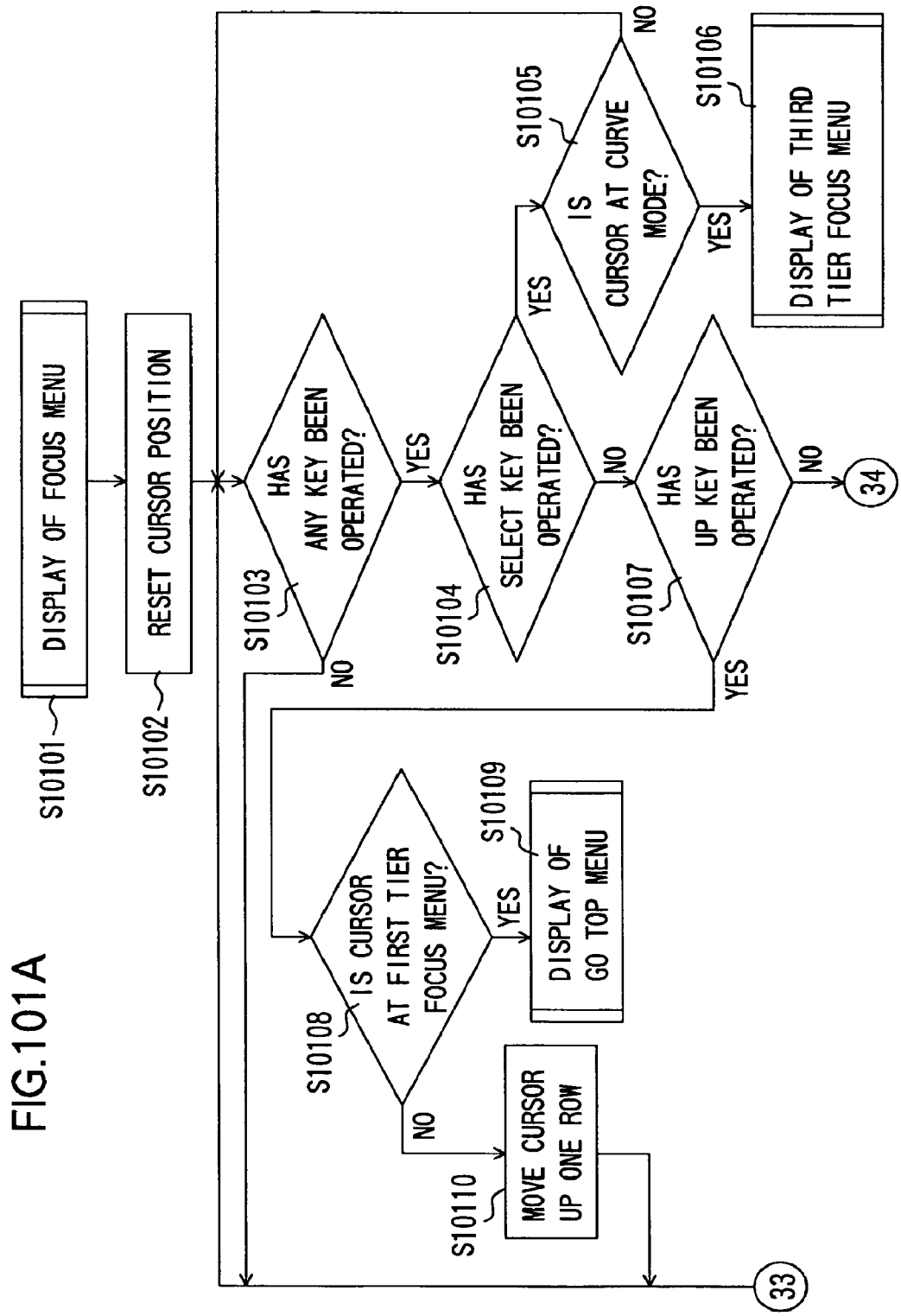
FIG. 101 is a display operation flowchart of the embodiment.

FIGS. 101A and 101B show the operation flow for first tier and second tier Focus function menus, and in step S10101, the display of the display panel 118 is renewed as shown in 707 of FIG. 7. In step S10102, the cursor position is set at the first tier Focus function icon.

In step S10103, the operation of the function setting switch 119 is awaited. When any of the four arrow keys 502 to 505 or the select key 501 is operated, step S10104 is entered. In step S10104, it is judged whether or not the select key 501 has been operated, and if the select key 501 has been operated, step S10105 is entered while if a key besides the select key 501 has been operated, step S10107 is entered. In step S10105, it is judged whether or not the cursor is currently positioned at the Curve Mode position, and if the cursor is currently positioned at the Curve Mode position, step S10106 is entered while if the cursor is currently positioned at a position besides the Curve Mode position, step S10103 is entered and the operation of the function setting switch 119 is awaited again. In step S10106, a transition to a third tier Focus function menu is carried out. In step S10107, it is judged whether or not the up arrow key 502 has been operated and if the up arrow key 502 has been operated, step S10108 is entered while if a key besides the up arrow key 502 has been operated, step S10111 is entered.

In step S10108, it is judged whether or not the cursor is currently positioned at the first tier Focus function icon, and if the cursor is currently positioned at the first tier Focus function menu icon, step S10109 is entered while if the cursor is currently positioned at a position besides the first tier Focus function menu icon, step S10110 is entered. In step S10109, the transition confirmation menu (GO TOP menu), which is for choosing between returning or not returning the display on the display panel 118 to the startup menu, is displayed. Here, if the startup menu is to be returned to, the select key 501 is operated, and if not, the down arrow key 503 is operated and the first tier Focus function menu is displayed again.

In step S10110, the cursor position is moved up one row and then step S10103 is entered, upon which the operation of the function setting switch 119 is awaited again. In step S10111, it is judged whether or not the down arrow key 503 has been operated and if the down arrow key 503 has been operated, step S10112 is entered while if a key besides the down arrow key 503 has been operated, step S10114 is entered. In step S10112, it is judged whether or not the cursor is currently positioned at the bottom end, and if the cursor is at the bottom end, step S10103 is entered and the operation of the function setting switch 119 is awaited again. If the cursor is positioned at a position besides the bottom end, step S10113 is entered.

In step S10113, the cursor position is moved down one row and then step S10103 is entered, upon which the operation of the function setting switch 119 is awaited again. In step S10114, it is judged whether or not the left arrow key 504 has been operated and if the left arrow key 504 has been operated, step S10115 is entered while if a key besides the left arrow key 504 has been operated, step S10117 is entered. In step S10115, it is judged whether or not the cursor is currently positioned at the first tier Focus function menu icon, and if the cursor is currently positioned at the first tier Focus function icon, step S10116 is entered while if the cursor is currently positioned at a position besides the first tier Focus function icon, step S10103 is entered and the operation of the function setting switch 119 is awaited again.

In step S10116, a transition to the first tier Zoom function menu is carried out.

In step S10117, it is judged whether or not the cursor is currently positioned at the first tier Focus function menu icon, and if the cursor is currently positioned at first tier Focus function menu icon, step S10118 is entered while if the cursor is currently positioned at a position besides the first tier Focus function icon, step S10103 is entered and the operation of the function setting switch 119 is awaited again. In step S10118, a transition to the first tier Info function menu is carried out.

The relationship between the display contents of the display panel 118 and the operations of the function setting switch 119 is shown in FIG. 102.

Figure 103A:
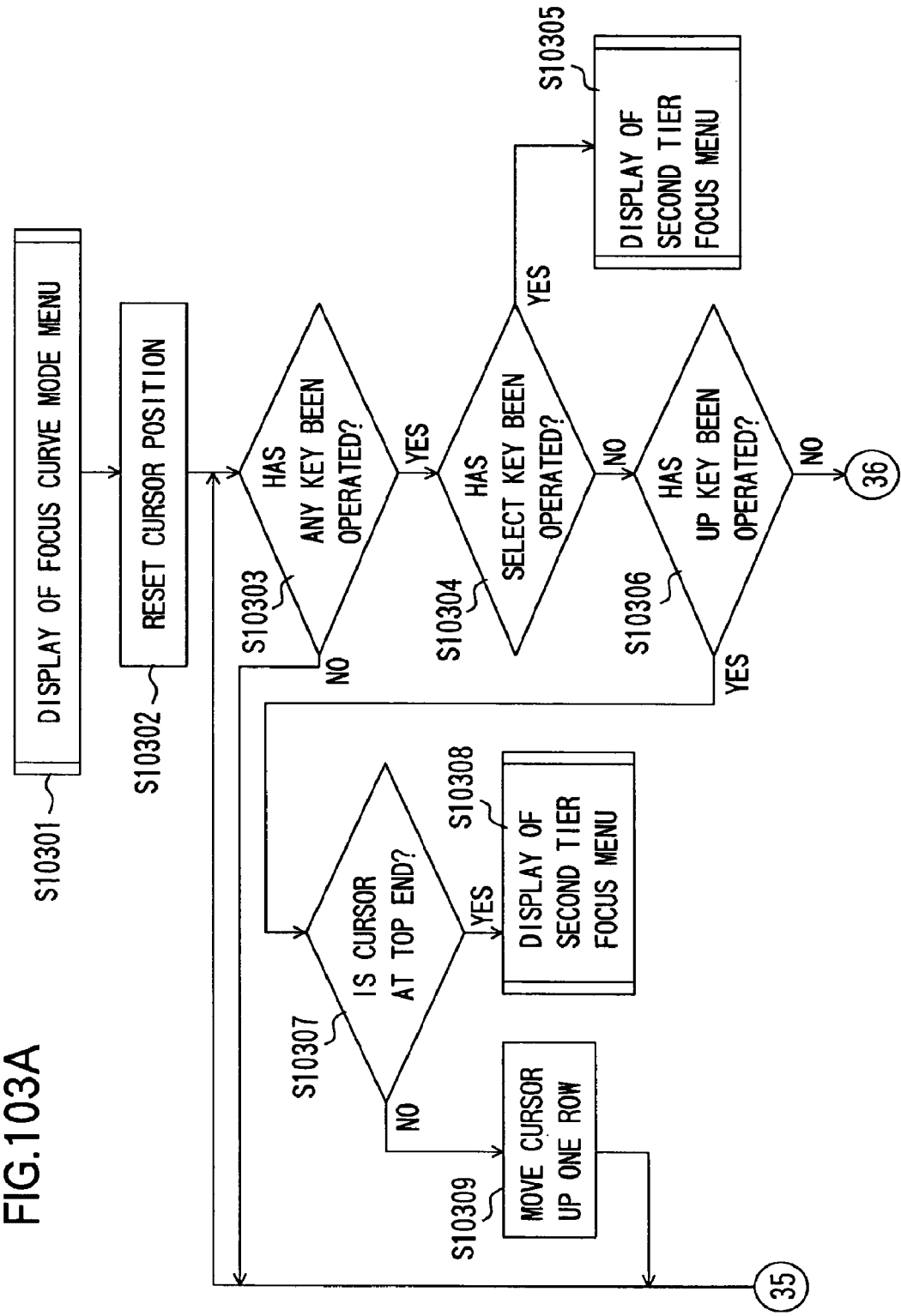
FIG. 103 is a display operation flowchart of the embodiment.
Figure 103B:
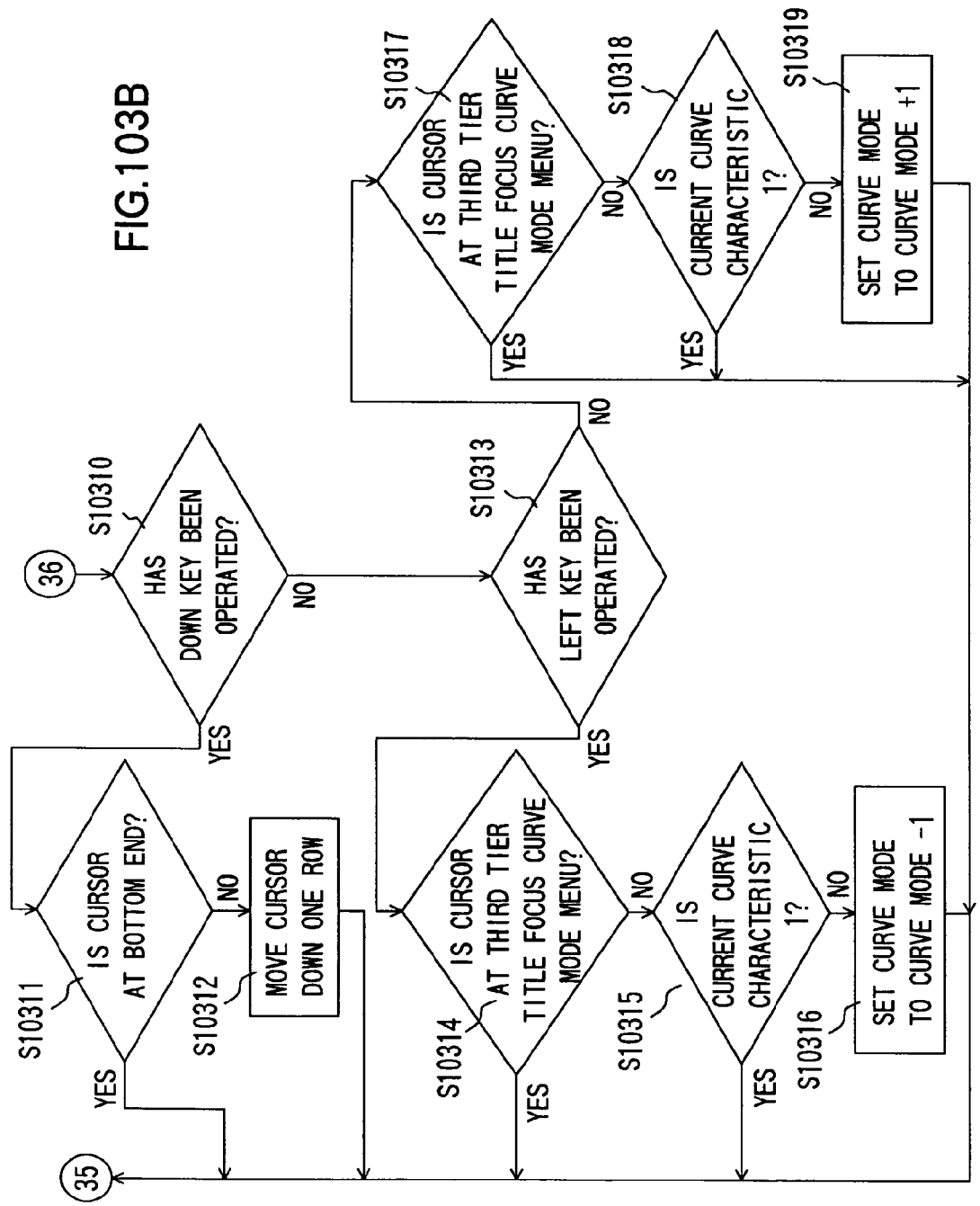
Figure 104:
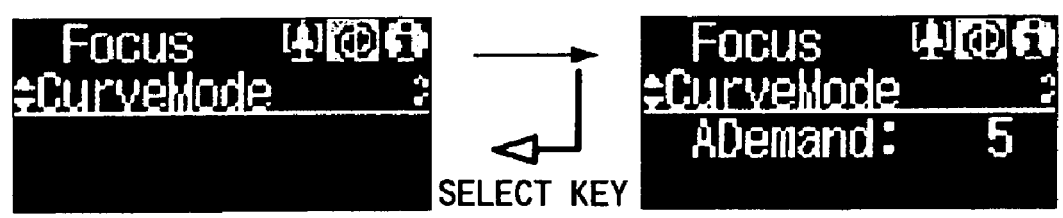
FIG. 104 is a detailed diagram of the display panel of the embodiment.

FIGS. 103A and 103B show the operation flow for a third tier Focus Curve Mode setting menu, and in step S10301, the display of the display panel 118 is renewed as shown in FIG. 104. In step S10302, the cursor is positioned at the third tier Focus Curve Mode position.

In step S10303, the operation of the function setting switch 119 is awaited. When any of the four arrow keys 502 to 505 or the select key 501 is operated, step S10304 is entered. In step S10304, it is judged whether or not the select key 501 has been operated, and if the select key 501 has been operated, step S10305 is entered while if a key besides the select key 501 has been operated, step S10306 is entered. In step S10305, a transition to the second tier Focus function menu is carried out. In step S10306, it is judged whether or not the up arrow key 502 has been operated and if the up arrow key 502 has been operated, step S10307 is entered while if a key besides the up arrow key 502 has been operated, step S10310 is entered. In step S10307, it is judged whether or not the cursor is currently positioned at the top end, and if the cursor is currently positioned at the top end, step S10308 is entered while if the cursor is currently positioned at a position besides the top end, step S10309 is entered.

In step S10308, a transition to the second tier Focus function setting menu is carried out. In step S10309, the cursor position is moved up one row and then step S10303 is entered, upon which the operation of the function setting switch 119 is awaited again.

In step S10310, it is judged whether or not the down arrow key 503 has been operated and if the down arrow key 503 has been operated, step S10311 is entered while if a key besides the down arrow key 503 has been operated, step S10313 is entered. In step S10311, it is judged whether or not the cursor is currently positioned at the bottom end, and if the cursor is positioned at the bottom end, step S10303 is entered and the operation of the function setting switch 119 is awaited again. If the cursor is positioned at a position besides the bottom end, step S10312 is entered. In step S10312, the cursor position is moved down one row and then step S10303 is entered, upon which the operation of the function setting switch 119 is awaited again.

In step S10313, it is judged whether or not the left arrow key 504 has been operated and if the left arrow key 504 has been operated, step S10314 is entered while if a key besides the left arrow key 504 has been operated, step S10317 is entered. In step S10314, it is judged whether or not the cursor is currently positioned at the third tier Focus Curve Mode menu, and if the cursor is positioned at the third tier Focus Curve Mode menu, step S10303 is entered and the operation of the function setting switch 119 is awaited again. If the cursor is positioned at a position besides the third tier Focus Curve Mode menu, step S10315 is entered.

In step S10315, it is judged whether or not the current focus demand curve characteristic is 1, and if the current focus demand curve characteristic is 1, step S10303 is entered and the operation of the function setting switch 119 is awaited again. If the current focus demand curve characteristic is a value besides 1, step S10316 is entered. In step S10316, the current focus demand curve characteristic is shifted down by one and then step S10303 is entered, upon which the operation of the function setting switch 119 is awaited again.

In step S10317, it is judged whether or not the cursor is currently positioned at the third tier Focus Curve Mode menu, and if the cursor is positioned at the third tier Focus Curve Mode menu, step S10303 is entered and the operation of the function setting switch 119 is awaited again. If the cursor is positioned at a position besides the third tier Focus Curve Mode menu, step S10318 is entered. In step S10318, it is judged whether or not the current focus demand curve characteristic is 1, and if the current focus demand curve characteristic is 1, step S10303 is entered and the operation of the function setting switch 119 is awaited again. If the current focus demand curve characteristic is a value besides 1, step S10319 is entered. In step S10319, the current focus demand curve characteristic is shifted up by one and then step S10303 is entered, upon which the operation of the function setting switch 119 is awaited again.

Figure 105:
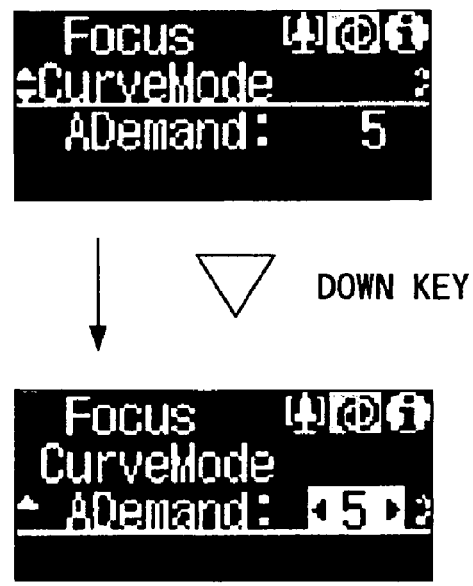
FIG. 105 is a detailed diagram of the display panel of the embodiment.

The relationship between the display contents of the display panel 118 and the operations of the function setting switch 119 is shown in FIG. 105.

Figure 106A:
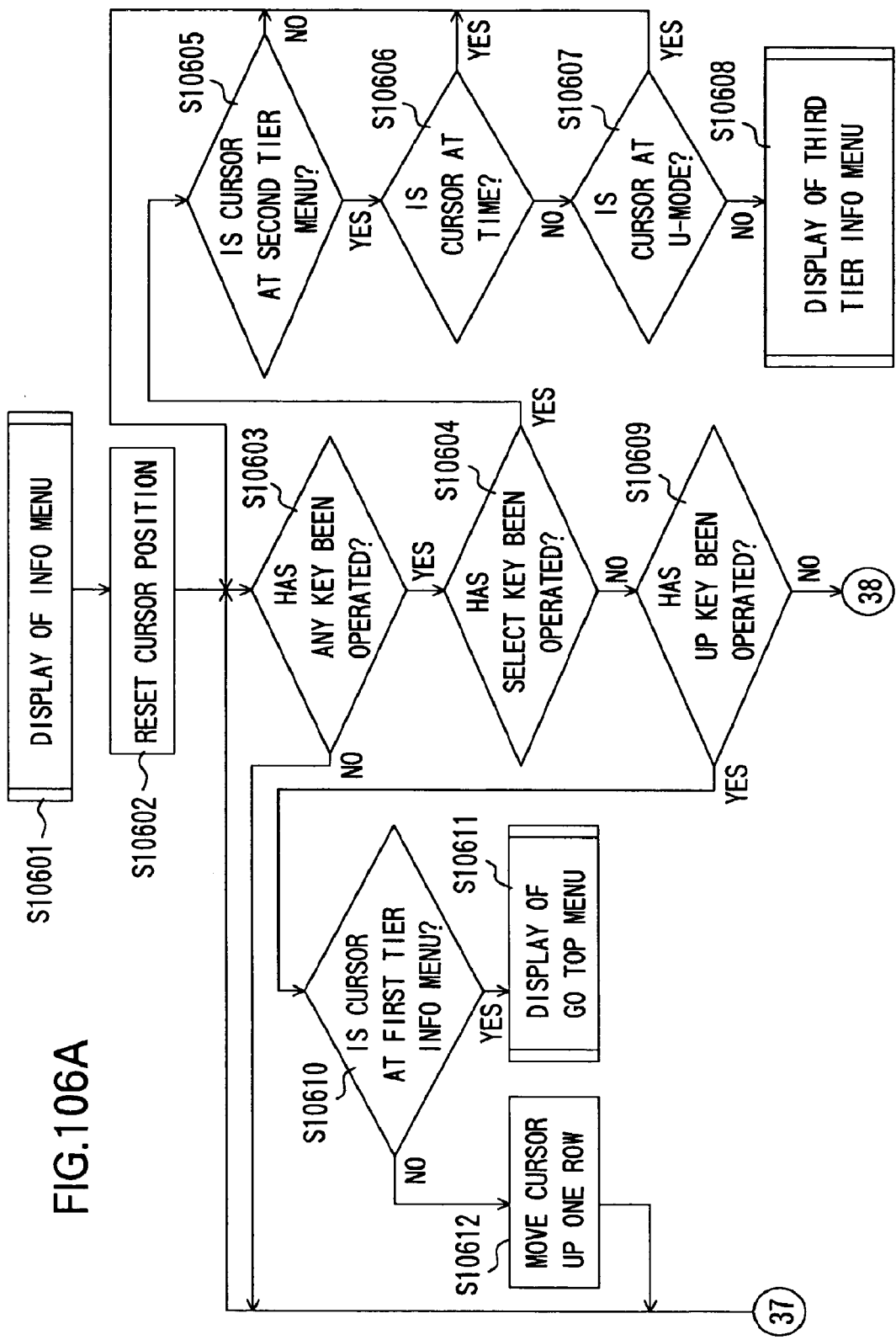
FIG. 106 is a display operation flowchart of the embodiment.
Figure 106B:
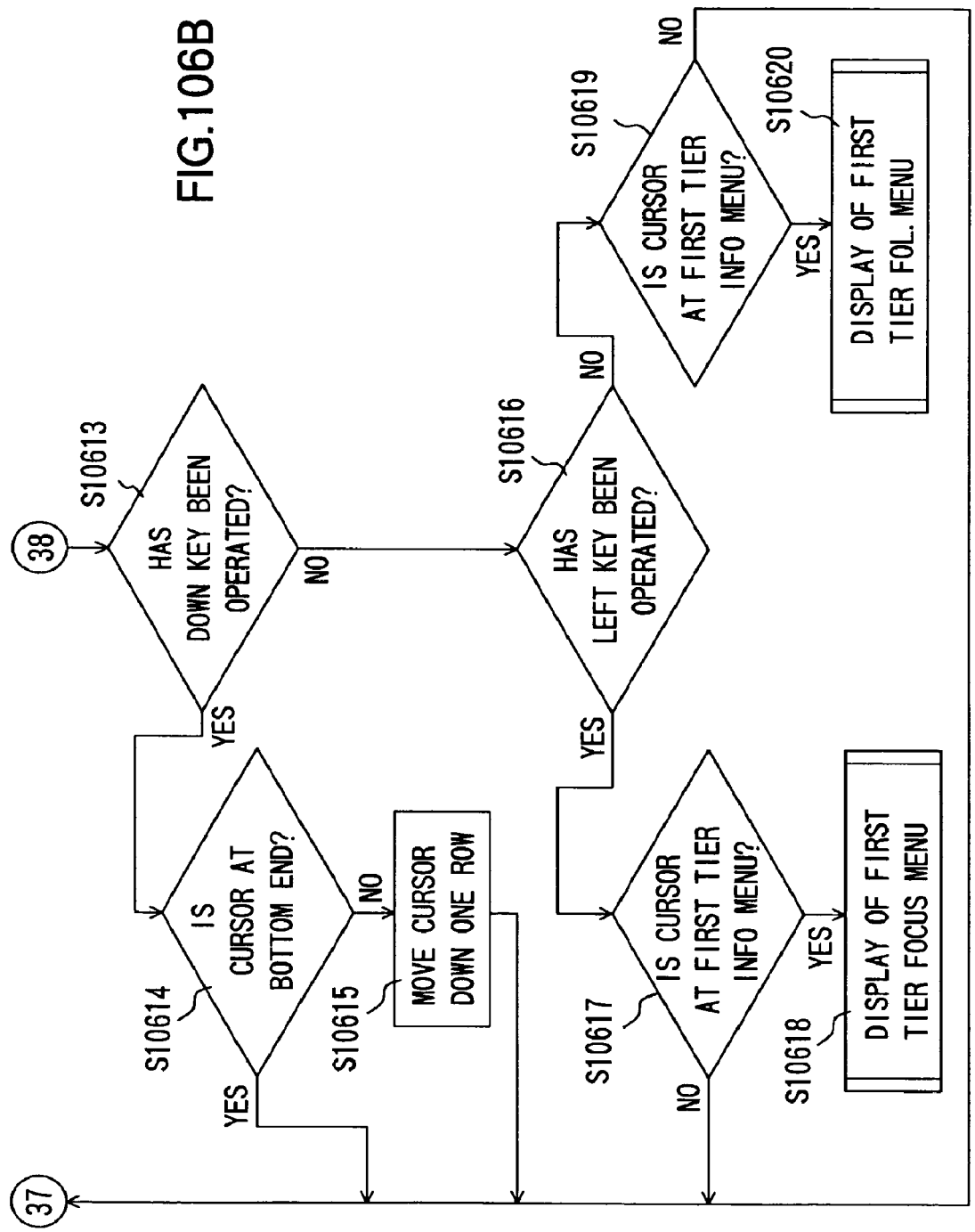

FIGS. 106A and 106B show the operation flow for first tier and second tier Info function menus, and in step S10601, the display of the display panel 118 is renewed as shown in 708 of FIG. 7. In step S10602, the cursor position is set at the first tier Info function menu icon.

In step S10603, the operation of the function setting switch 119 is awaited. When any of the four arrow keys 502 to 505 or the select key 501 is operated, step S10604 is entered. In step S10604, it is judged whether or not the select key 501 has been operated, and if the select key 501 has been operated, step S10605 is entered while if a key besides the select key 501 has been operated, step S10609 is entered. In step S10605, it is judged whether or not the cursor is currently positioned at the second tier menu, and if the cursor is currently positioned at the second tier menu, step S10606 is entered while if the cursor is currently positioned at a tier besides the second tier menu, step S10603 is entered and the operation of the function setting switch 119 is awaited again. In step S10606, it is judged whether or not the cursor is currently positioned at the second tier Time position, and if the cursor is currently positioned at the second tier Time position, step S10603 is entered and the operation of the function setting switch 119 is awaited again. If the cursor is currently positioned at a position besides the second tier Time position, step S10607 is entered. In step S10607, it is judged whether or not the cursor is currently positioned at the second tier U-Mode position, and if the cursor is currently positioned at the second tier U-Mode position, step S10603 is entered and the operation of the function setting switch 119 is awaited again. If the cursor is currently positioned at a position besides the second tier U-Mode position, step S10608 is entered. In step S10608, a transition to a third tier Info function menu is carried out. In step S10609, it is judged whether or not the up arrow key 502 has been operated and if the up arrow key 502 has been operated, step S10610 is entered while if a key besides the up arrow key 502 has been operated, step S10613 is entered. In step S10610, it is judged whether or not the cursor is currently positioned at the first tier Info function menu icon, and if the cursor is currently positioned at the first tier Info function icon, step S10611 is entered while if the cursor is currently positioned at a position besides the first tier Info function icon, step S10612 is entered. In step S10611, the transition confirmation menu (GO TOP menu), which is for choosing between returning or not returning the display on the display panel 107 to the startup menu, is displayed. Here, if the startup menu is to be returned to, the select key 501 is operated, and if not, the down arrow key 503 is operated and the first tier Info function menu is displayed again. In step S10612, the cursor position is moved up one row and then step S10603 is entered, upon which the operation of the function setting switch 119 is awaited again.

In step S10613, it is judged whether or not the down arrow key 503 has been operated and if the down arrow key 503 has been operated, step S10614 is entered while if a key besides the down arrow key 503 has been operated, step S10616 is entered. In step S10614, it is judged whether or not the cursor is currently positioned at the bottom end, and if the cursor is at the bottom end, step S10603 is entered and the operation of the function setting switch 119 is awaited again. If the cursor is positioned at a position besides the bottom end, step S10615 is entered. In step S10615, the cursor position is moved down one row and then step S10603 is entered, upon which the operation of the function setting switch 119 is awaited again.

In step S10616, it is judged whether or not the left arrow key 504 has been operated and if the left arrow key 504 has been operated, step S10617 is entered while if a key besides the left arrow key 504 has been operated, step S10619 is entered. In step S10617, it is judged whether or not the cursor is currently positioned at the first tier Info function menu icon, and if the cursor is currently positioned at the first tier Info function menu icon, step S10618 is entered while if the cursor is currently positioned at a position besides the first tier Info function menu icon, step S10603 is entered and the operation of the function setting switch 119 is awaited again. In step S10618, a transition to the first tier Focus function menu is carried out.

In step S10619, it is judged whether or not the cursor is currently positioned at the first tier Info function menu icon, and if the cursor is currently positioned at first tier Info function icon, step S10620 is entered while if the cursor is currently positioned at a position besides the first tier Info function menu icon, step S10603 is entered and the operation of the function setting switch 119 is awaited again. In step S10620, a transition to a first tier Fol. function menu is carried out.

The relationships between the display contents of the display panel 118 and the operations of the function setting switch 119 are shown in FIG. 107 to FIG. 110.

Figure 111:
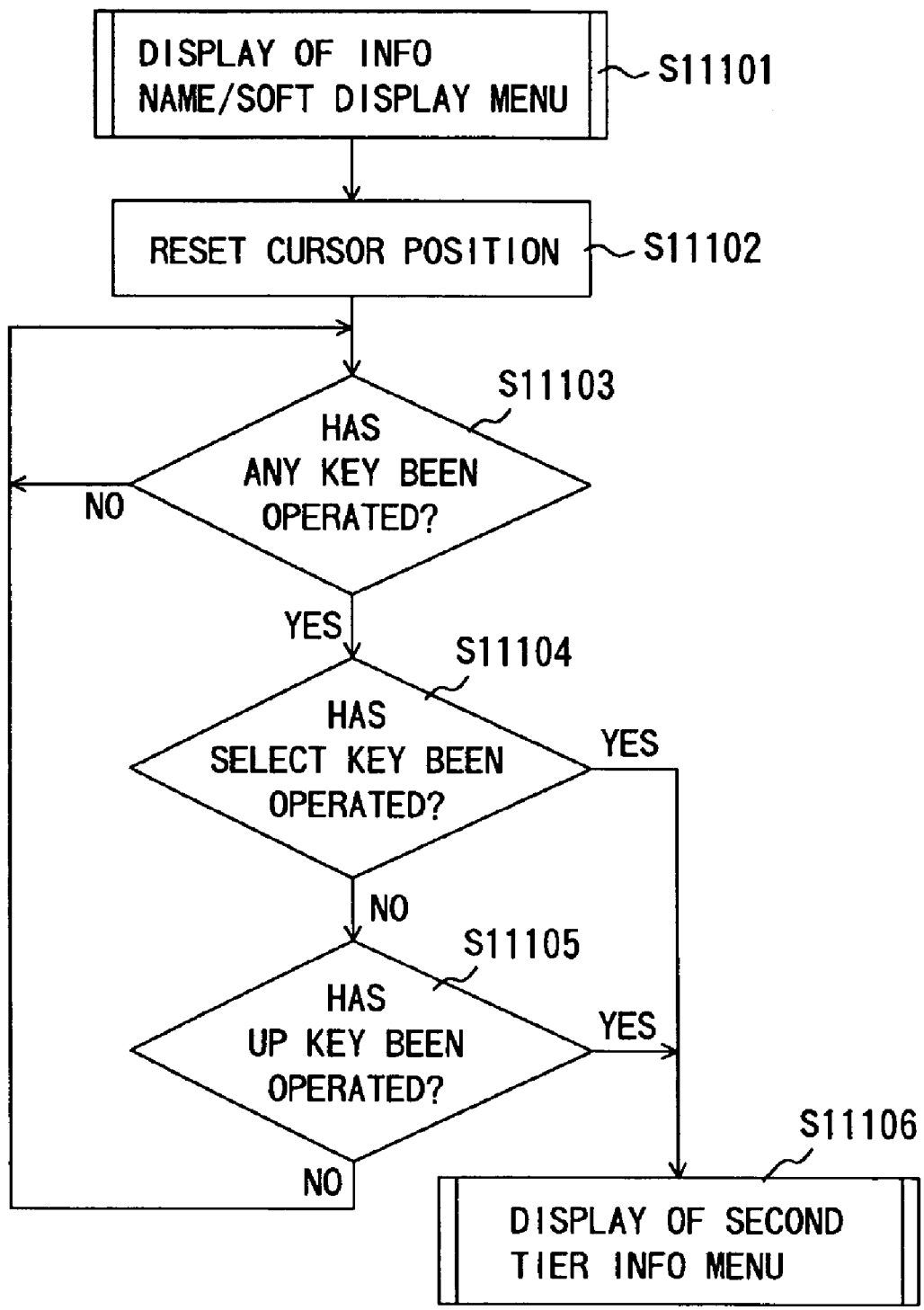
FIG. 111 is a display operation flowchart of the embodiment.
Figure 112:
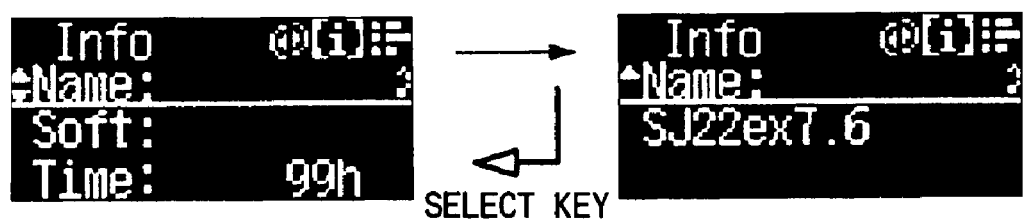
FIG. 112 is a detailed diagram of the display panel of the embodiment.
Figure 113:
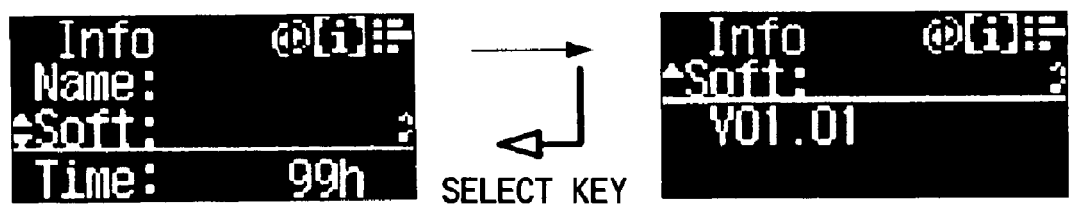
FIG. 113 is a detailed diagram of the display panel of the embodiment.

FIG. 111 shows the operation flow for third tier Info Name and Info Soft display menus, and in step S11101, the display of the display panel 118 is renewed as shown in FIG. 112 and FIG. 113. In step S11102, the cursor is positioned at the third tier Info title position.

In step S11103, the operation of the function setting switch 119 is awaited. When any of the four arrow keys 502 to 505 or the select key 501 is operated, step S11104 is entered. In step S11104, it is judged whether or not the select key 501 has been operated, and if the select key 501 has been operated, step S11106 is entered while if a key besides the select key 501 has been operated, step S11105 is entered. In step S11105, it is judged whether or not the up arrow key 502 has been operated and if the up arrow key 502 has been operated, step S11106 is entered while if a key besides the up arrow key 502 has been operated, step S11103 is entered and the operation of the function setting switch 119 is awaited again. In step S11106, a transition to the second tier Info menu is carried out.

Figure 114A:
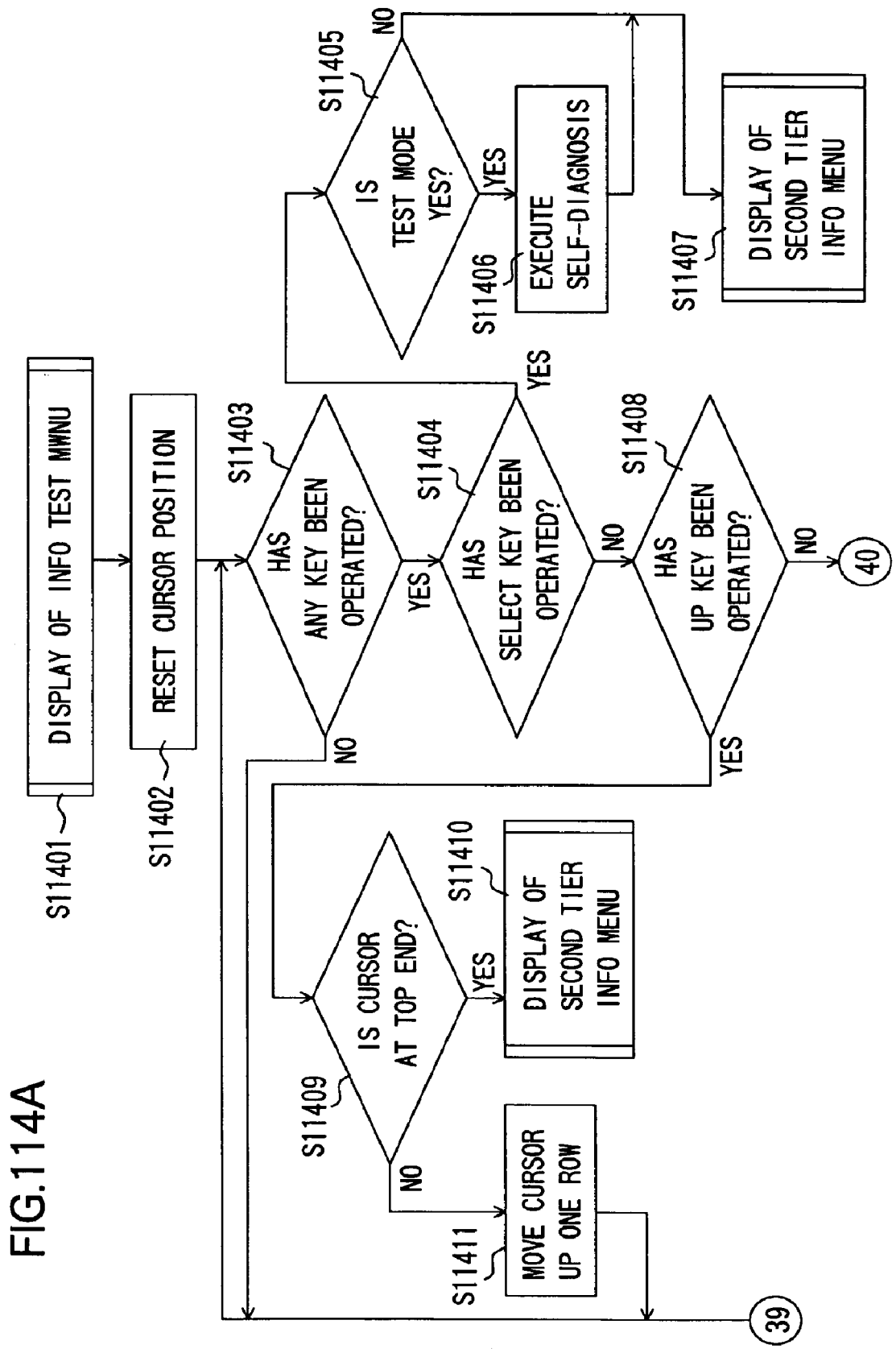
FIG. 114 is a display operation flowchart of the embodiment.
Figure 114B:
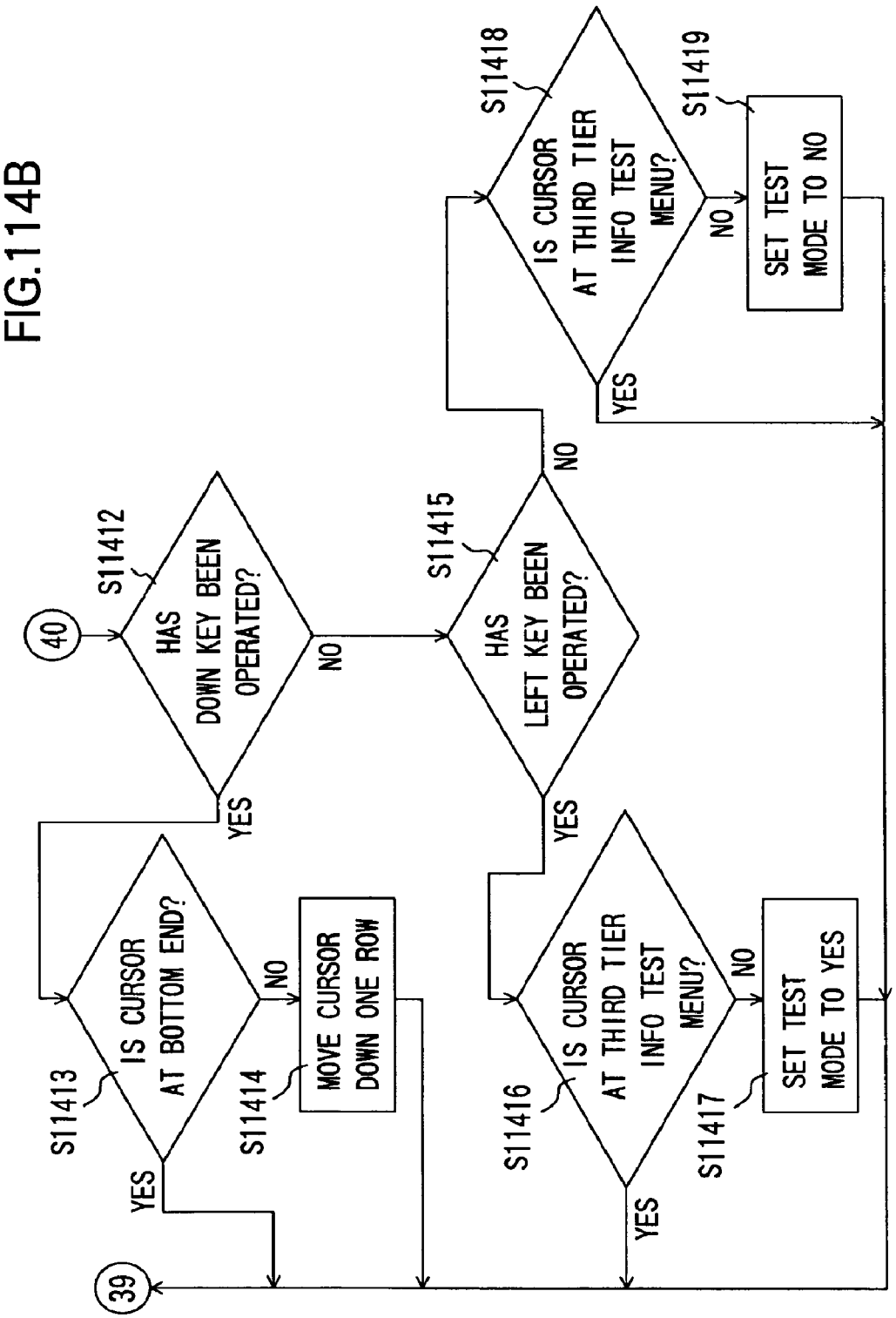
Figure 115:
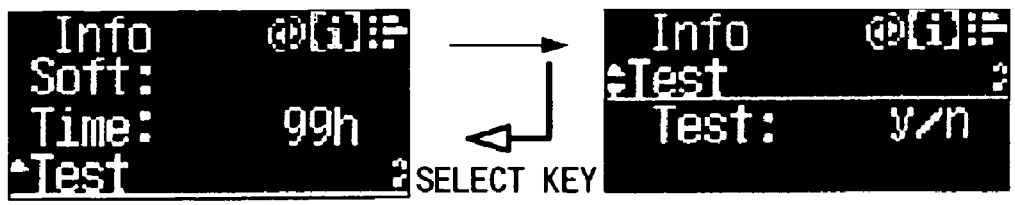
FIG. 115 is a detailed diagram of the display panel of the embodiment.

FIGS. 114A and 114B show the operation flow for a third tier Info Test setting menu, and in step S11401, the display of the display panel 118 is renewed as shown in FIG. 115. In step S11402, the cursor is positioned at the third tier Info Test position.

In step S11403, the operation of the function setting switch 119 is awaited. When any of the four arrow keys 502 to 505 or the select key 501 is operated, step S11404 is entered. In step S11404, it is judged whether or not the select key 50 has been operated, and if the select key 501 has been operated, step S11405 is entered while if a key besides the select key 501 has been operated, step S11408 is entered. In step S11405, it is judged whether the current Test mode setting is YES or NO, and if the Test mode setting is YES, step S11406 is entered while if the Test mode setting is NO, step S11407 is entered. In step S11406, a self-diagnosis of the lens is carried out and then step S11407 is entered. In step S11407, a transition to the second tier Info function setting menu is carried out.

In step S11408, it is judged whether or not the up arrow key 502 has been operated and if the up arrow key 502 has been operated, step S11409 is entered while if a key besides the up arrow key 502 has been operated, step S11412 is entered. In step S11409, it is judged whether or not the cursor is currently positioned at the top end, and if the cursor is currently positioned at the top end, step S11410 is entered while if the cursor is currently positioned at a position besides the top end, step S11411 is entered. In step S11410, a transition to the second tier Info function setting menu is carried out. In step S11411, the cursor position is moved up one row and then step S11403 is entered, upon which the operation of the function setting switch 119 is awaited again.

In step S11412, it is judged whether or not the down arrow key 503 has been operated and if the down arrow key 503 has been operated, step S11413 is entered while if a key besides the down arrow key 503 has been operated, step S11415 is entered. In step S11413, it is judged whether or not the cursor is currently positioned at the bottom end, and if the cursor is positioned at the bottom end, step S11403 is entered and the operation of the function setting switch 119 is awaited again. If the cursor is positioned at a position besides the bottom end, step S11414 is entered. In step S11414, the cursor position is moved down one row and then step S11403 is entered, upon which the operation of the function setting switch 119 is awaited again.

In step S11415, it is judged whether or not the left arrow key 504 has been operated and if the left arrow key 504 has been operated, step S11416 is entered while if a key besides the left arrow key 504 has been operated, step S11418 is entered. In step S11416, it is judged whether or not the cursor is currently positioned at the third tier Info Test menu, and if the cursor is positioned at the third tier Info Test menu, step S11403 is entered and the operation of the function setting switch 119 is awaited again. If the cursor is positioned at a position besides the third tier Info Test menu, step S11417 is entered. In step S11417, the Test mode is set to YES, and then step S11403 is entered, upon which the operation of the function setting switch 119 is awaited again.

In step S11418, it is judged whether or not the cursor is currently positioned at the third tier Info Test menu, and if the cursor is positioned at the third tier Info Test menu, step S11403 is entered and the operation of the function setting switch 119 is awaited again. If the cursor is positioned at a position besides the third tier Info Test menu, step S11419 is entered. In step S11419, the Test mode is set to NO, and then step S11403 is entered, upon which the operation of the function setting switch 119 is awaited again.

Figure 116:
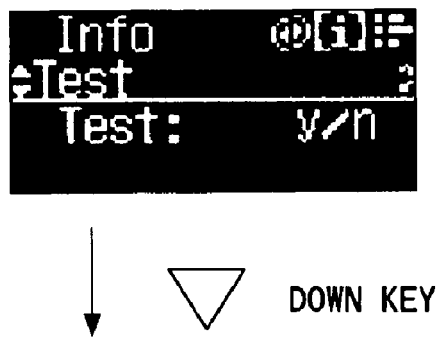
FIG. 116 is a detailed diagram of the display panel of the embodiment.
Figure 117:
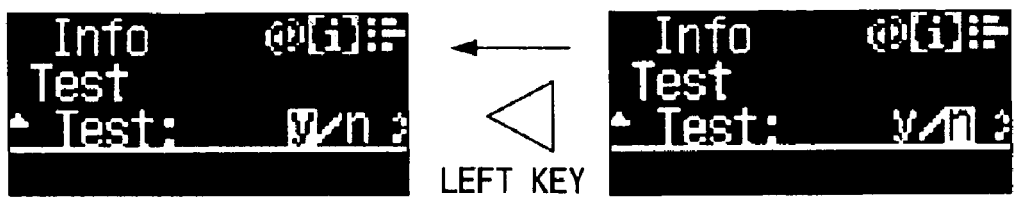
FIG. 117 is a detailed diagram of the display panel of the embodiment.
Figure 118:
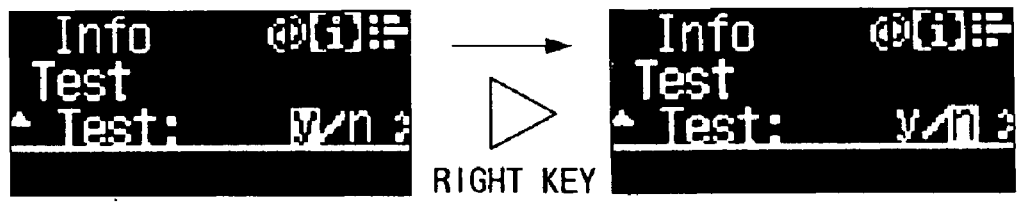
FIG. 118 is a detailed diagram of the display panel of the embodiment.

The relationships between the display contents of the display panel 118 and the operations of the function setting switch 119 are shown in FIG. 116 to FIG. 118.

The Info Time display in FIG. 109 displays the measured duration for which the power of the lens has been turned on and enables checking of the timing of maintenance regardless of the frequency of use of the lens by a user.

The name of the present lens, the software version, etc., can be checked as shown in FIG. 112 and FIG. 113.

Figure 119:
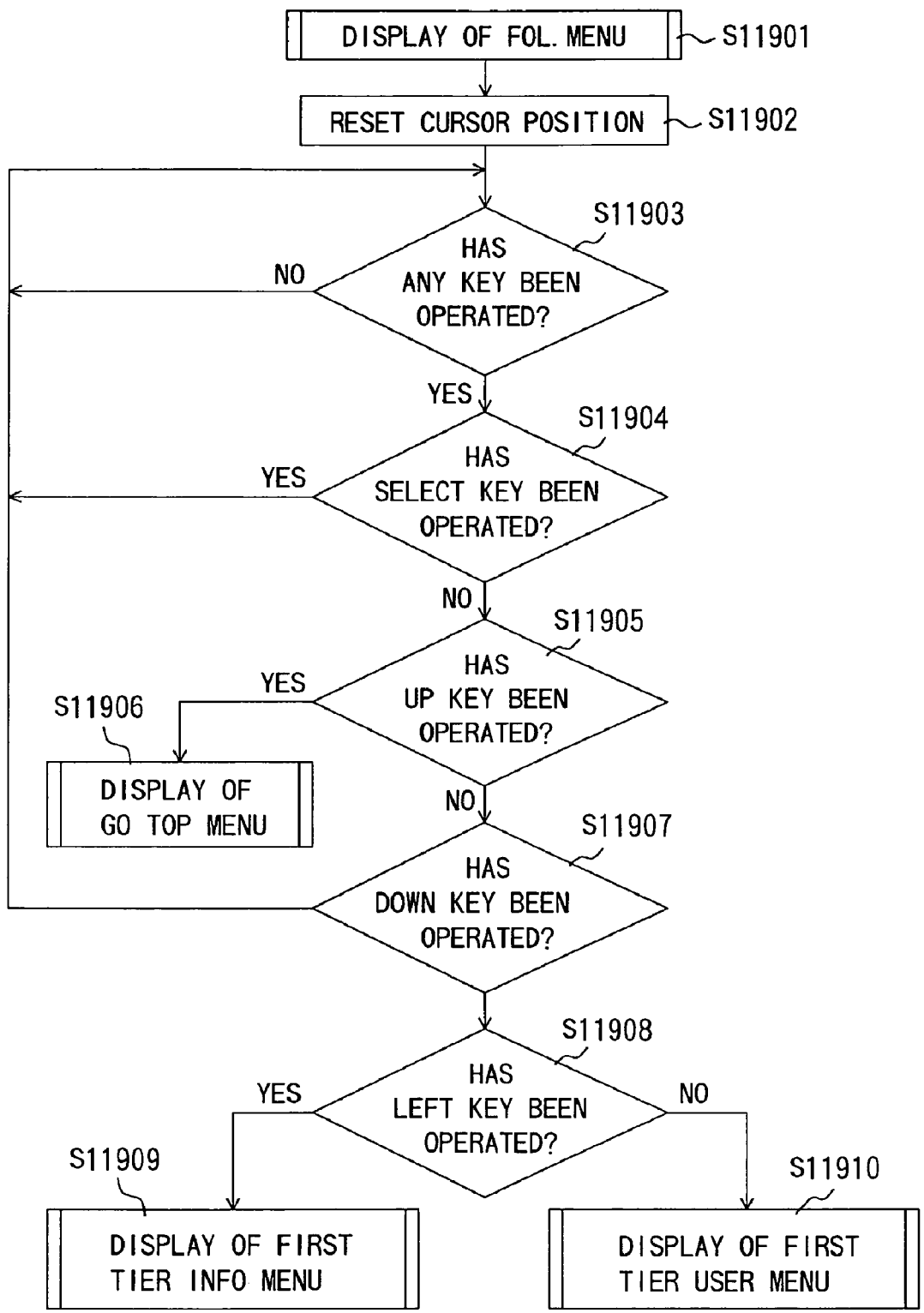
FIG. 119 is a display operation flowchart of the embodiment.
Figure 120:
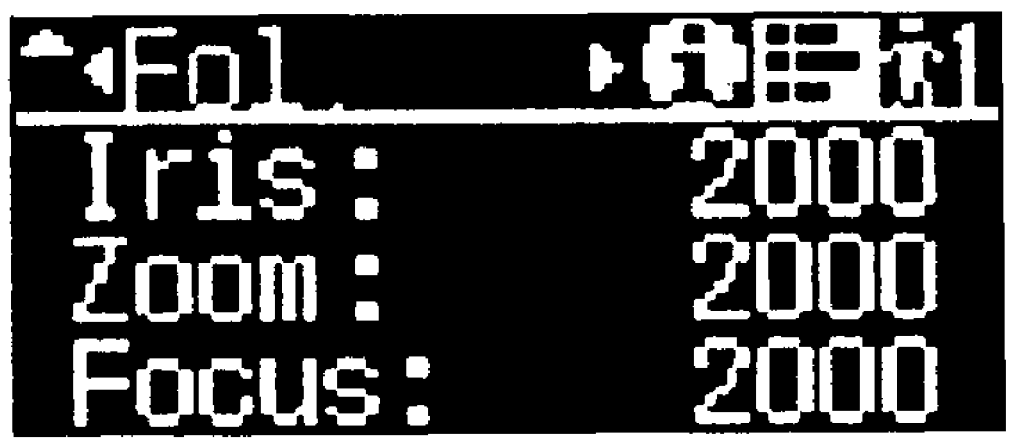
FIG. 120 is a detailed diagram of the display panel of the embodiment.
Figure 121:
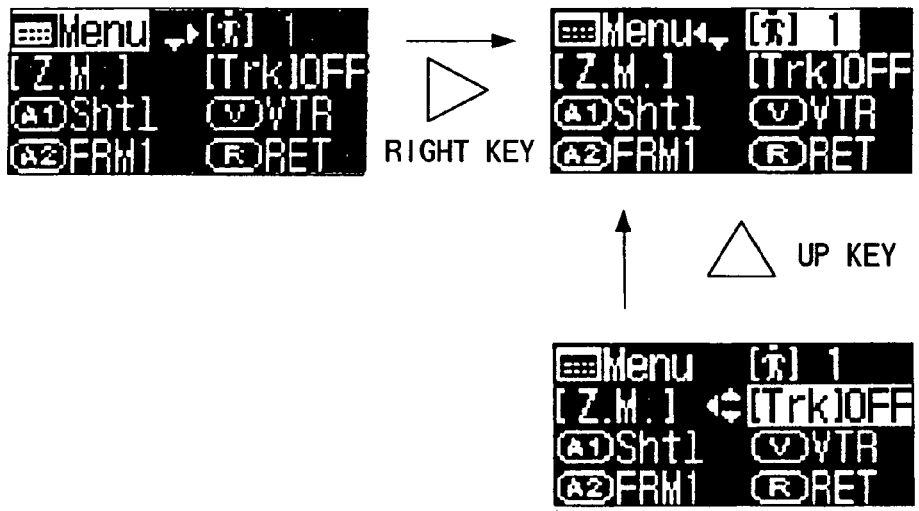
FIG. 121 is a detailed diagram of the display panel of the embodiment.

FIG. 119 shows the operation flow for first tier and second tier Fol. display menus, and in step S11901, the display of the display panel 118 is renewed as shown in 709 of FIG. 7 and FIG. 120. In step S11902, the cursor position is set at the first tier Fol. function menu icon.

In step S11903, the operation of the function setting switch 119 is awaited. When any of the four arrow keys 502 to 505 or the select key 501 is operated, step S11904 is entered. In step S11904, it is judged whether or not the select key 501 has been operated, and if the select key 501 has been operated, step S11903 is entered and the operation of the function setting switch 119 is awaited again. If a key besides the select key 501 has been operated, step S11905 is entered. In step S11905, it is judged whether or not the up arrow key 502 has been operated and if the up arrow key 502 has been operated, step S11906 is entered while if a key besides the up arrow key 502 has been operated, step S11907 is entered. In step S11906, the transition confirmation menu (GO TOP menu), which is for choosing between returning or not returning the display on the display panel 118 to the startup menu, is displayed. Here, if the startup menu is to be returned to, the select key 501 is operated, and if not, the down arrow key 503 is operated and the first tier Fol. display menu is displayed again.

In step S11907, it is judged whether or not the down arrow key 503 has been operated, and if the down arrow key 503 has been operated, step S11903 is entered and the operation of the function setting switch 119 is awaited again. If a key besides the down arrow key 503 has been operated, step S11908 is entered. In step S11908, it is judged whether or not the left arrow key 504 has been operated and if the left arrow key 504 has been operated, step S11909 is entered while if a key besides the left arrow key 504 has been operated, step S11910 is entered. In step S11909, a transition to the first tier Info function menu is carried out. In step S11910, a transition to the first tier User function menu is carried out. In the above-mentioned first tier Fol. display menu of FIG. 120, the current position information, provided from the focus position detector 103, the zoom position detector 107, and the iris position detector 111 of FIG. 1, are displayed.

The startup menu shall now be described by using FIG. 6 and FIG. 121 to FIG. 134.

FIG. 121 to FIG. 134 show an example of a display flow that is displayed on the display panel 118.

In addition to menu functions for displaying the respective first tier function menus, shortcuts for a plurality of function setting menus are positioned in the startup menu. By positioning, from among the functions of the respective function menus that are arranged in a hierarchical structure, the functions with which the change of setting or the checking of setting must be performed frequently, in the startup menu, an arrangement enabling access to lower tiers in a single operation is realized.

Figure 131:
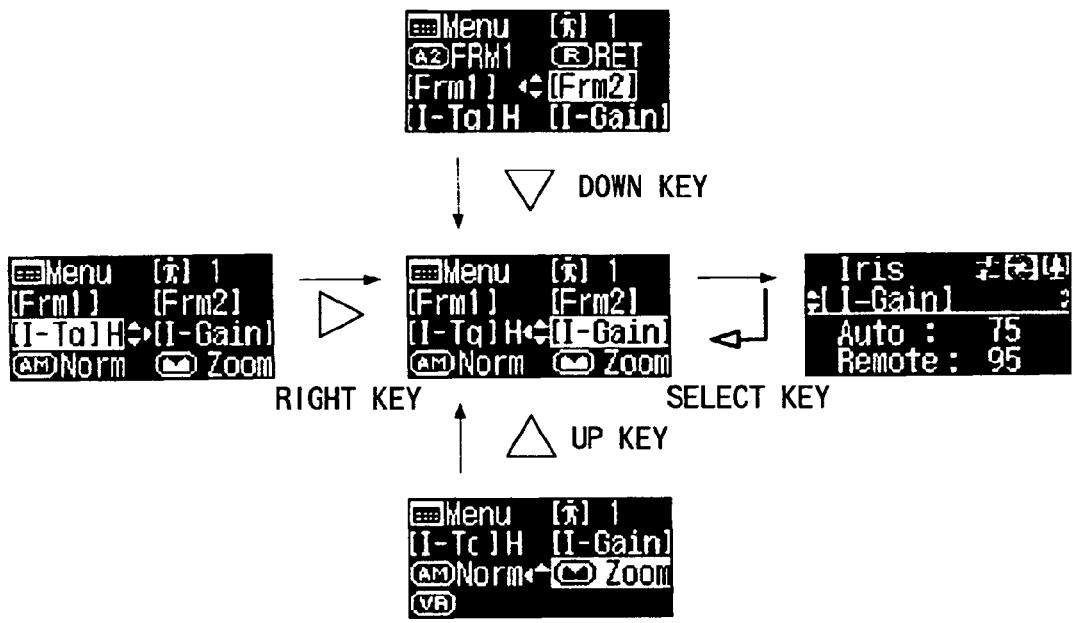
FIG. 131 is a detailed diagram of the display panel of the embodiment.
Figure 132:
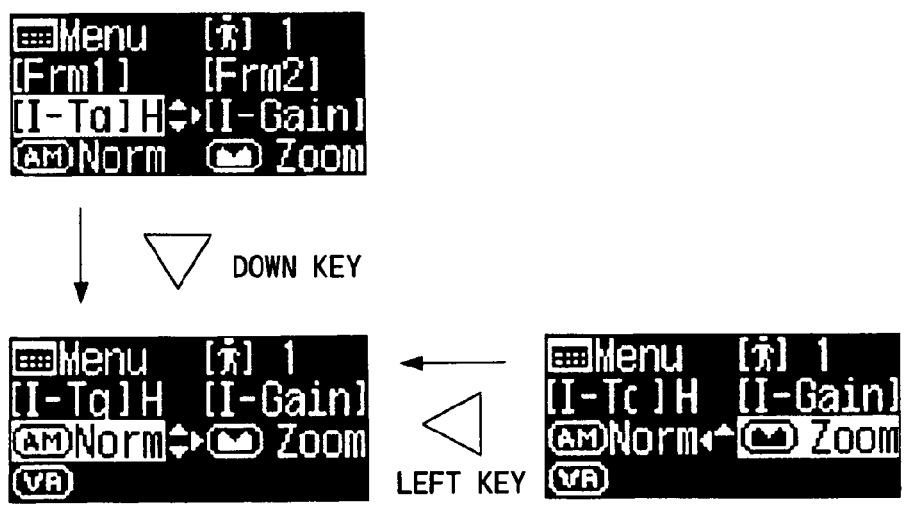
FIG. 132 is a detailed diagram of the display panel of the embodiment.
Figure 133:
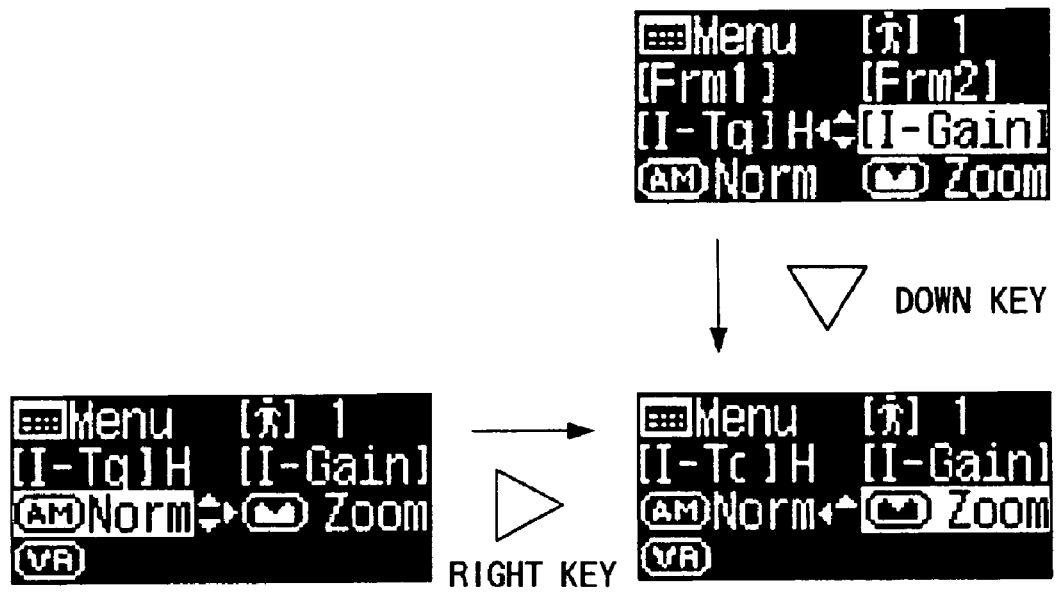
FIG. 133 is a detailed diagram of the display panel of the embodiment.
Figure 134:
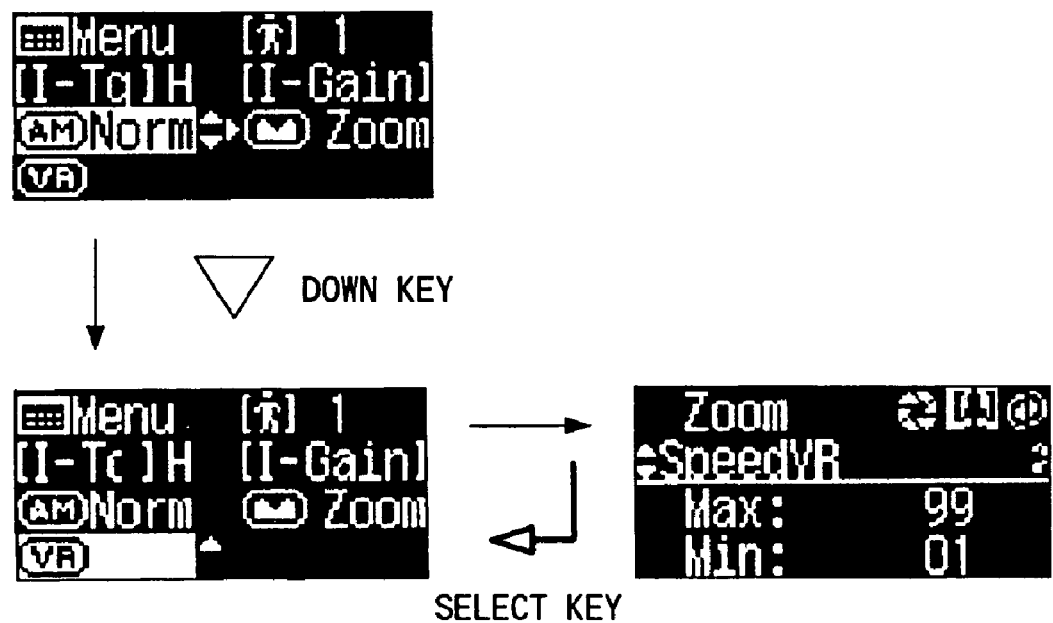
FIG. 134 is a detailed diagram of the display panel of the embodiment.

For example, by setting the cursor at the I-Gain (Iris Gain) position in the startup menu in FIG. 131 and then operating the select key 501, the third tier Iris Gain menu can be displayed immediately.

Figure 6:
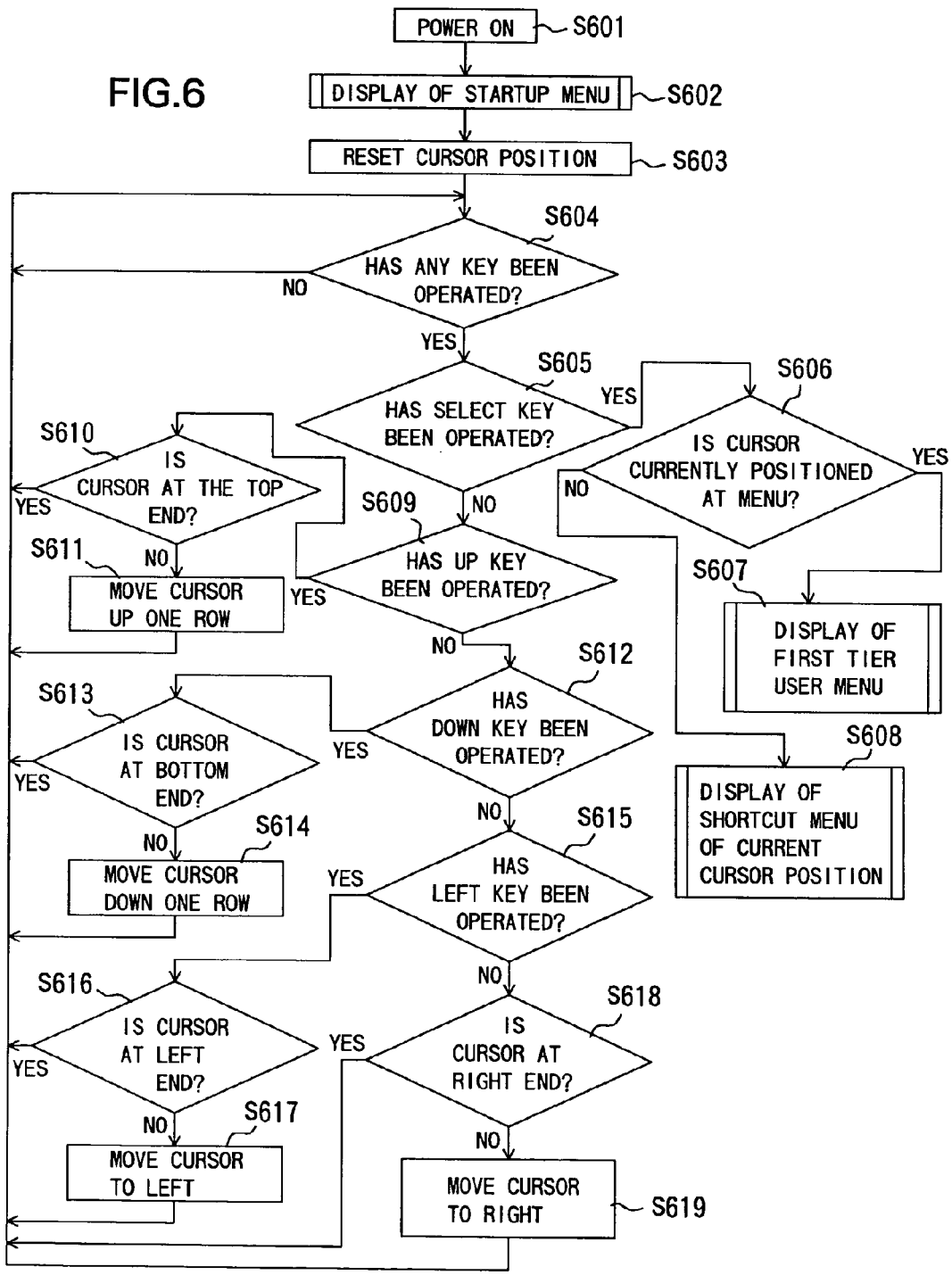
FIG. 6 is a display operation flowchart of the embodiment.
Figure 122:
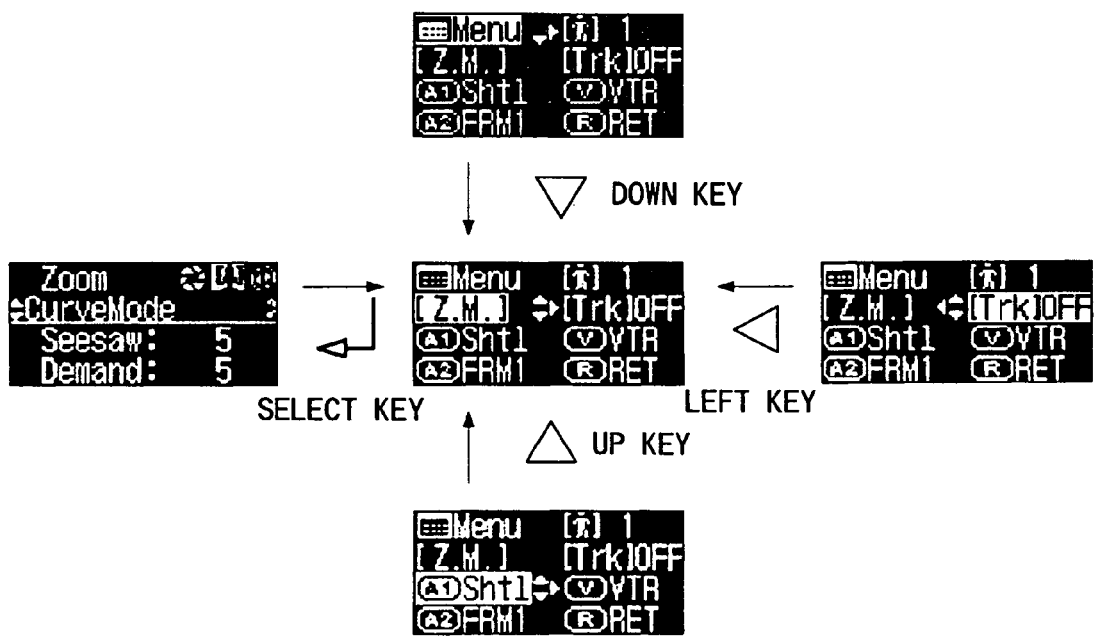
FIG. 122 is a detailed diagram of the display panel of the embodiment.
Figure 123:
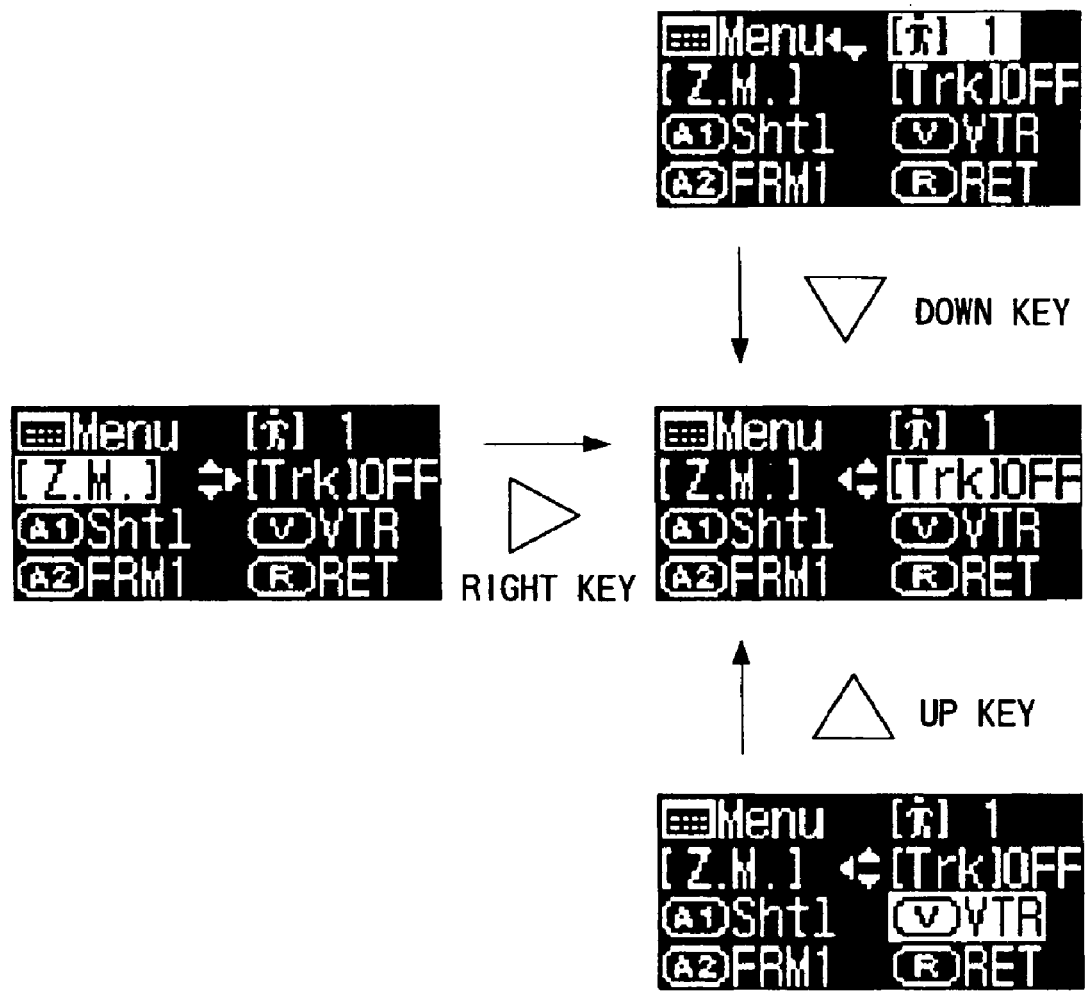
FIG. 123 is a detailed diagram of the display panel of the embodiment.
Figure 124:
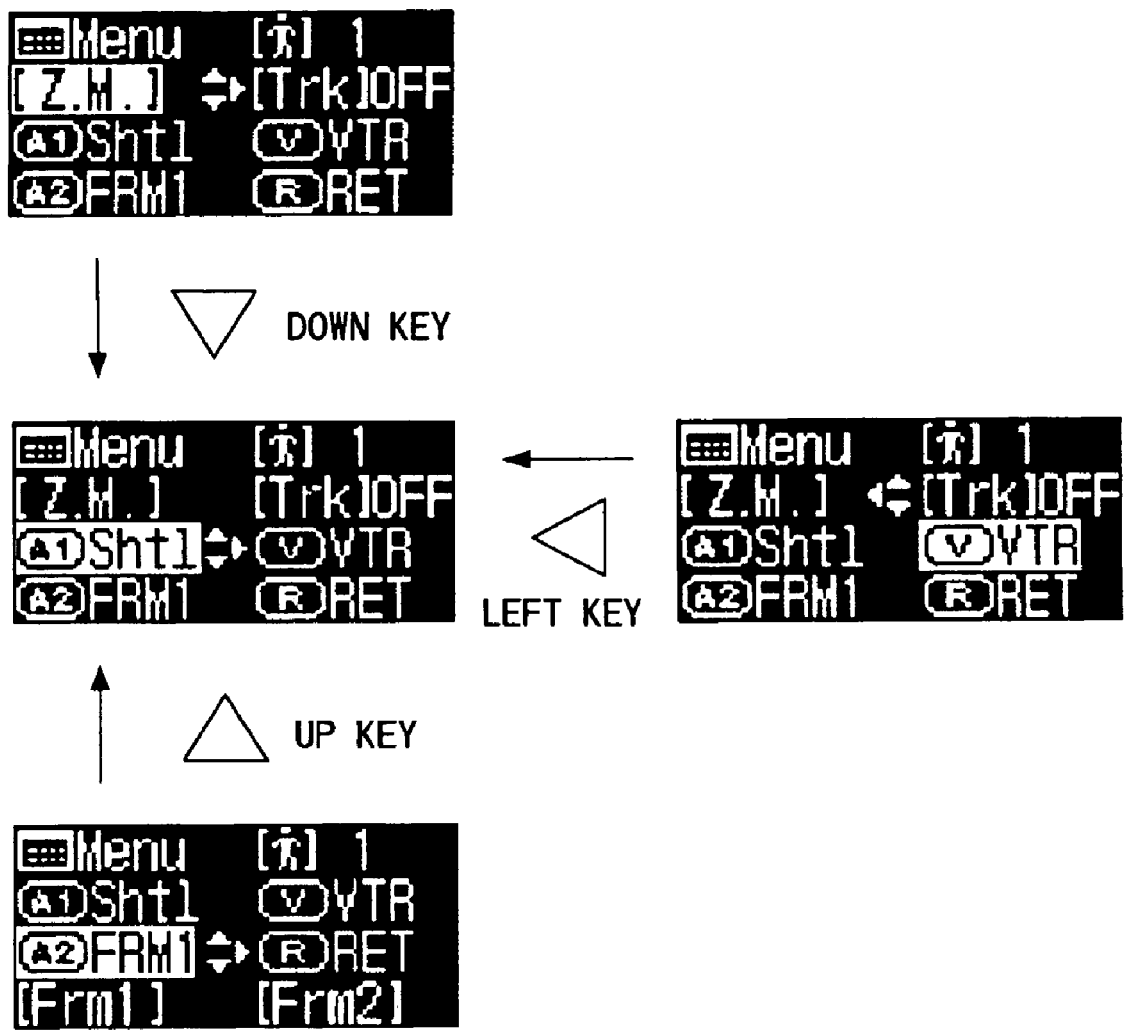
FIG. 124 is a detailed diagram of the display panel of the embodiment.
Figure 125:
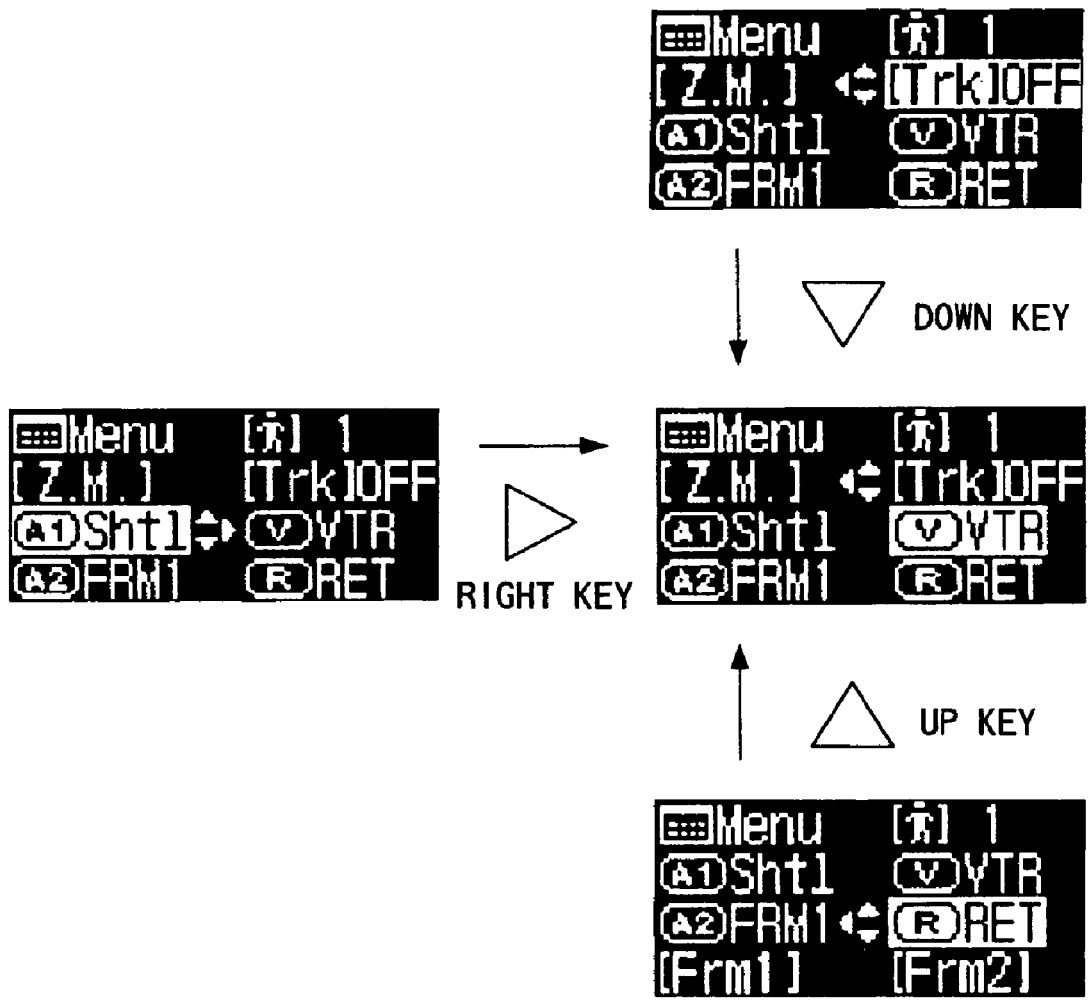
FIG. 125 is a detailed diagram of the display panel of the embodiment.
Figure 126:
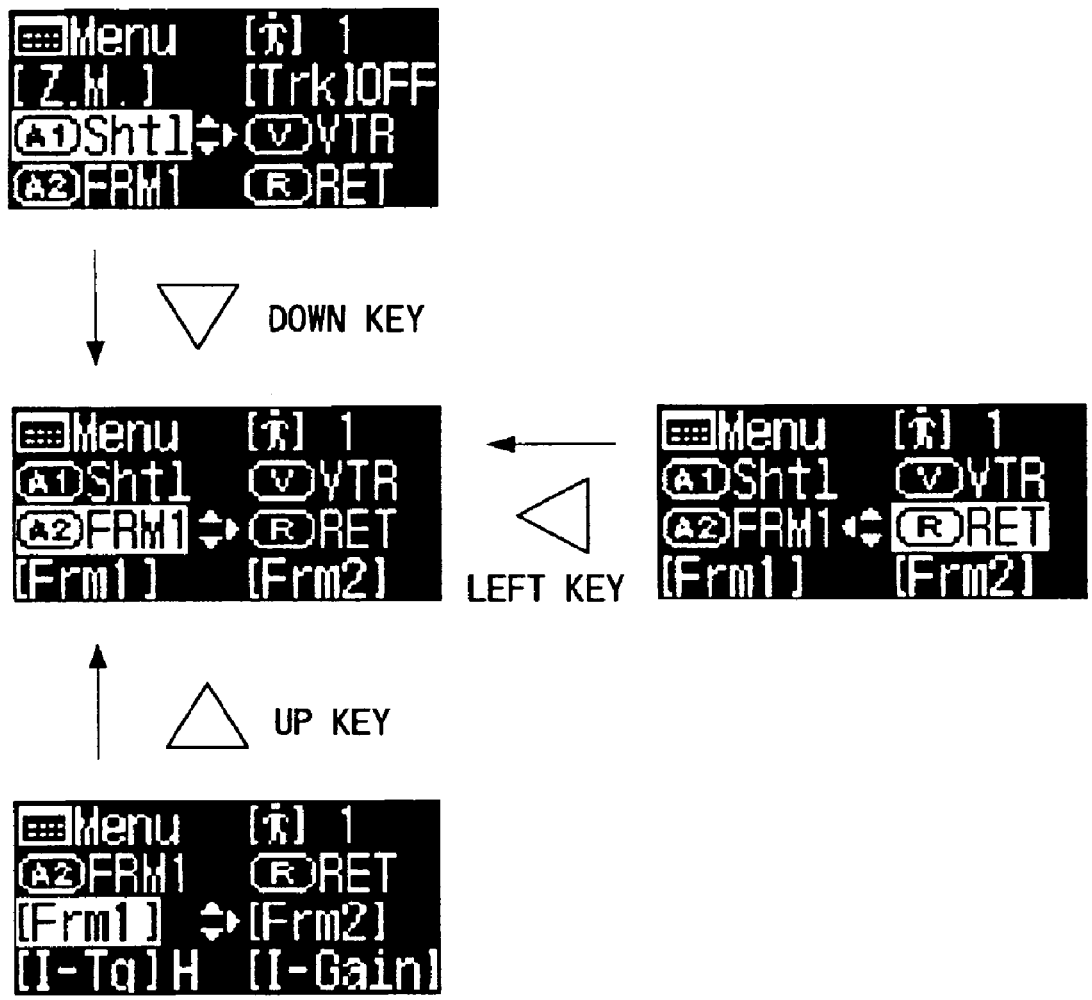
FIG. 126 is a detailed diagram of the display panel of the embodiment.
Figure 127:
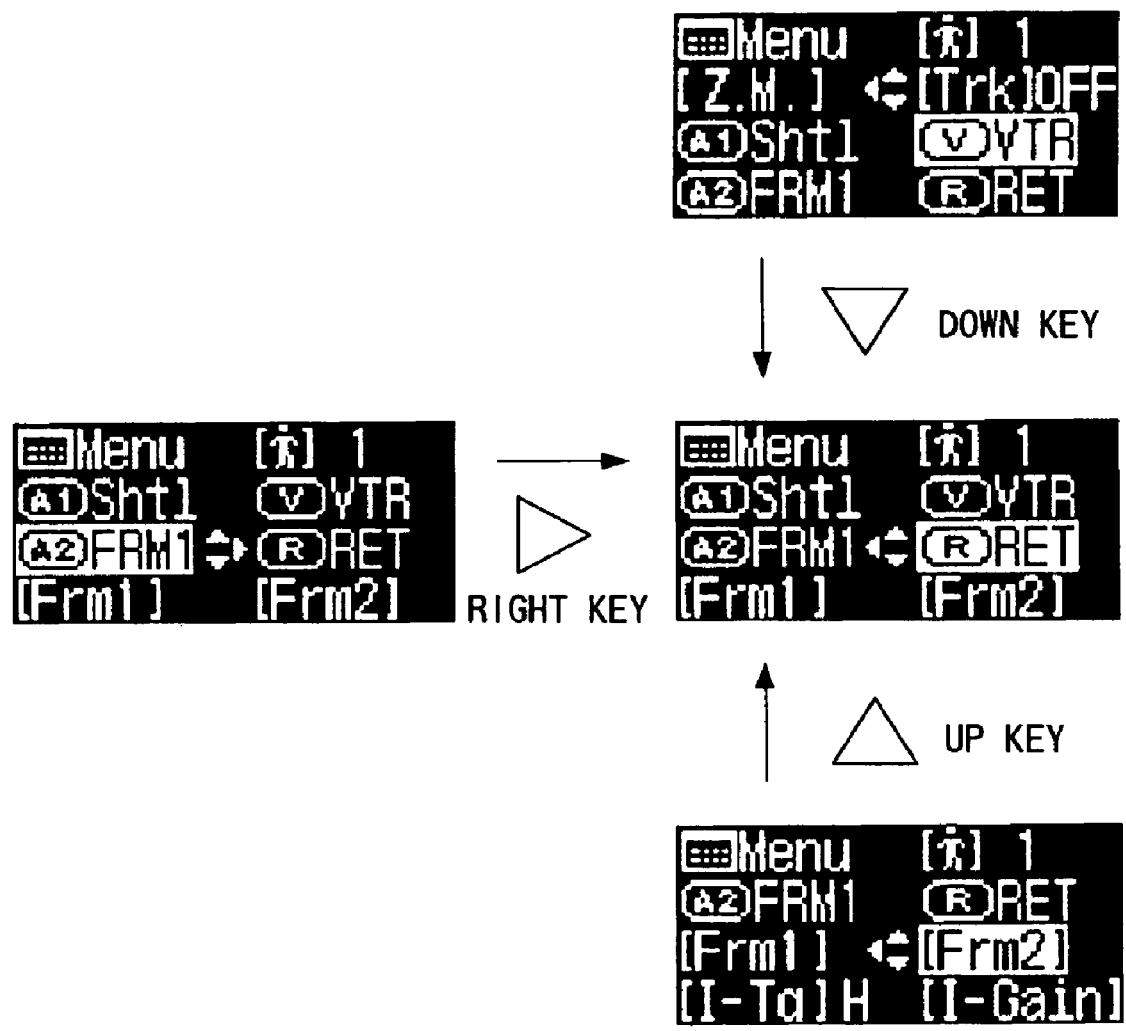
FIG. 127 is a detailed diagram of the display panel of the embodiment.
Figure 128:
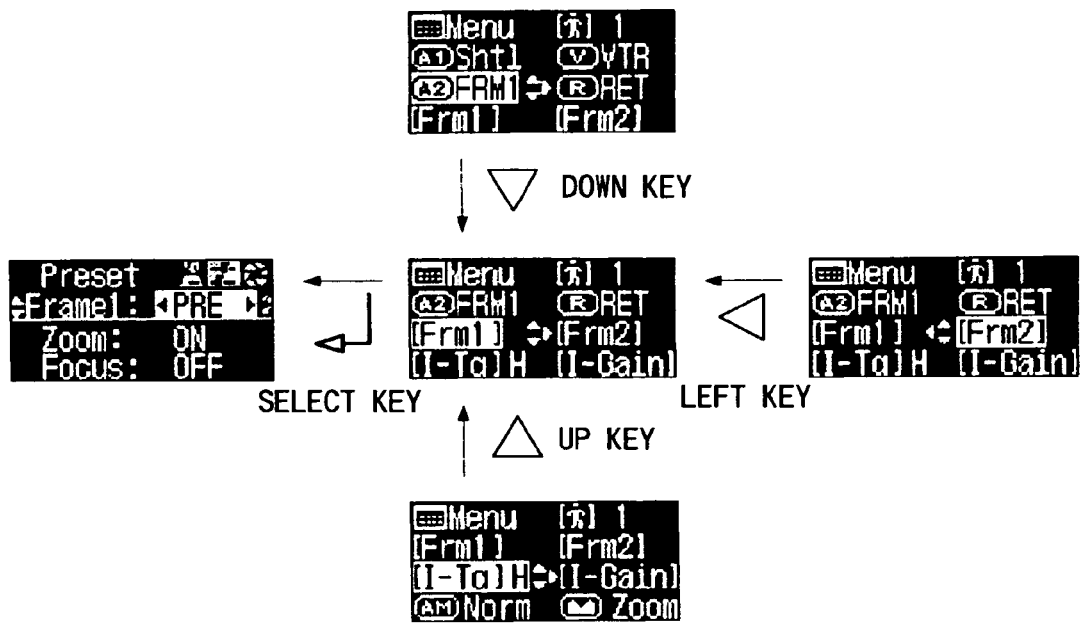
FIG. 128 is a detailed diagram of the display panel of the embodiment.
Figure 129:
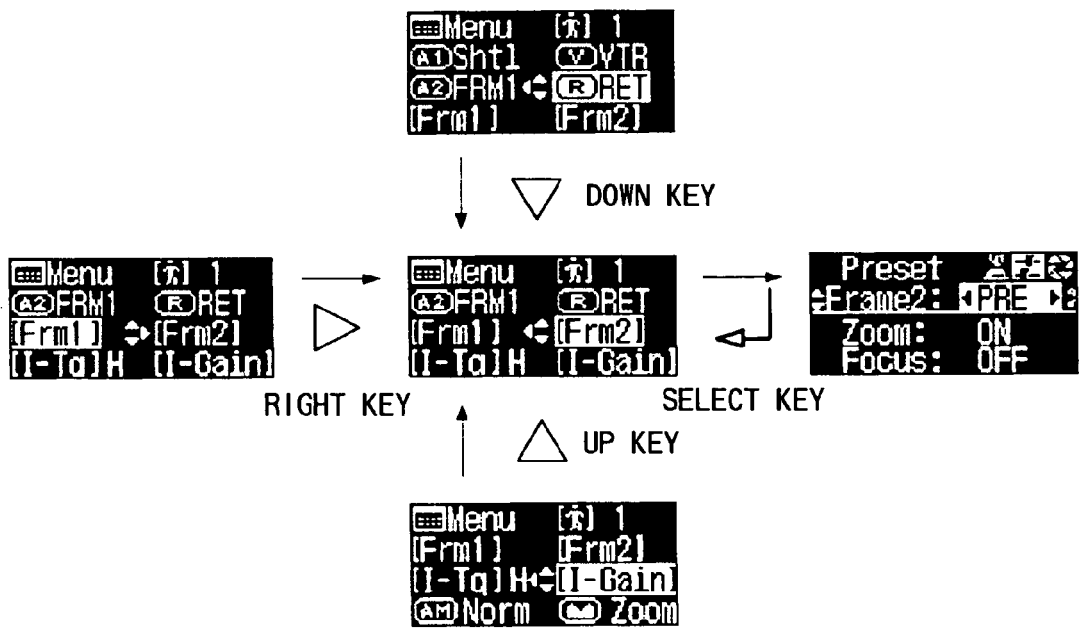
FIG. 129 is a detailed diagram of the display panel of the embodiment.
Figure 130:
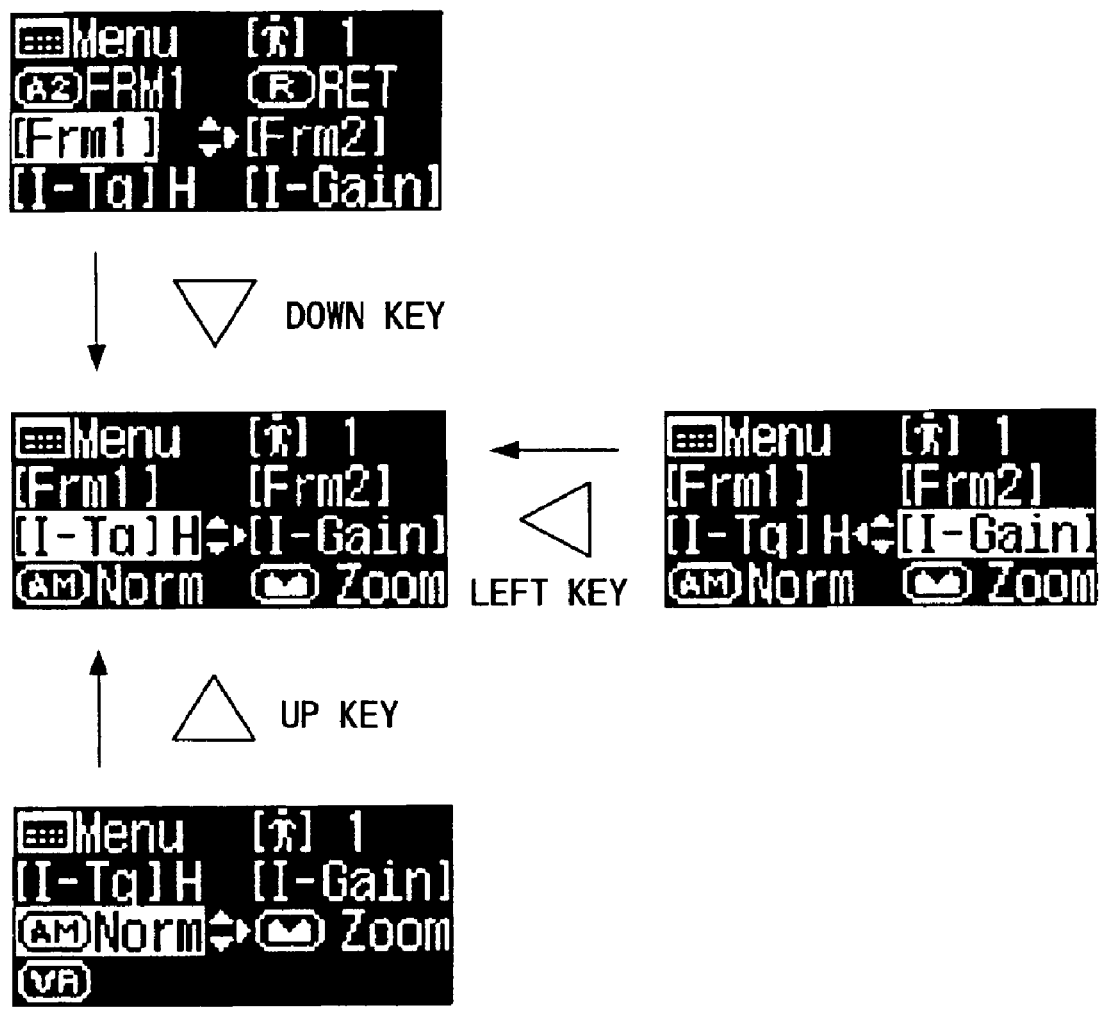
FIG. 130 is a detailed diagram of the display panel of the embodiment.

When in step S608 of FIG. 6, the cursor is set at the Z.M position as shown for example in FIG. 122, the third tier Zoom Curve Mode menu is displayed. In step S609, it is judged whether or not the up arrow key 502 has been operated and if the up arrow key 502 has been operated, step S610 is entered while if a key besides the up arrow key 502 has been operated, step S612 is entered.

In step S610, it is judged whether or not the cursor is currently positioned at the top end, and if the cursor is currently positioned at the top end, step S604 is entered and the operation of the function setting switch 119 is awaited again. If the cursor is currently positioned at a position besides the top end, step S611 is entered. In step S611, the cursor position is moved up one row and then step S604 is entered, upon which the operation of the function setting switch 119 is awaited again.

In step S612, it is judged whether or not the down arrow key 503 has been operated and if the down arrow key 503 has been operated, step S613 is entered while if a key besides the down arrow key 503 has been operated, step S615 is entered. In step S613, it is judged whether or not the cursor is currently positioned at the bottom end, and if the cursor is positioned at the bottom end, step S604 is entered and the operation of the function setting switch 119 is awaited again. If the cursor is positioned at a position besides the bottom end, step S614 is entered. In step S614, the cursor position is moved down one row and then step S604 is entered, upon which the operation of the function setting switch 119 is awaited again.

In step S615, it is judged whether or not the left arrow key 504 has been operated and if the left arrow key 504 has been operated, step S616 is entered while if a key besides the left arrow key 504 has been operated, step S618 is entered. In step S616, it is judged whether or not the cursor is currently positioned at the left end, and if the cursor is positioned at the left end, step S604 is entered and the operation of the function setting switch 119 is awaited again. If the cursor is positioned at a position besides the left end, step S617 is entered. In step S617, the cursor position is moved leftward by one and then step S604 is entered upon which the operation of the function setting switch 119 is awaited again.

In step S618, it is judged whether or not the cursor is currently positioned at the right end, and if the cursor is positioned at the right end, step S604 is entered and the operation of the function setting switch 119 is awaited again. If the cursor is positioned at a position besides the right end, step S619 is entered. In step S619 the cursor position is moved rightward by one and then step S604 is entered upon which the operation of the function setting switch 119 is awaited again.

Though in the present embodiment, just the respective functions shown in FIG. 121 to FIG. 134 are customized inside the startup menu, it is obvious that function settings across all tiers may be customized inside the startup menu.

By thus providing the TV lens with the display panel 118 for displaying setting lens operation characteristics and the function setting switch 119, a user is freed of the troublesome operation of the conventional lens, with which a rubber cap provided on the drive unit is removed and then settings are changed by means of a DIP switch inside the drive unit. Also, since functions can be set in accordance with the character information on the display panel, function setting, which is easy to understand and excellent in operability, is enabled, and at the same time, the setting circumstances can be recognized visually even under a dark environment.

Furthermore, even in the usage environment unique to TV lenses, wherein a plurality of camerapersons share a single image-taking equipment, function setting can be carried out in accordance with the image-taking circumstances since a plurality of function settings can be stored in the memory, and since the setting circumstances of a cameraperson using the equipment priorly can be checked readily and instantly, the risk of running into an unforeseen problem due to use without check of the setting circumstances of the functions can be avoided.

Though with the present embodiment, an example of use of a cross key as the function setting switch was described, any setting switch, such as a jog shuttle switch, etc., may be used as long as it enables functions to be set according to the display flow of the display panel.

Furthermore, though with the present embodiment, the display panel and the function setting switch are provided on the drive unit, these may be disposed at any other part of the TV lens that comprises the main lens body and the drive unit.

Though a form, in which such a function setting switch and display device are connected separately as accessories to the drive unit via cables, may be considered, since with television image-taking, the image-taking equipment may be set on a tripod or carried on a shoulder depending on the image-taking circumstances and camerapersons desire to take the minimum necessary equipment arrangement in view of maneuverability, it is preferable for the abovementioned function setting switch not to be provided as accessories but to be equipped constantly in the TV lens. Also in comparison to a case where separate units are arranged as accessories, the merit of keeping down the total cost is provided.

While preferred embodiments have been described, it is to be understood that modification and variation of the present invention may be made without departing from scope of the following claims.

What is claimed is:

1. An optical apparatus which has a plurality of functions for controlling driving of an optical element, the optical apparatus comprising:
   a first memory configured to store a default setting data set which includes default setting values for the plurality of functions, the default setting values being non-rewritable; and
   a second memory configured to store a user setting data set which includes user setting values for the plurality of functions, the user setting values which are set in accordance with an operation of user and are rewritable based on the default setting values,
   wherein the user setting value of the user setting data set is transferable to a user setting value of a user setting data set of another optical apparatus.

2. The optical apparatus according to claim 1, wherein the second memory is configured to store a plurality of the user setting data sets.

3. The optical apparatus according to claim 2, wherein, of the plurality of the user setting data sets, a first user setting value of a first user setting data set is transferable to a second user setting value of a second user setting data set.

4. The optical apparatus according to claim 1, wherein the user setting data set is initializable to the default setting data set.

5. An image-taking system comprising:
   a camera; and
   an optical apparatus according to claim 1, which is connected to the camera.

6. An optical apparatus which has a plurality of functions for controlling driving of an optical element, the optical apparatus comprising:
   a first memory configured to store a default setting data set which includes default setting values for the plurality of functions, the default setting values being non-rewritable;
   a function setting switch configured to be operated for setting user setting values for the plurality of functions based on the default setting values in accordance with an operation of user; and
   a second memory configured to store a user setting data set which includes the user setting values set by using the function setting switch.

7. The optical apparatus according to claim 6, wherein the second memory is configured to store a plurality of the user setting data sets.

8. The optical apparatus according to claim 7, wherein, of the plurality of the user setting data sets, a first user setting value of a first user setting data set is transferable to a second user setting value of a second user setting data set.

9. The optical apparatus according to claim 6, wherein the user setting value of the user setting data set is transferable to a user setting value of a user setting data set of another optical apparatus.

10. The optical apparatus according to claim 6, wherein the user setting data set is initializable to the default setting data set.

11. The optical apparatus according to claim 6, further comprising a display device displaying the default setting values, the user setting values set in accordance with the operation of the function setting switch or the user setting values which are to be stored in the second memory.

12. An image-taking system comprising:
    a camera; and
    an optical apparatus according to claim 6, which is connected to the camera.

13. An optical apparatus which has a plurality of functions for controlling driving of an optical element, comprising:
    a first memory configured to store a default setting data set which includes default setting values for the plurality of functions, the default setting values being non-rewritable; and
    a second memory configured to store a user setting data set which includes user setting values for the plurality of functions, the user setting values which are set in accordance with an operation of user and are rewritable based on the default setting values,
    wherein the user setting data set is initializable to the default setting data set.

14. An image-taking system comprising:
    a camera; and
    an optical apparatus according to claim 13, which is connected to the camera.

* * * * *